United States Patent
Zhou et al.

(10) Patent No.: US 12,401,222 B2
(45) Date of Patent: Aug. 26, 2025

(54) METHOD FOR FLEXIBLE COORDINATED OPERATION OF URBAN DISTRIBUTION NETWORK AND WATERSHED NETWORK

(71) Applicant: Hunan University, Changsha (CN)

(72) Inventors: Bin Zhou, Changsha (CN); Zhihao Hua, Changsha (CN); Zhikang Shuai, Changsha (CN); Quan Zhou, Changsha (CN); Jiayong Li, Changsha (CN); Cong Zhang, Changsha (CN); Yingping Cao, Changsha (CN)

(73) Assignee: Hunan University, Changsha (CN)

( * ) Notice: Subject to any disclaimer, the term of this patent is extended or adjusted under 35 U.S.C. 154(b) by 403 days.

(21) Appl. No.: 18/186,999

(22) Filed: Mar. 21, 2023

(65) Prior Publication Data

US 2023/0231411 A1 Jul. 20, 2023

(30) Foreign Application Priority Data

Sep. 6, 2022 (CN) .......................... 202211081610.X

(51) Int. Cl.
*H02J 13/00* (2006.01)
*G05B 19/04* (2006.01)
(Continued)

(52) U.S. Cl.
CPC ...... *H02J 13/00002* (2020.01); *G05B 19/042* (2013.01); *H02J 3/381* (2013.01); *G05B 2219/2639* (2013.01); *H02J 2203/20* (2020.01)

(58) Field of Classification Search
None
See application file for complete search history.

(56) References Cited

U.S. PATENT DOCUMENTS

| 8,002,984 B1 * | 8/2011 | Wanielista | B01J 20/043 |
| | | | 210/691 |
| 8,215,164 B1 * | 7/2012 | Hussain | E21B 47/10 |
| | | | 73/152.33 |

(Continued)

FOREIGN PATENT DOCUMENTS

| CN | 103106625 A | * | 5/2013 | ............ G06F 30/18 |
| CN | 104701871 A |   | 6/2015 | |

(Continued)

OTHER PUBLICATIONS

Assfaw, M.T., "Hydraulic Modeling of Water Supply Distribution Network: A Case Study on Debre Birhan Town, Amhara Regional State, Ethiopia", Nov. 2016, Jimma University School of Graduate Studies Jimma Institute of Technology. (Year: 2016).*

(Continued)

*Primary Examiner* — Mohammad Ali
*Assistant Examiner* — Kelvin Booker

(57) ABSTRACT

A method for flexible coordinated operation of an urban distribution network and a watershed network, including: constructing a watershed network dynamic operation model; constructing a river water storage model a lake water storage model based on the watershed network dynamic operation model; constructing a distribution network linear alternating-current (AC) power flow model and an operating power-flow rate operation model of the pump stations to obtain a coordinated operation model of the urban distribution network and the watershed network; constructing a watershed-electricity composite sensitivity matrix; quantifying a time-varying adjustable power domain of each pump station through a pump station flexibility assessment method based on the watershed-electricity composite sensitivity matrix; constructing a power flow optimization model of the urban distribution network and a hydraulic energy flow optimization model of the watershed network; and performing elec- (Continued)

tricity-water energy flow interactive optimization involving a flexible resource of the pump stations.

16 Claims, 5 Drawing Sheets

(51) Int. Cl.
  *G05B 19/042* (2006.01)
  *H02J 3/38* (2006.01)

(56) References Cited

U.S. PATENT DOCUMENTS

| | | | |
|---|---|---|---|
| 9,951,748 B2* | 4/2018 | Bateham | F04B 1/148 |
| 10,371,119 B2* | 8/2019 | Bateham | F04B 1/145 |
| 2008/0109175 A1* | 5/2008 | Michalak | E03B 7/02 |
| | | | 702/50 |
| 2011/0169264 A1* | 7/2011 | Choate | F03B 13/06 |
| | | | 290/43 |
| 2012/0279578 A1* | 11/2012 | Brown | E02B 3/062 |
| | | | 137/15.01 |
| 2013/0099499 A1* | 4/2013 | Levin | F03B 17/063 |
| | | | 290/52 |
| 2014/0217732 A1* | 8/2014 | Levin | F03B 17/063 |
| | | | 290/52 |
| 2014/0350737 A1* | 11/2014 | Goodman | G06F 30/20 |
| | | | 700/282 |
| 2015/0013327 A1* | 1/2015 | Bateham | F03B 13/264 |
| | | | 60/497 |
| 2018/0100482 A1* | 4/2018 | Bateham | F04B 1/295 |
| 2019/0354873 A1* | 11/2019 | Pescarmona | G06N 3/02 |
| 2020/0074023 A1* | 3/2020 | Nizami | A01C 21/007 |
| 2020/0161934 A1 | 5/2020 | Ramamurthy et al. | |

FOREIGN PATENT DOCUMENTS

| | | | | |
|---|---|---|---|---|
| CN | 110298076 A | | 10/2019 | |
| CN | 110428110 A | | 11/2019 | |
| CN | 112163382 A | * | 1/2021 | ............. G06F 30/18 |
| CN | 111709134 B | * | 5/2021 | ............. G06Q 50/06 |
| CN | 112950096 A | * | 6/2021 | ............. G06N 3/006 |
| CN | 113642760 A | * | 11/2021 | ........... G06Q 10/043 |
| CN | 113725915 A | | 11/2021 | |
| CN | 116011731 A | * | 4/2023 | ......... G06Q 10/0635 |
| CN | 116306340 A | * | 6/2023 | ............. G06F 30/28 |
| CN | 116341910 A | * | 6/2023 | ......... G06Q 10/0635 |
| CN | 117557066 A | * | 2/2024 | ......... G06Q 10/0631 |
| JP | 2856601 B2 | * | 2/1999 | ......... G06Q 10/0631 |
| JP | 2007039918 A | * | 2/2007 | ............. G06F 30/28 |
| WO | 2019233134 A1 | | 12/2019 | |

OTHER PUBLICATIONS

Cao et al., "Dynamic Modelling and Mutual Coordination of Electricity and Watershed Networks for Spatio-Temporal Operational Flexibility Enhancement Under Rainy Climates", Jul. 2022, IEEE Transactions on Smart Grid, vol. 14, No. 5. (Year: 2022).*
Amjath-Babu et al., "Integrated modelling of the impacts of hydropower projects on the waterfood-energy nexus in a transboundary Himalayan river basin", Jun. 2018, Applied Energy 239 (2019) 494-503. (Year: 2018).*
Vilanova et al., "Hydropower recovery in water supply systems: Models and case study", Feb. 2014, Energy Conversion and Management 84 (2014) 414-426. (Year: 2014).*
Kuan Zhang et al., "Optimal Coordinated Control of Multi-Renewable-to-Hydrogen Production System for Hydrogen Fueling Stations", IEEE Transactions on Industry Applications, Entire document.
Kuan Zhang et al., "A Multilateral Transactive Energy Framework of Hybrid Charging Stations for Low-Carbon Energy-Transport Nexus",IEEE Transactions on Industrial Informatics, vol. 18, No. 11, Nov. 2022, Entire document.
Haiming Zhao et al., "Investigating the Optimal Pumping Operations by ANFIS Models", China Water Transport, vol. 19, No. 5, May 2019, Entire document.
Jitong Li et al., "Multi-level planning method of energy storage stations for resilient distribution networks considering spatio-temporal correlation of severe weather",Power System Protection and Control, Entire document.
Ning Xie et al., "Dynamic Modeling and Characteristic Analysis on Harmonics of Photovoltaic Power Stations", Proceedings of the CSEE, vol. 33 No. 36 Dec. 25, 2013, pp. 10-17.

* cited by examiner

METHOD FOR FLEXIBLE COORDINATED OPERATION OF URBAN DISTRIBUTION NETWORK AND WATERSHED NETWORK

CROSS-REFERENCE TO RELATED APPLICATIONS

This application claims the benefit of priority from Chinese Patent Application No. 202211081610.X, filed on Sep. 6, 2022. The content of the aforementioned application, including any intervening amendments thereto, is incorporated herein by reference in its entirety.

TECHNICAL FIELD

The present application relates to power distribution networks, and more particularly to a method for flexible coordinated operation of an urban distribution network and a watershed network.

BACKGROUND

Electric-driven drainage pump stations are important water pumping facilities in the watershed network, which can convert electrical energy into hydraulic energy for drainage or water supply. It has been published by the International Energy Agency (IEA) that 4% of the world's electricity generation is consumed by the pump station load of the watershed network, and the electricity consumption of electric-driven drainage pump equipment accounts for about 90% of the total energy consumption of the watershed network. Therefore, the urban distribution network is closely coupled with the watershed network to form an electricity-watershed interconnection network.

Under rainy climates, the electrical load of pump stations will generally experience a sharp increase to avoid the overflow of tributaries. Especially in the summer with frequent rainfall, the sharp load increase of the pump stations overlaps with the peak load of the air conditioner cluster, which enlarges the peak-valley load difference of the power distribution system, and poses challenges to the secure and economic operation of the power distribution system and the peak shaving.

The watershed network has natural water storage capacity, and can temporarily store rainwater in rivers and lakes. The pump stations can pump part of the overflow water from the tributary channels to the main channel in advance, so that the load of the pump stations can be reduced or shifted to the off-peak period in the peak period of the distribution network. Accordingly, the watershed network can provide abundant flexible resources for the operation of the distribution network to alleviate the pressure of energy supply during the peak period. Through the flexible coordinated operation of the urban distribution network and watershed network, the peak shaving and valley filling of power consumption profile and supply-demand dynamic balance of the distribution network can be realized easily under rainy climates.

By means of the natural water storage capacity of rivers and lakes, the watershed network can enhance the spatio-temporal drainage flexibility of the electric-driven pump stations, so as to provide abundant and adjustable low-cost flexible resources for the distribution networks. Unfortunately, considering the dynamic characteristics of the watershed network and uneven spatio-temporal distribution of rainfall, it is difficult to accurately quantify the impact of power increment of the pump station on the river water level and flow rate, and it is also difficult to reliably evaluate the spatio-temporal flexibility of the electric-driven pump station. In addition, the complex hydrodynamic characteristics of the watershed network are characterized by a set of nonlinear hyperbolic partial differential equations, resulting in the presence of a large number of nonlinear partial differential constraints in the hydraulic energy flow optimization model of the watershed network. It is difficult to solve the high-dimensional nonlinear optimization model by the existing optimization algorithms.

Therefore, it is urgently needed to provide a method for flexible coordinated operation of the urban distribution network and watershed network to evaluate and quantify the spatio-temporal flexible resources for the load of the electric-driven drainage pump stations, and to optimize the electricity-water energy flow to fully exert the flexible resources of the watershed network, so as to relieve the power supply pressure of the distribution network during the peak period and facilitate the secure and economic operation of the distribution network.

SUMMARY

An object of this disclosure is to provide a method for flexible coordinated operation of an urban distribution network and a watershed network to evaluate and quantify the spatio-temporal flexible resources for a load of the electric-driven drainage pump station.

Technical solutions of this application are specifically described as follows.

In a first aspect, this application provides a system for flexible coordinated operation of an urban distribution network and a watershed network, comprising:
  one or more generators configured to provide electrical energy to one or more drainage pump stations distributed in the watershed network;
  a distribution network coupled to the one or more generators, the one or more drainage pump stations and a main grid, wherein the distribution network is configured to transmit electrical energy; and
  a controller;
  wherein the controller comprises a processor and a memory coupled to the processor; and the controller is in communication with the one or more generators, the one or more drainage pump stations, and the main grid;
  wherein the controller is configured to perform:
  (a) constructing a watershed network dynamic operation model based on a de Saint-Venant nonlinear-hyperbolic-partial differential equation system;
  (b) constructing a river water storage model and a lake water storage model based on the watershed network dynamic operation model;
  (c) constructing a distribution network linear alternating-current (AC) power flow model; and based on the watershed network dynamic operation model and the distribution network linear AC power flow model, constructing an operating power-flow rate operation model of the one or more drainage pump stations to obtain a coordinated operation model of the urban distribution network and the watershed network;
  (d) constructing a watershed-electricity composite sensitivity matrix by using Taylor series expansion to reflect a mathematical relationship between variation of water level at individual points of the watershed network and a power increment of the one or more drainage pump stations, and a mathematical relationship between variation of flow rate at individual points of the watershed network and the power increment of the one or more drainage pump stations;
(e) quantifying a time-varying adjustable power domain of a load of each of the one or more drainage pump stations through a pump station flexibility assessment method based on the watershed-electricity composite sensitivity matrix;
(f) constructing a power flow optimization model of the urban distribution network and a hydraulic energy flow optimization model of the watershed network; and converting a non-convex nonlinear hydraulic energy flow optimization problem into a mixed-integer linear programming problem through a multidimensional piecewise linearization method; and
(g) based on the coordinated operation model, the time-varying adjustable power domain, the flexibility assessment method, the power flow optimization model and the hydraulic energy flow optimization model, performing electricity-water energy flow interactive optimization involving a flexible resource of the one or more drainage pump stations to realize the flexible coordinated operation of the urban distribution network and the watershed network.

In a second aspect, this application provides a method for flexible coordinated operation of an urban distribution network and a watershed network, comprising:
(a) constructing a watershed network dynamic operation model based on a de Saint-Venant nonlinear-hyperbolic-partial differential equation system;
(b) constructing a river water storage model and a lake water storage model based on the watershed network dynamic operation model;
(c) constructing a distribution network linear AC power flow model; and based on the watershed network dynamic operation model and the distribution network linear AC power flow model, constructing an operating power-flow rate operation model of the one or more drainage pump stations to obtain a coordinated operation model of the urban distribution network and the watershed network;
(d) constructing a watershed-electricity composite sensitivity matrix by using Taylor series expansion to reflect a mathematical relationship between variation of water level at individual points of the watershed network and a power increment of the one or more drainage pump stations, and a mathematical relationship between variation of flow rate at individual points of the watershed network and the power increment of the one or more drainage pump stations;
(e) quantifying a time-varying adjustable power domain of a load of each of the one or more drainage pump stations through a pump station flexibility assessment method based on the watershed-electricity composite sensitivity matrix, wherein the time-varying adjustable power domain is quantified through steps of:
estimating the time-varying adjustable power domain of each of the one or more drainage pump stations;
successively calculating the watershed-electricity composite sensitivity and an adjustment amount; and
correcting the time-varying adjustable power domain until there is no water level out of a preset limit;
(f) constructing a power flow optimization model of the urban distribution network and a hydraulic energy flow optimization model of the watershed network; and converting a non-convex nonlinear hydraulic energy flow optimization problem into a mixed-integer linear programming problem through a multidimensional piecewise linearization method; and
(g) based on the coordinated operation model, the time-varying adjustable power domain, the flexibility assessment method, the power flow optimization model and the hydraulic energy flow optimization model, performing electricity-water energy flow interactive optimization involving a flexible resource of the one or more drainage pump stations to realize the flexible coordinated operation of the urban distribution network and the watershed network.

In some embodiments, step (a) comprises:
characterizing water level and flow rate states along a channel by the de Saint-Venant nonlinear-hyperbolic-partial differential equation system to obtain a mass conservation equation and a momentum conservation equation, wherein the mass conservation equation is expressed as:

$$\frac{\partial A}{\partial t} + \frac{\partial Q}{\partial x} = r; \tag{1}$$

and
the momentum conservation equation is expressed as:

$$\frac{\partial Q}{\partial t} + \frac{\partial}{\partial x}\left[\frac{Q^2}{A}\right] + gA\frac{\partial H}{\partial x} = gA(S_b - S_f); \tag{2}$$

wherein $S_f$ is expressed as:

$$S_f = \left(M^2 Q|Q|l^{\frac{4}{3}}\right) \Big/ A^{\frac{10}{3}}; \tag{3}$$

wherein t is time; x represents a longitudinal distance along the channel direction; Q represents volumetric flow rate; A represents a cross-sectional area of a water flow; H represents a water level; g is gravitational acceleration; $S_b$ represents a river bed slope; $S_f$ represents a friction slope; M represents Manning coefficient; l represents channel wetted perimeter; and r represents rainfall intensity.

In some embodiments, step (a) further comprises:
simplifying the mass conservation equation to:

$$\frac{\partial H}{\partial t} + \frac{\partial q}{\partial x} = \frac{r}{B}; \tag{4}$$

simplifying the momentum conservation equation to:

$$\frac{\partial q}{\partial t} + \frac{\partial}{\partial x}\left[\frac{q^2}{H} + \frac{gH^2}{2}\right] = g\left[S_b - \frac{M^2 q^2 (2H+B)^{4/3}}{H^{7/3} B^{4/3}}\right]; \tag{5}$$

wherein B represents a channel width; A=BH; Q=BHV; V represents a flow velocity; l=B+2H; q represents a flow rate per unit channel width;
obtaining an approximate discrete form of the de Saint-Venant nonlinear-hyperbolic-partial differential equation system by using a Preissmann four-point implicit scheme;

dividing a continuous spatio-temporal domain C={(x, t)|0≤x≤L, 0≤t≤T} into a plurality of rectangular grids according to a spatial step $\Delta x$ and a time step $\Delta t$, wherein L represents a channel length; T represents a finite time horizon; individual vertices at each of the plurality of rectangular grids are indexed as (j, n); n represents a time index; j represents a spatial index; $T^w$={0, 1, 2, ..., N}, representing a time index set; N represents a maximum time index; $L^w$={0, 1, 2, ..., J}, representing a spatial index set; J represents a maximum spatial index; Dt=T/N; Dx=L/J; and (j, n)$\in L^w \times T^w$;

performing spatio-temporal discretization on equations (4) and (5) based on the Preissmann four-point implicit scheme to obtain equations (6)-(9):

$$f_1(H_{j+1}^{n+1}, H_j^{n+1}, q_{j+1}^{n+1}, q_j^{n+1}) := \qquad (6)$$

$$\frac{H_{j+1}^{n+1} - H_{j+1}^n + H_j^{n+1} - H_j^n}{2\Delta t} + \theta\left(\frac{q_{j+1}^{n+1} - q_j^{n+1}}{\Delta x}\right) +$$

$$(1-\theta)\left(\frac{q_{j+1}^n - q_j^n}{\Delta x}\right) - \frac{1}{B}\left[\frac{\theta}{2}(r_{j+1}^{n+1} + r_j^{n+1}) + \frac{1-\theta}{2}(r_{j+1}^n + r_j^n)\right] = 0;$$

$$f_2(H_{j+1}^{n+1}, H_j^{n+1}, q_{j+1}^{n+1}, q_j^{n+1}) := \qquad (7)$$

$$\frac{q_{j+1}^{n+1} - q_j^{n+1} + q_{j+1}^n - q_j^n}{2\Delta t} - \theta(I_{j+1}^{n+1} + R_{j+1}^{n+1}) - gS_b - (1-\theta)(I_j^n + R_j^n) = 0;$$

$$I_j^n = \left(-\frac{gM^2}{2}\frac{(q_j^n)^2(2H_j^n + B_j^n)^{4/3}}{(H_j^n)^{7/3}(B_j^n)^{4/3}} - \frac{1}{\Delta x}\frac{(q_j^n)^2}{H_j^n} - \frac{g(H_j^n)^2}{2\Delta x}\right); \text{ and} \qquad (8)$$

$$R_j^n = \left(-\frac{gM^2}{2}\frac{(q_j^n)^2(2H_j^n + B_j^n)^{4/3}}{(H_j^n)^{7/3}(B_j^n)^{4/3}} + \frac{1}{\Delta x}\frac{(q_j^n)^2}{H_j^n} + \frac{g(H_j^n)^2}{2\Delta x}\right); \qquad (9)$$

wherein $\theta$ represents a weight coefficient to ensure unconditional stability, and is selected from [0,1]; if $\theta \geq 0.5$, the Preissmann four-point implicit scheme is unconditionally stable; $H_{j+1}^{n+1}$ represents a water level at point (j+1, n+1); $H_j^{n+1}$ represents a water level at point (j, n+1); $q_j^{n+1}$ represents a flow rate per unit channel width at the point (j+1, n+1); $q_j^+$ represents a flow rate per unit channel width at the point (j, n+1); $q_j^n$ represents a flow rate per unit channel width at point (j, n); $r_{j+1}^{n+1}$ represents a rainfall intensity at the point (j+1, n+1); $r_j^{n+1}$ represents a rainfall intensity at the point (j, n+1); $I_{j+1}^{n+1}$ represents an I value defined by equation (8) at the point (j+1, n+1); $R_j^{n+1}$ represents an R value defined by equation (9) at the point (j, n+1); and B represents a channel width at the point (j, n);

performing spatio-temporal discretization on each channel in the watershed network based on Preissmann four-point implicit scheme according to equations (6)-(9);

determining an initial condition and a boundary condition to ensure closure and uniqueness of equations (6)-(9) with spatio-temporal discretization;

wherein the initial condition comprises an initial water level distribution and an initial flow rate distribution observed by a hydrological station, expressed as:

$$H_{j,I}^0 = H_I^{ini}(x=j\Delta x), \forall j \in L_I^w, \forall I \in \Omega \qquad (10),$$

$$q_{j,I}^0 = q_I^{ini}(x=j\Delta x), \forall j \in L_I^w, \forall I \in \Omega \qquad (11); \text{ and}$$

the boundary condition comprises an upstream boundary condition and a downstream boundary condition, expressed as:

$$f_I^u = f(H_{1,I}^n, q_{1,I}^n), f_I^d = f(H_{J_I,I}^n, q_{J_I,I}^n), \forall n \in T^w, \forall I \in \Omega \qquad (12),$$

wherein $H_{j,I}^n$ represents a water level of channel I at the point (j, n); $q_{j,I}^n$ represents a flow rate of the channel I at the point (j, n); $H_{j,I}^0$ represents a water level of the channel I at point (j, 0); $q_{j,I}^n$ represents a flow rate of the channel I at the point (j, 0); $\Omega$ represents a channel set; $H_I^{ini}(x)$ represents a given initial water level of the channel I along direction x; $q_I^{ini}(x)$ represents a given initial flow rate of the channel I along the direction x; $f_I^u$ represents an upstream boundary condition of the channel I; $f_I^d$ represents a downstream boundary condition of the channel I; $L_I^w$={0, 1, 2, ..., $J_I$}, representing a spatial index set of the channel I; and $J_I$ represents a maximum spatial index of the channel I;

limiting flow rate and water level respectively to a preset range, expressed as:

$$Q_I^{min} \leq B_I q_{j,I}^n \leq Q_I^{max}, H_I^{min} \leq H_{j,I}^n \leq H_I^{max}, \forall I \in \Omega, \forall n \in T^w, \forall j \in L_I^w \qquad (13),$$

wherein $B_I$ represents a width of the channel I; $Q_I^{max}$ represents an upper bound of a flow rate of the channel I; $H_I^{max}$ represents an upper bound of a water level of the channel I; $Q_I^{max}$ represents a lower bound of the flow rate of the channel I; and $H_I^{min}$ represents a lower bound of the water level of the channel I; and water levels of channels are the same at a confluent node z, expressed as:

$$H_{j,m}^n = H_{j,i}^n, \forall m \in \Omega_{z+}, \forall i \in \Omega_{z-}, \forall n \in T^w, \forall z \in Z \qquad (14); \text{ and}$$

considering that an inflow of the confluent node z is equal to an outflow of the confluent node z according to mass conservation principle, deducing equation (15):

$$\sum_{m \in \Omega_{z+}} q_{J_m,m}^n B_m + \sum_{k \in P_z} \alpha_{k,n}^p q_{k,n}^p = \sum_{i \in \Omega_{z-}} q_{0,i}^n B_i, \forall n \in T^w, \forall z \in Z; \qquad (15)$$

wherein Z represents a confluent node set of the watershed network; $Q_{z+}$ represents a set of channels that flow into the confluent node z; $Q_{z-}$ represents a set of channels that flow out from the confluent node z; q represents a flow rate of a pump station k at time n; $P_z$ represents a set of pump stations connected to the confluent node z; $\alpha_{k,n}^P \in \{-1,1\}$ is a given value; $\alpha_{k,n}^P = -1$ denotes that the pump station k is configured to pump water at time n; $\alpha_{k,n}^P = 1$ denotes that the pump station k is configured to drain water at time n; m represents a channel number index; $q_{J_m,m}^n$ represents a flow rate per unit width of channel m at point ($J_m$, n); $B_m$ represents a width of the channel m; $B_i$ represents a width of channel i; and $q_{0,i}^n$ represents a flow rate per unit width of the channel i at point (0, n).

In some embodiments, step (b) comprises:

obtaining a water storage volume $S_{I,c}^n$ of the channel I at time n, expressed as:

$$S_{I,c}^n = \sum_{j=0}^{J_I-1} \frac{(H_{j,I}^n + H_{j+1,I}^n)}{2} B_I \Delta x, \forall I \in \Omega, \forall n \in T^w; \qquad (16)$$

wherein the water storage volume $S_{I,c}^n$ is limited to a preset range, expressed as:

$$S_{I,c,min}^n \leq S_{I,c}^n \leq S_{I,c,max}^n, \forall I \in \Omega, \forall n \in T^w \qquad (17),$$

wherein $H_{j,I}^n$ represents a water level of the channel I at the point (j, n); $B_i$ represents a width of the channel I;

$S_{I,c,min}{}^n$ represents a minimum water storage volume of the channel I; $S_{I,c,max}{}^n$ represents a maximum water storage volume of the channel I; $J_I$ represents a maximum spatial index of the channel I;

acquiring a relationship between water discharge and water level of lake k at each period, expressed as:

$$A_{k,a} \frac{H_{k,a}^{n+1} - H_{k,a}^n}{\Delta t} = r_k^n(A_{k,a} + \alpha_{k,a}F_{k,a}) - \sum_{i \in k_p} \alpha_{i,n}^p q_{i,n}^p, \quad (18)$$

$\forall k \in K, \forall n \in T^w;$ acquiring a current volume of the lake k, expressed as:

$S_{k,a}{}^n = A_{k,a}H_{k,a}{}^n, \forall k \in K, \forall n \in T^w$ \hfill (19); and acquiring a constraint for secure operation of the lake k, expressed as:

$S_{k,a,min} \leq S_{k,a}{}^n \leq S_{k,a,max}, \forall k \in K, \forall n \in T^w$ \hfill (20);

wherein $A_{k,a}$ represents an area of the lake k; $H_{k,a}{}^n$ represents a water level of the lake k at time n; $\alpha_{k,a}$ represents a runoff coefficient of the lake k; $F_{k,a}$ represents a catchment area of the lake k; $S_{k,a}{}^n$ represents a water storage volume of the lake k at time n; $S_{k,a,min}$ represents a minimum water storage volume of the lake k; $S_{k,a,max}$ represents a maximum water storage volume of the lake k; K represents a lake set; $k_p$ represents a set of pump stations connected to the lake k; $q_{i,n}{}^p$ represents a flow rate of the pump station i at time n; $r_k{}^n$ represents a rainfall intensity at the lake k at time n; and $\alpha_{i,n}{}^p$ represents an operation state of the pump station i at time n.

In some embodiments, step (c) comprises:

constructing the distribution network linear AC power flow model to characterize power flow constraints, generator operating constraints and bus power balance constraints;

wherein an active power flow of line ij is expressed as:

$$P_{ij,n} = \frac{r_{ij}x_{ij}}{r_{ij}^2 + x_{ij}^2} \cdot \frac{(V_{i,n} - V_{j,n})}{x_{ij}} + \frac{x_{ij}^2}{r_{ij}^2 + x_{ij}^2} \cdot \frac{(\delta_{i,n} - \delta_{j,n})}{x_{ij}}, \forall n \in T^*; \quad (21)$$

a reactive power flow of the line ij is expressed as:

$$Q_{ij,n}^e = \frac{-r_{ij}x_{ij}}{r_{ij}^2 + x_{ij}^2} \cdot \frac{(\delta_{i,n} - \delta_{j,n})}{x_{ij}} + \frac{x_{ij}^2}{r_{ij}^2 + x_{ij}^2} \cdot \frac{(V_{i,n} - V_{j,n})}{x_{ij}}, \quad (22)$$

$\forall n \in T^*;$ wherein $r_{ij}$ represents a resistance of the line ij; $x_{ij}$ represents a reactance of the line ij; $P_{ij,n}$ represents an active power flowing from bus i to bus j at time n; $Q_{ij,n}^e$ represents a reactive power flowing from the bus i to the bus j at time n; $\delta_{j,n}$ represents a phase angle of the bus j at time n; $V_{j,n}$ represents a voltage amplitude of the bus j at time n; $\delta_{i,n}$ represents a phase angle of the bus i at time n; $V_{i,n}$ represents a voltage amplitude of the bus i at time n; and $T^*=\{1, 2, \ldots, N\}$, representing a time index set of the urban distribution network; and the reactive power flow and the active power flow of the line ij and the voltage amplitude of the bus j satisfy the following security constraints:

$$\begin{cases} -S_{ij} \leq P_{ij,n} \leq S_{ij} \\ -S_{ij} \leq Q_{ij,n}^e \leq S_{ij} \end{cases}, \forall n \in T^*; \text{ and} \quad (23)$$

$$V_j^{min} \leq V_{j,n} \leq V_j^{max}, \forall n \in T^*; \quad (24)$$

wherein $S_{ij}$ represents a rated apparent power capacity of the line ij; $V_j^{min}$ represents a minimum voltage allowed for the bus j; and $V_j^{max}$ represents a maximum voltage allowed for the bus j;

acquiring an output power limit of a distributed generator g, expressed as:

$P_{g,min}{}^{CDG} \leq P_{g,n}{}^{CDG} \leq P_{g,max}{}^{CDG}, \forall g \in G, \forall n \in T^*$ \hfill (25);

acquiring a ramp limit of the distributed generator g, expressed as:

$R_{g,down}{}^{CDG} \leq P_{g,n}{}^{CDG} - P_{g,n-1}{}^{CDG} \leq R_{g,up}{}^{CDG}, \forall g \in G, \forall n \in T^*$ \hfill (26);

acquiring a capacity limit of the distributed generator g, expressed as:

$$\begin{cases} -S_g^{CDG} \leq P_{g,n}^{CDG} \leq S_g^{CDG} \\ -S_g^{CDG} \leq Q_{g,n}^{CDG} \leq S_g^{CDG} \end{cases}, \forall g \in G, \forall n \in T^*; \quad (27)$$

and acquiring power balance constraints for buses, expressed as:

$$\sum_{ij \in \Lambda_{j+,m}} P_{ij,n} + \sum_{g \in G_j} P_{g,n}^{CDG} - \sum_{p \in P_j} P_{p,n}^{fle} - \sum_{p \in P_j} P_{p,n}^p - P_{j,n}^{load} = \sum_{jk \in \Lambda_{j-}} P_{jk,n}, \quad (28)$$

$\forall j \in J, \forall n \in T^*;$ and $$\sum_{ij \in \Lambda_{j+,m}} Q_{ij,n}^e + \sum_{g \in G_j} Q_{g,n}^{CDG} - \sum_{p \in P_j} Q_{p,n}^p - Q_{j,n}^{load} = \sum_{jk \in \Lambda_{j-}} Q_{jk,n}, \quad (29)$$

$\forall j \in J, \forall n \in T^*;$ wherein $P_{g,n}{}^{CDG}$ represents an active power generated by the distributed generator g at time n; $Q_{g,n}{}^{CDG}$ represents a reactive power generated by the distributed generator g at time n; $P_{g,max}{}^{CDG}$ represents a maximum allowable output power of the distributed generator g; $P_{g,min}{}^{CDG}$ represents a minimum allowable output power of the distributed generator g; $R_{g,up}{}^{CDG}$ represents a maximum allowable ramp rate of the distributed generator g; $R_{g,down}{}^{CDG}$ represents a minimum allowable ramp rate of the distributed generator g; G represents a generator set; $G_j$ represents a set of generators connected to the bus j; $P_j$ represents a set of pump stations connected to the bus j; J represents a bus set of the urban distribution network; $\Lambda_{j+}$ represents a set of lines whose power flows into the bus j; $\Lambda_-$ represents a set of lines whose power flows out from the bus j; $P_{j,n}{}^{load}$ represents an active load at the bus j except for a pump station load at time n; $Q_{j,n}{}^{load}$ represents a reactive load at the bus j except for the pump station load at time n; $P_{p,n}{}^{fle}$ represents a flexibility amount offered by pump station p at time n; $S_g{}^{CDG}$ is a rated apparent capacity for the distributed generator g; $P_{jk,n}$ represents an active power flow on line jk at time n; $P_{p,n}{}^p$ represents an active load of the pump station p at time n; and $Q_{p,n}{}^p$ represents a reactive load of the pump station p at time n.

In some embodiments, step (c) further comprises:

acquiring an operating power-flow rate relationship for pump stations, expressed as:

$$P_{i,n}^p = \frac{\rho g H_i^{st} q_{i,n}^p}{1000\eta_i^p}, \forall i \in P, \forall n \in T^*; \quad (30)$$

acquiring pump station power limits, expressed as:

$$-R_i^P \leq P_{i,n}^P - P_{i,n-1}^P \leq R_i^P, \forall i \in P, \forall n \in T^* \quad (31); \text{ and}$$

$$P_{i,min}^P \leq P_{i,n}^P \leq P_{i,max}^P, \forall i \in P, \forall n \in T^* \quad (32); \text{ and}$$

acquiring a pump station reactive load constraint, expressed as:

$$Q_{i,n}^P = P_{i,n}^P \tan(\arccos(\phi_i^P)), \forall i \in P, \forall n \in T^* \quad (33);$$

wherein P represents a set of pump stations in the watershed network; $P_{i,n}^P$ represents an active load of the pump station i at time n; $Q_{i,n}^P$ represents a reactive load of the pump station i at time n; $\eta_i^P$ represents an operation efficiency of the pump station i; $R_i^P$ represents a maximum ramp rate of the pump station i; $H_i^{st}$ represents a water head of the pump station i; $\rho$ is water density; $P_{i,min}^P$ represents a lower bound of the reactive load of the pump station i; $P_{i,max}^P$ represents an upper bound of the active load of the pump station i; and $\phi_i^P$ is a power factor of the pump station i.

In some embodiments, step (d) comprises:

based on Taylor series expansion, expanding equations (6) and (7) into:

$$f_{\{1,2\}}\begin{Bmatrix} H_{j+1}^n + \Delta H_{j+1}, \\ H_j^n + \Delta H_j, \\ q_{j+1}^n + \Delta q_{j+1}, \\ q_j^n + \Delta q_j \end{Bmatrix} = \begin{Bmatrix} f_{\{1,2\}}(H_{j+1}^n, H_j^n, q_{j+1}^n, q_j^n) + \frac{\partial f_{\{1,2\}}}{\partial H_{j+1}^n}\Delta H_{j+1} \\ + \frac{\partial f_{\{1,2\}}}{\partial H_j^n}\Delta H_j + \frac{\partial f_{\{1,2\}}}{\partial q_{j+1}^n}\Delta q_{j+1} + \frac{\partial f_{\{1,2\}}}{\partial q_j^n}\Delta q_j \end{Bmatrix}; \quad (34)$$

wherein $f_{\{1,2\}}$ represents a collective name for defined functions $f_1$ and $f_2$; subscripts 1 and 2 of the $f_{\{1,2\}}$ represent selection of function $f_1$ or function $f_2$; $\Delta H_j$ represents a variation of a water level at point (j, n) after adjusting a pump station power; $H_j^n$ represents a water level at the point (j, n); $\Delta q_j$ represents a variation of a flow rate at the point (j, n) after adjusting the pump station power; and $q_j^n$ represents a flow rate at the point (j, n);

acquiring a sensitivity matrix of individual channels under different disturbances at time n, expresses as:

$$\underbrace{\begin{bmatrix} a_0 & b_0 & 0 & 0 & 0 & 0 & \cdots & 0 & 0 & 0 & 0 \\ a_1 & b_1 & c_1 & d_1 & 0 & 0 & \cdots & 0 & 0 & 0 & 0 \\ a_2 & b_2 & c_2 & d_2 & 0 & 0 & \cdots & 0 & 0 & 0 & 0 \\ 0 & 0 & a_3 & b_3 & c_3 & d_3 & \cdots & 0 & 0 & 0 & 0 \\ 0 & 0 & a_4 & b_4 & c_4 & d_4 & \cdots & 0 & 0 & 0 & 0 \\ \vdots & \vdots & \vdots & \vdots & \vdots & \vdots & \ddots & \vdots & \vdots & \vdots & \vdots \\ 0 & 0 & 0 & 0 & 0 & 0 & \cdots & a_{2J-3} & b_{2J-3} & b_{2J-3} & d_{2J-3} \\ 0 & 0 & 0 & 0 & 0 & 0 & \cdots & a_{2J-2} & a_{2J-2} & c_{2J-2} & d_{2J-2} \\ 0 & 0 & 0 & 0 & 0 & 0 & \cdots & 0 & 0 & c_{2J} & d_{2J} \end{bmatrix}}_{M} \underbrace{\begin{bmatrix} \Delta H_0 \\ \Delta q_0 \\ \Delta H_1 \\ \Delta q_1 \\ \vdots \\ \Delta H_{J-1} \\ \Delta q_{J-1} \\ \Delta H_J \\ \Delta q_J \end{bmatrix}}_{\Delta X} = \underbrace{\begin{bmatrix} F_1 \\ F_2 \\ F_3 \\ F_4 \\ \vdots \\ F_{2J-3} \\ F_{2J-2} \\ F_{2J-1} \\ F_{2J} \end{bmatrix}}_{F}; \quad (35)$$

wherein M represents a sensitivity coefficient matrix; $\Delta X$ represents a variation matrix of water level and flow rate at points; F represents a constant matrix at a current time; elements in the M and elements in the F are constants; the elements in the M are partial derivatives of water level and flow rate at time n; the elements in the F are products of space-time difference results of the $f_1$ or $f_2$ and $-Dt$; $a_0$, $b_0$ and $F_1$ are determined by the upstream boundary condition; and $c_{2J}$, $d_{2J}$ and $F_{2J}$ are determined by the downstream boundary condition; and the elements in the M are obtained through the following equation:

$$\begin{cases} a_{2j-1} = \frac{\partial f_1}{\partial H_{j-1}^n}, b_{2j-1} = \frac{\partial f_1}{\partial q_{j-1}^n}, c_{2j-1} = \frac{\partial f_1}{\partial H_j^n}, d_{2j-1} = \frac{\partial f_1}{\partial q_j^n} \\ a_{2j} = \frac{\partial f_2}{\partial H_{j-1}^n}, b_{2j} = \frac{\partial f_2}{\partial q_{j-1}^n}, c_{2j} = \frac{\partial f_2}{\partial H_j^n}, d_{2j} = \frac{\partial f_2}{\partial q_j^n} \\ a_0 = \frac{\partial f^u}{\partial H_0^n}, b_0 = \frac{\partial f^u}{\partial q_0^n}, c_{2J} = \frac{\partial f^d}{\partial H_J^n}, d_{2J} = \frac{\partial f^d}{\partial q_J^n} \end{cases} \quad (36)$$

obtaining a relationship between a power increment of a pump station and a flow rate increment at point (j, n) where the pump station is located through equations (37) and (38):

$$\frac{\partial f_{\{1,2\}}}{\partial P_{P_I,n}^p} = \frac{\partial f_{\{1,2\}}}{\partial q_j^n} \frac{\partial q_j^n}{\partial q_{P_I,n}^p} \frac{\partial q_{P_I,n}^p}{\partial P_{P_I,n}^p}, \text{ and} \quad (37)$$

$$\frac{\partial q_j^n}{\partial q_{P_I,n}^p} \frac{\partial q_{P_I,n}^p}{\partial P_{P_I,n}^p} = \frac{1000\eta_{P_I}^p}{B_I \rho g H_{P_I}^{st}}; \quad (38)$$

wherein $P_I$ represents index of a pump station connected to the channel I; $\partial f_{\{1,2\}}/\partial P_{P_I,n}^P$ represents a partial derivative of $f_1$ or $f_2$ with respect to $P_{P_I,n}^P$; $P_{P_I,n}^P$ represents an active load of the pump station $P_I$ at time n; $q_{P_I,n}^P$ represents a flow rate of the pump station $P_I$ at time n; $H_{P_I}^{st}$ represents a water head of the pump station $P_I$; $\eta_{P_I}^P$ represents an operation efficiency of the pump station $P_I$;

plugging the equations (37) and (38) into the sensitivity matrix to expand the M into M', such that the watershed-electricity composite sensitivity matrix of individual channels is expressed as:

$$\underbrace{\begin{bmatrix} Z_{1,1} & Z_{1,2} & 0 & 0 & 0 & 0 & \cdots & 0 & 0 & 0 & 0 \\ Z_{2,1} & Z_{2,2} & Z_{2,3} & Z_{2,4} & 0 & 0 & \cdots & 0 & 0 & 0 & 0 \\ Z_{3,1} & Z_{3,2} & Z_{3,3} & Z_{3,4} & 0 & 0 & \cdots & 0 & 0 & 0 & 0 \\ \vdots & \vdots & \vdots & \vdots & \vdots & \vdots & \ddots & \vdots & \vdots & \vdots & \vdots \\ 0 & 0 & 0 & 0 & 0 & 0 & \cdots & Z_{4,1} & Z_{4,2} & Z_{4,3} & Z_{4,4} \\ 0 & 0 & 0 & 0 & 0 & 0 & \cdots & Z_{5,1} & Z_{5,2} & Z_{5,3} & Z_{5,4} \\ 0 & 0 & 0 & 0 & 0 & 0 & \cdots & 0 & 0 & Z_{6,1} & Z_{6,2} \end{bmatrix}}_{M'} \underbrace{\begin{bmatrix} \Delta H_0 \\ \Delta P_I^{p,u} \\ \Delta H_1 \\ \Delta q_1 \\ \vdots \\ \Delta H_{J-1} \\ \Delta q_{J-1} \\ \Delta H_J \\ \Delta P_I^{p,d} \end{bmatrix}}_{\Delta X'} = \underbrace{\begin{bmatrix} F_1 \\ F_2 \\ F_3 \\ F_4 \\ \vdots \\ F_{2J-3} \\ F_{2J-2} \\ F_{2J-1} \\ F_{2J} \end{bmatrix}}_{F};$$ (39)

wherein M' represents a sensitivity coefficient expansion matrix; ΔX' represents a variation expansion matrix of water level and flow rate; F represents a constant matrix at a current time; the elements in the F are products of the space-time difference results of the $f_1$ or $f_2$ and $-Dt$; $\Delta P_I^{p,u}$ represents a power increment of a pump station located upstream of the channel I; $\Delta P_I^{p,d}$ represents a power increment of a pump station located downstream of the channel I;

$Z_{1,1} = \frac{\partial f^u}{\partial H_0}; Z_{1,2} = \frac{\partial f^u}{\partial q_0} \frac{\partial q_0}{\partial q_I^{p,u}} \frac{\partial q_I^{p,u}}{\partial P_I^{p,u}}; Z_{2,1} = \frac{\partial f_1}{\partial H_0};$ $Z_{2,2} = \frac{\partial f_1}{\partial q_0} \frac{\partial q_0}{\partial q_I^{p,u}} \frac{\partial q_I^{p,u}}{\partial P_I^{p,u}}; Z_{2,3} = \frac{\partial f_1}{\partial H_1}; Z_{2,4} = \frac{\partial f_1}{\partial q_1};$ $Z_{3,1} = \frac{\partial f_1}{\partial q_1}; Z_{3,2} = \frac{\partial f_2}{\partial q_0} \frac{\partial q_0}{\partial q_I^{p,u}} \frac{\partial q_I^{p,u}}{\partial P_I^{p,u}}; Z_{3,3} = \frac{\partial f_2}{\partial H_1};$ $Z_{3,4} = \frac{\partial f_2}{\partial q_1}; Z_{4,1} = \frac{\partial f_1}{\partial H_{J-2}}; Z_{4,2} = \frac{\partial f_1}{\partial q_{J-2}}; Z_{4,3} = \frac{\partial f_1}{\partial H_{J-1}};$ $Z_{4,4} = \frac{\partial f_1}{\partial q_{J-1}} \frac{\partial q_{J-1}}{\partial q_I^{p,d}} \frac{\partial q_I^{p,d}}{\partial P_I^{p,d}}; Z_{5,1} = \frac{\partial f_2}{\partial H_{J-2}}; Z_{5,2} = \frac{\partial f_2}{\partial q_{J-2}};$ $Z_{5,3} = \frac{\partial f_2}{\partial H_{J-1}}; Z_{5,4} = \frac{\partial f_2}{\partial q_{J-1}} \frac{\partial q_{J-1}}{\partial q_I^{p,d}} \frac{\partial q_I^{p,d}}{\partial P_I^{p,d}};$ $Z_{6,1} = \frac{\partial f^d}{\partial H_J}; Z_{6,2} = \frac{\partial f^d}{\partial q_J} \frac{\partial q_J}{\partial q_I^{p,d}} \frac{\partial q_I^{p,d}}{\partial P_I^{p,d}};$ $q_I^{p,u}$ represents a flow rate of the pump station located upstream of the channel I; $q_I^{p,d}$ represents a flow rate of the pump station located downstream of the channel I; $P_I^{p,u}$ represents an active load of the pump station located upstream of the channel I; and $P_I^{p,d}$ represents an active load of the pump station located downstream of the channel I; and combining sensitivity matrices of all channels in the watershed network to obtain the watershed-electricity composite sensitivity matrix of the watershed network, expressed as:

$$\begin{bmatrix} M'_1 & 0 & 0 & \cdots & 0 & 0 \\ 0 & M'_2 & 0 & \cdots & 0 & 0 \\ 0 & 0 & \ddots & \cdots & 0 & 0 \\ 0 & \cdots & 0 & M'_I & \cdots & 0 \\ 0 & \cdots & \cdots & \cdots & \ddots & 0 \\ 0 & 0 & \cdots & 0 & 0 & M'_{I_*} \end{bmatrix} \begin{bmatrix} \Delta X'_1 \\ \Delta X'_2 \\ \vdots \\ \Delta X'_I \\ \vdots \\ \Delta X'_{I_*} \end{bmatrix} = \begin{bmatrix} F_1 \\ F_2 \\ \vdots \\ F_I \\ \vdots \\ F_{I_*} \end{bmatrix};$$ (40)

wherein $M'_I$ represents a sensitivity coefficient expansion matrix of the channel I; $\Delta X'_I$ represents $\Delta X'$ of the channel I, which represents a variation expansion matrix of water level and flow rate of the channel I; $F_I$ represents F of the channel I; and I* represents the number of channels in the watershed network.

the time-varying adjustable power domain is estimated through steps of:
obtaining a baseline active load of each pump station through optimal scheduling of the watershed network under a basic scenario; and estimating the time-varying adjustable power domain of an active load of each pump station using equation (41):

$$F_i^n = \left\{ \Delta P_{i,n}^p \in \Box \;\middle|\; \begin{array}{l} \underline{P}_i^p \leq \tilde{P}_{i,n}^p + \Delta P_{i,n}^p \leq \overline{P}_i^p, \forall i \in P \\ S_{i,a,min} \leq \tilde{S}_{i,a}^n + \dfrac{1000 \eta_{P_i}^p \Delta P_{P_i,n}^p \Delta t}{\rho g H_{P_i}^{st}} \leq S_{i,a,max}, \forall i \in P_a \\ S_{i,c,min} \leq \tilde{S}_{i,c}^n + \dfrac{1000 \eta_i^p \Delta P_{P_i,n}^p \Delta t}{\rho g H_{P_i}^{st}} \leq S_{i,c,max}, \forall i \in P_{ch} \\ \left| \tilde{P}_{i,n}^p + \Delta P_{i,n}^p \leq P_{i,n-1}^p \right| \leq R_i^p, \forall i \in P \end{array} \right\},$$ (41)

wherein $\overline{P}_i^p$ represents an upper limit of the active load of the pump station i; $\underline{P}_i^p$ represents a lower limit of the active load of the pump station i; $\tilde{S}_{i,n}$ represents a baseline storage volume of channel i or lake i; $\tilde{P}_{i,n}^p$ represents a baseline active load of the pump station i; $\Delta P_{i,n}^p$ represents a power adjustment of an active load of the pump station i; $F_i^n$ represents the time-varying adjustable power domain of the pump station i at time n; □ represents a real number set; $S_{i,a,min}$ represents a minimum storage volume of the lake i; $S_{i,a,max}$ represents a maximum storage volume of the lake i; $\tilde{S}_{i,a}^n$ represents a baseline storage volume of the lake i at time n; $\eta_{P_p}^p$ represents an operation efficiency of a pump station connected to the channel i or the lake i; $\Delta P_{P_i,n}^p$ represents a power adjustment of an active load of the pump station connected to the channel i or the lake i; $P_a$ represents a set of pump stations connected to the lake i; $P_{ch}$ represents a set of pump stations connected to the channel i; P represents a set of pump stations; $S_{i,c,min}$ represents a minimum storage volume of the channel i; $S_{i,c,max}$ represents a maximum storage volume of the channel i; and $\tilde{S}_{i,c}^n$ represents a baseline storage volume of the channel i at time n; and the time-varying adjustable power domain is corrected through steps of:
correcting the time-varying adjustable power domain according to the adjustment amount, and obtaining the time-varying adjustable power domain as:

$F_i^{*,n} = \{ \Delta P_{i,n}^p \in \Box \;|\; P_{i,n}^{fle,min} \leq \Delta P_{i,n}^p + dP_n^p \leq P_{i,n}^{fle,max} \}$ (42)

wherein $P_{i,n}^{fle,max}$ represents a corrected upper bound of the time-varying adjustable power for the pump station i at time n; $P_{i,n}^{fle,min}$ represents a corrected lower bound of the time-varying adjustable power for the pump station i at time n; $F_i^{*,n}$ represents a real time-varying adjustable power domain of the pump station i at time n; $\Delta P_{i,n}^{P}$ represents an adjustment amount of the active load of the pump station i at time n; and $dP_n^P$ represents a certain margin of adjustable power reserved because higher-order terms in (34) are ignored, which is generally determined by the experiences based on operation states.

In some embodiments, step (f) comprises:

performing an optimal coordinated rolling scheduling on a pump station group distributed in the watershed network, wherein a plurality of stochastic scenarios are generated according to uncertainty of rainfall prediction at a future moment; an objective of watershed network hydraulic energy flow optimization is to minimize an operational cost of the pump station group; the operational cost comprises an electricity consumption cost of the pump station group and an expected electricity consumption cost of the pump station group in the plurality of stochastic scenarios; and the hydraulic energy flow optimization model is expressed as:

$$\min\left\{ELC_{n_0} + \sum_{s=1}^{NS}\pi_s\left(\sum_{n=n_0+1}^{n_0+N_T}ELC_{n,s}\right)\right\}; \text{ and} \quad (43)$$

$$ELC_n = C_{E,n}\Delta t \sum_{i\in P}\overline{P_{i,n}^p}; \quad (44)$$

s.t. the equations (6)-(20) and (30)-(33) (45);

wherein $ELC_n$ represents an electricity consumption cost of the pump station group at time n; $ELC_{n,s}$ represents an electricity consumption cost of the pump station group at time n under scenario s; $n_0$ represents an initial time of the watershed network hydraulic energy flow optimization; NS represents a total number of the plurality of stochastic scenarios; $N_T$ represents a length of a predicted time horizon; $\pi_s$ represents an occurrence probability of the scenario s; $\Sigma_{s=1}^{NS}\pi_s=1$; and $C_{E,n}$ represents an electricity price of the urban distribution network at time n; and constructing the power flow optimization model; and optimizing a power flow of the urban distribution network and a power of individual generators by using the flexible resource of the pump station group, so as to minimize an operational cost of the urban distribution network at a current time, wherein the operational cost $DC_n$ comprises a cost $DC_{1n}$ for purchasing power from a main grid, a generator operation cost $DC_{2n}$, an incentive cost $DC_{3n}$ of flexible resources of the watershed network and an electricity-selling profit $DC_{4n}$; and the power flow optimization model is expressed as:

$$\begin{cases} \min DC_n = DC_{1n} + DC_{2n} + DC_{3n} - DC_{4n} \\ DC_{1n} = C_{mg,n}P_n^{mg} \\ DC_{2n} = \sum_{g\in G}a_g\left(P_{g,n}^{CDG}\right)^2 + b_g\left(P_{g,n}^{CDG}\right) + c_g \\ DC_{3n} = C_{IN,n}\sum_{i\in P}\hat{P}_{i,n}^{fle} \\ DC_{4n} = C_{E,n}\sum_{j\in J}\sum_{i\in P_j}\left(P_{i,n}^p + P_{i,n}^{fle} + P_{j,n}^{load}\right) \end{cases} ; \text{and} \quad (46)$$

$$\text{s.t.}\begin{cases} \text{the equations (21)-(29)} \\ P_{i,n}^{fle,min} \leq P_{i,n}^{fle} \leq P_{i,n}^{fle,max}, \forall i \in P, \forall n \in T^* \\ P_{i,n}^{fle} \leq \hat{P}_{i,n}^{fle}, \forall i \in P, \forall n \in T^* \\ -P_{i,n}^{fle} \leq \hat{P}_{i,n}^{fle}, \forall i \in P, \forall n \in T^* \end{cases} ; \quad (47)$$

wherein $C_{mg,n}$ represents an electricity price of the main grid at time n; $P_n^{mg}$ represents an electricity purchasing quantity of the urban distribution network from the main grid at time n; $C_{IN,n}$ represents an incentive price of the flexible resource at time n; $a_g$, $b_g$ and $c_g$ are cost coefficients of the generator g; $\hat{P}_{i,n}^{fle}$ is an auxiliary variable; and $P_{i,n}^{fle}$ represents an adjustment amount of the active load of the pump station i set by the urban distribution network at time n.

In some embodiments, step (g) comprises:

(g1) initializing the coordinated operation model, wherein a current scheduling period is set to n=1; a scheduling duration is 24 h; Dx of individual channels in the watershed network is set to 100 m; and Dt is set to 1 h;

(g2) inputting parameters to the coordinated operation model, wherein the parameters comprise topological information of the watershed network, a width $B_I$ of each channel, a length $L_I$ of each channel, a water level $H_{j,I}^{n-1}$ and flow rate $q_{j,I}^{n-1}$ of each channel in the watershed network at point (j,n−1), an operation state of each pump station at time n−1, a power $P_{i,n-1}^{p}$ of each pump station at time n−1, topological information of the urban distribution network, load information of each bus, and an operation state and power of each generator in the urban distribution network at time n−1; and $H_{j,I}^{n-1}$ and $q_{j,I}^{n-1}$ are taken as initial conditions of the watershed network;

(g3) optimizing a load of each pump station and a hydraulic energy flow of each channel in the watershed network at time n based on the hydraulic energy flow optimization model, so as to obtain an optimal operating power $P_{i,n}^{p}$ of each pump station at the current scheduling period;

(g4) calculating a time-varying adjustable power domain $[P_{i,n}^{fle,min}, P_{i,n}^{fle,max}]$ of each pump station based on the flexibility assessment method; and transmitting the $P_{i,n}^{p}$ and the $[P_{i,n}^{fle,min}, P_{i,n}^{fle,max}]$ of each pump station to the urban distribution network;

(g5) calculating and optimizing a flexible power $P_{i,n}^{fle}$ of each pump station required by the urban distribution network based on the power flow optimization model; transmitting the $P_{i,n}^{fle}$ to each pump station; and paying an incentive fee to each pump station in the watershed network;

(g6) receiving the $P_{i,n}^{fle}$ by the watershed network; adjusting the $P_{i,n}^{p}$ of each pump station to $P_{i,n}^{p}+P_{i,n}^{fle}$ to calculate a watershed network hydraulic energy flow, so as to update a water level and flow rate at each point in the watershed network at time n; and (g7) determining whether the electricity-water energy flow interactive optimization is finished through steps of:

letting n=n+1, and determining whether n≤24; if yes, returning to step (g2); otherwise, ending the electricity-water energy flow interactive optimization.

Compared to the prior art, the disclosure has the following beneficial effects.

By implementing the electricity-water energy flow interactive optimization involving the flexible resources of the pump station group, the flexibility of the watershed network can be fully exploited to improve the operational flexibility of the urban distribution network, achieving the flexible coordinated operation of the urban distribution network and the watershed network. Specifically, the power flow optimization model and the hydraulic energy flow optimization model are constructed herein, and the pump station load is incorporated as the flexible resource into the power flow optimization of the urban distribution network. The interactive optimization effectively utilizes the spatio-temporal flexibility of the pump station load to reduce peak-valley load difference of the urban distribution network, such that the watershed network can assist the secure and economic operation of the urban distribution network. The spatio-temporal flexible resources of the pump station load can be evaluated and quantified to facilitate the flexible coordinated operation of the urban distribution network and the watershed network.

BRIEF DESCRIPTION OF THE DRAWINGS

In order to illustrate the technical solutions of embodiments of the present disclosure or the prior art more clearly, the drawings needed in the description of the embodiments of the present disclosure or the prior art will be briefly described below. Obviously, presented in the accompanying drawings are only some embodiments of the disclosure, which are not intended to limit the disclosure. Other drawings obtained by those of ordinary skill in the art based on the drawings provided herein without sparing any creative effect should fall within the scope of the disclosure.

DETAILED DESCRIPTION OF EMBODIMENTS

It should be noted that described blow are merely illustrative of the disclosure, and are not intended to limit the disclosure.

Figure 1:
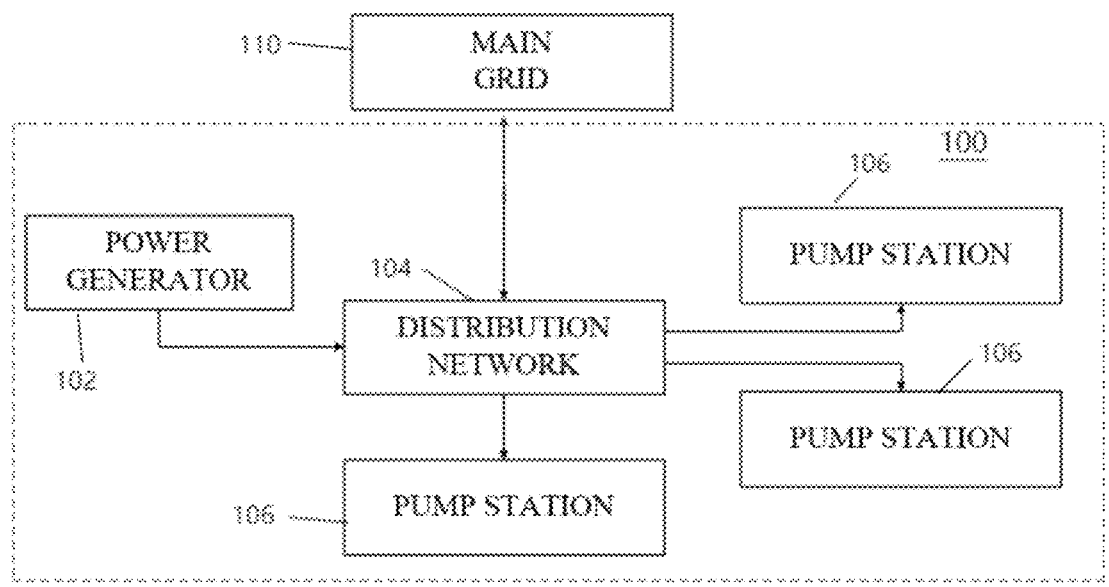
FIG. 1 schematically shows a system for flexible coordinated operation of an urban distribution network and a watershed network according to an embodiment of the present disclosure.

Referring to FIG. 1, a system 100 is provided for flexible coordinated operation of an urban distribution network and a watershed network, which includes one or more power generators 102, and a distribution network 104. The power generators 102 include non-renewable sources, such as, but are not limited to, diesel generators, combined heat/power (CHP) generators, battery energy storage, fuel cells, and electrolyzers. Additional examples of the power generators 102 include renewable sources, such as, but not limited to, wind turbines, geothermal pumps, solar cells, and hydroelectric plants. In an embodiment, the power generators 102 transmit electrical power through the distribution network 104. The distribution network 104 includes equipment, such as, without limitation, a plurality of conduits and switches that facilitate electrical energy being routed to its destination. In an embodiment, the distribution network 104 is electrically connected to the power generators 102, the pump stations 106 and a main grid 110. In an embodiment, the system 100 may buy electrical energy from the main grid 110 or sell electrical energy.

The pump stations 106 are coupled to the distribution network 104. The pump stations 106 are distributed in the watershed network. Each pump station 106 includes at least one electric-driven pump for drainage.

Figure 2:
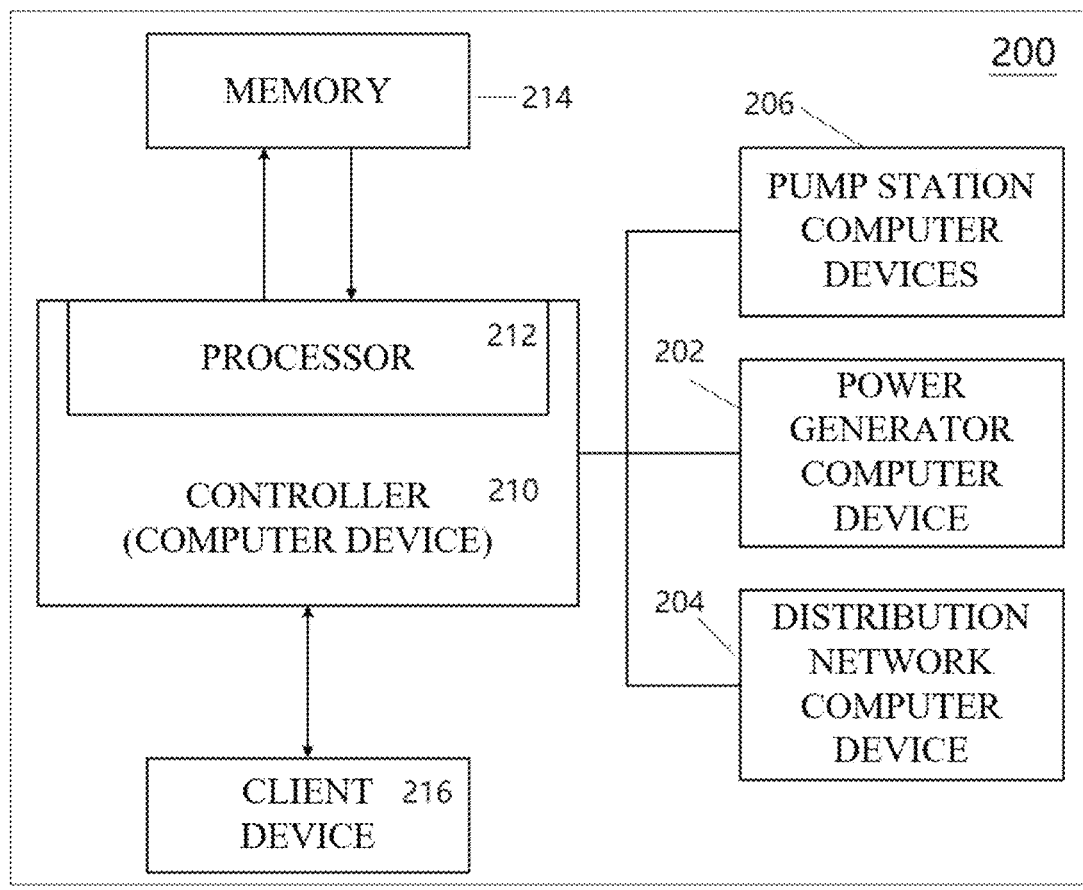
FIG. 2 schematically shows a regulating system of the system shown in FIG. 1.

Referring to FIG. 2, a system 200 for regulating the system 100 is provided, which includes a processor 212, a memory 214 coupled to the processor 212, a controller (computer device) 210, a power generator computer device 202, a distribution network computer device 204 and a pump station computer device 206. In the exemplary embodiment, the system 200 is used for regulating the transmission of electrical energy over the system 100, ensuring the pump stations 106 receive needed power, and using the connection to the main grid 110 to receive extra needed power or shed excess power.

The controller 210 is in communication with the power generators 102, the main grid 110, the pump stations 106, and the distribution network 104. The controller 210 is configured to (a) construct a watershed network dynamic operation model based on a de Saint-Venant nonlinear hyperbolic partial differential equation system; (b) construct water storage models for rivers and lakes based on the watershed network dynamic operation model; (c) construct a distribution network linear alternating-current (AC) power flow model; and based on the watershed network dynamic operation model and the distribution network linear AC power flow model, construct an operating power-flow rate operation model of the drainage pump station to obtain a coordinated operation model of the urban distribution network and the watershed network; (d) construct a watershed-electricity composite sensitivity matrix by using Taylor series expansion to reflect a mathematical relationship between variation of water level at individual points of the watershed network and a power increment of the one or more drainage pump stations, and a mathematical relationship between variation of flow rate at individual points of the watershed network and the power increment of the one or more drainage pump stations; (e) quantify a time-varying adjustable power domain of a load of each of the one or more drainage pump stations through a pump station flexibility assessment method based on the watershed-electricity composite sensitivity matrix; (f) construct a power flow optimization model of the urban distribution network and a hydraulic energy flow optimization model of the watershed network; and convert a non-convex nonlinear hydraulic energy flow optimization problem into a mixed-integer linear programming problem through a multidimensional piecewise linearization method; and (g) based on the coordinated operation model of the urban distribution network and the watershed network, the time-varying adjustable power domain, the flexibility assessment method, the power flow optimization model and the hydraulic energy flow optimization model, perform electricity-water energy flow interactive optimization involving a flexible resource of the one or more drainage pump stations to realize the flexible coordinated operation of the urban distribution network and the watershed network.

As described below in more detail, the controller 210 may be configured to (a) predict grid demand for the pump stations 106 for a predetermined period of time; (b) receive demand information for the main grid 110 for the predetermined period of time including pricing for frequency regulation services; (c) determine an operation plan for the power generators 102 based on the predicted grid demand and the received demand information; and (d) determine a schedule to transmit electrical energy to the main grid 110 based on the operation plan.

In an embodiment, the power generator computer device 202 regulates the operation of the power generators 102. The power generator computer device 202 is in communication with the processor 212 through interfaces including, without limitation, a network, such as a local area network (LAN) or a wide area network (WAN), dial-in-connections, cable modems, Internet connection, wireless, and special high-speed Integrated Services Digital Network (ISDN) lines. In an embodiment, the power generators 102 are distributed power generators. In an embodiment, the power generator computer device 202 receives instructions for the operation of the power generators 102 from the controller 210.

In an embodiment, the distribution network computer devices 204 control the distribution network 104 and direct the routing of electrical energy from the power generators 102 to the pump stations 106 and the main grid 110. The distribution network computer device 204 is in communication with the controller 210. The distribution network computer device 204 is coupled to the controller 210 through interfaces including, without limitation, a network, such as a local area network (LAN) or a wide area network (WAN), dial-in-connections, cable modems, Internet connection, wireless, and special high-speed Integrated Services Digital Network (ISDN) lines. In the embodiment, the distribution network computer device 204 receives instructions about routing electrical energy through the distribution network 104 from the controller 210.

In the embodiment, the pump station computer device 206 regulates operations of the pump stations 106. The pump station computer device 206 is in communication with the controller 210. The pump station computer device 206 is coupled to the controller 210 through interfaces including, without limitation, a network, such as a LAN or a WAN, dial-in-connections, cable modems, Internet connection, wireless, and special high-speed ISDN lines. In some embodiments, the pump station computer device 206 is in communication with the controller 210 through the distribution network 104. In some embodiments, the pump station computer device 206 is a smart meter. In an embodiment, the pump station computer device 206 transmits power usage information about the pump stations 106. In some embodiments, the pump station computer device 206 transmits power usage information in real time. In other embodiments, the pump station computer device 206 transmits historical power usage information. In some further embodiments, the pump station computer device 206 transmits demand information about current or future power demands of the corresponding pump station 106, such as predictions of future load demand based on historical information. The pump station computer device 206 may transmit more or less information as needed to enable the system 200 to function as described herein.

The memory 214 stores data received from the pump station computer device 206, the power generator computer device 202 and the distribution network computer device 204. In addition, the memory 214 stores pricing forecasts, demand forecasts, transmission constraints, energy generation constraints, and historical data from the pump station computer device 206, the power generator computer device 202, and the controller 210.

In some embodiments, the controller 210 is in communication with a client device 216, also known as a client system 216. The controller 210 is coupled to the client device 216 through many interfaces including, without limitation, the distribution network 104, a network, such as a LAN or a WAN, dial-in-connections, cable modems, Internet connection, wireless, and special high-speed ISDN lines. In these embodiments, the controller 210 transmits data about the operation of the system 100 to the client device 216. Furthermore, the controller 210 is configured to receive additional instructions from the client device 216. Additionally, the client device 216 is configured to access or update the database stored in the memory 214 through the controller 210. The client device 216 is configured to present the data from the controller 210 to a user. In other embodiments, the controller 210 includes a display unit (not shown) to display data directly to a user.

EMBODIMENT

Figure 3:
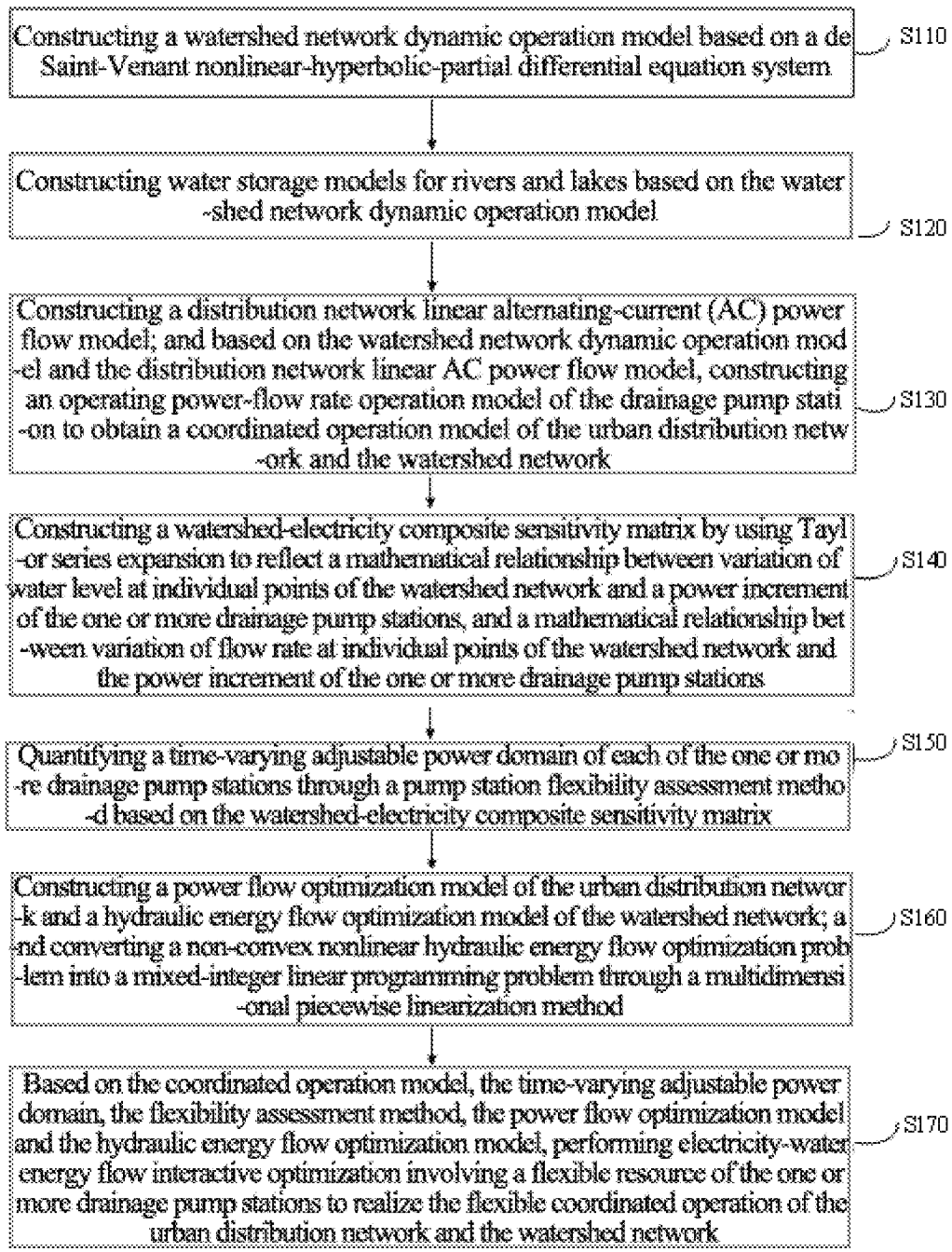
FIG. 3 is a flow chart of a method for flexible coordinated operation of an urban distribution network and a watershed network according to an embodiment of the present disclosure.

Referring to FIG. 3, this application provides a method for flexible coordinated operation of an urban distribution network and a watershed network, including the following steps.

(S110) A watershed network dynamic operation model is constructed based on a de Saint-Venant nonlinear hyperbolic partial differential equation system.

(S120) A river water storage model and a lake water storage model are constructed based on the watershed network dynamic operation model.

(S130) A distribution network linear AC power flow model is constructed. Based on the watershed network dynamic operation model and the distribution network linear AC power flow model, an operating power-flow rate operation model of the drainage pump station is constructed to obtain a coordinated operation model of the urban distribution network and the watershed network.

(S140) A watershed-electricity composite sensitivity matrix is constructed by using Taylor series expansion to reflect a mathematical relationship between variation of water level at individual points of the watershed network and a power increment of the one or more drainage pump stations, and a mathematical relationship between variation of flow rate at individual points of the watershed network and the power increment of the one or more drainage pump stations.

Figure 4:
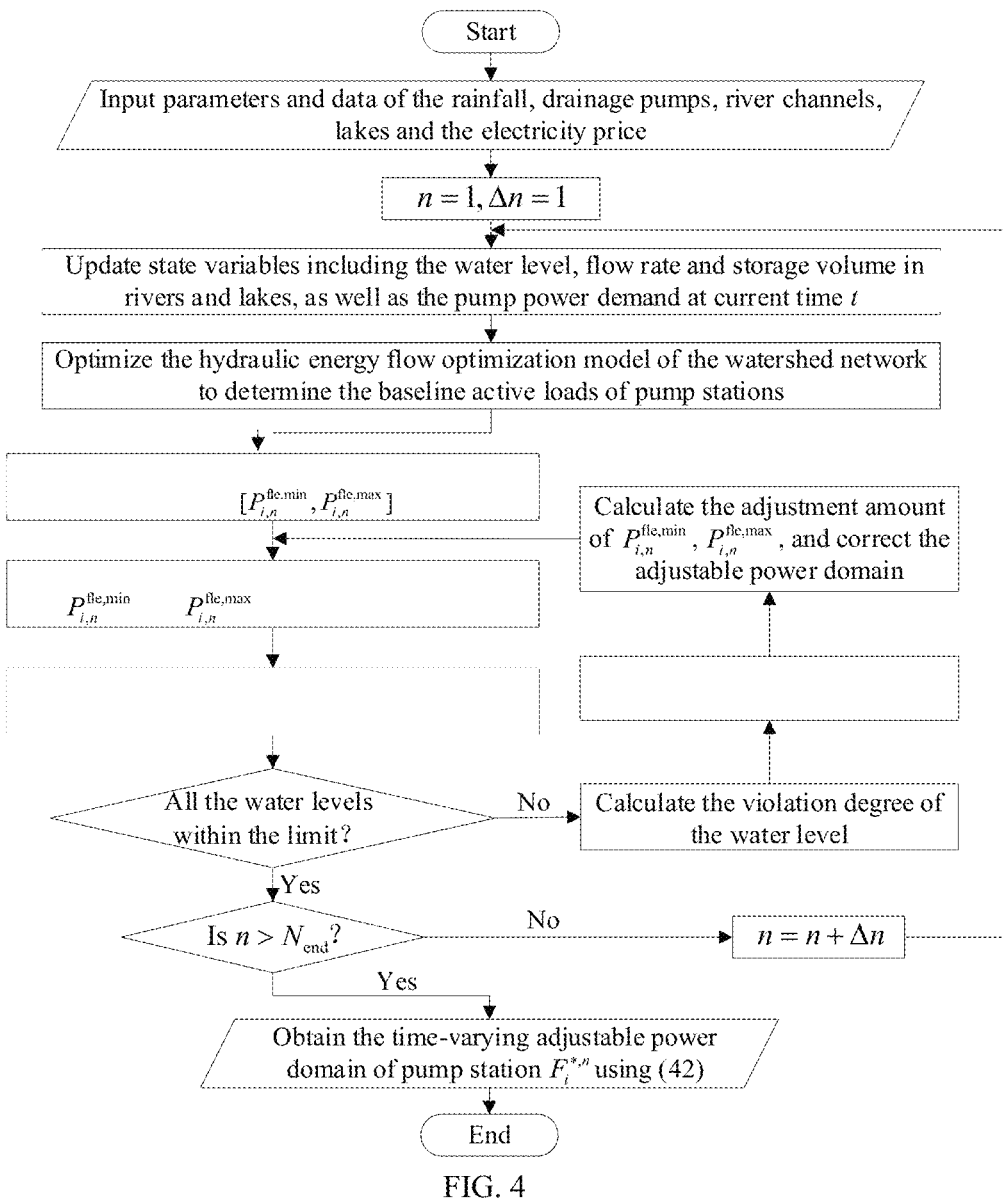
FIG. 4 schematically illustrates a pump station flexibility assessment method according to an embodiment of the present disclosure.

(S150) A time-varying adjustable power domain of a load of each of the one or more drainage pump stations is quantified through a pump station flexibility assessment method based on the watershed-electricity composite sensitivity matrix, where the time-varying adjustable power domain is quantified through the following steps (as shown in FIG. 4).

The time-varying adjustable power domain of the load of each of the one or more drainage pump stations is estimated.

The watershed-electricity composite sensitivity matrix and an adjustment amount are successively calculated.

The time-varying adjustable power domain is corrected based on the adjustment amount until there is no water level out of a preset limit.

(S160) A power flow optimization model of the urban distribution network and a hydraulic energy flow optimization model of the watershed network are constructed. A non-convex nonlinear hydraulic energy flow optimization problem is converted into a mixed-integer linear programming problem through a multidimensional piecewise linearization method.

(S170) Based on the coordinated operation model, the time-varying adjustable power domain, the flexibility assessment method, the power flow optimization model and the hydraulic energy flow optimization model, electricity-water energy flow interactive optimization involving a flexible resource of the one or more drainage pump stations is performed to realize the flexible coordinated operation of the urban distribution network and the watershed network.

Specifically, information is input according to a water level and flow rate of each point of the watershed network at a current scheduling period to perform watershed network hydraulic energy flow optimization. A flexibility of each pump station after optimization is assessed, and a time-varying adjustable power domain of each pump station in the pump station group is calculated. Then, information of load of each pump station and time-varying adjustable power domain thereof are transmitted to the urban distribution network. The urban distribution network performs power flow optimization, and information of flexible power required by each bus of the urban distribution network where the pump stations located is transmitted to the corresponding pump station through the urban distribution network. The load of each pump station is adjusted according to the information provided by the urban distribution network, and the hydraulic energy flow is calculated. The water level and flow rate at each point in the watershed network after power flow optimization and hydraulic energy flow optimization are updated, which is considered as input information for the next scheduling period.

By the method provided herein, the electricity-water energy flow interactive optimization involving a flexible resource of the pump station group can be implemented, and the flexibility potential of the watershed network can be fully exploit to improve the flexible operation of the urban distribution network, so as to realize the flexible coordinated operation of the urban distribution network and the watershed network. Specifically, the hydraulic energy flow optimization model for minimizing the operational cost of the pump stations and the power flow optimization model for minimizing the total operational cost are constructed. The load of each pump station is considered as the flexible resource and involved in power flow optimization of the urban distribution network. The urban distribution network pays an incentive cost to each pump station according to the flexible power required by the urban distribution network. In other words, by performing the electricity-water energy flow interactive optimization, spatio-temporal flexibility of the load of pump stations are utilized to reduce the peak-to-valley difference of the urban distribution network, so as to ensure the secure and economic operation of the urban distribution network assisting by the watershed network. The method provided herein can assess and quantify the spatio-temporal flexibility of the load of pump stations, so as to realize the flexible coordinated operation of the urban distribution network and the watershed network.

In addition, this application also provides the watershed-electricity composite sensitivity matrix of the watershed network and the flexibility assessment method. Based on the de Saint-Venant nonlinear-hyperbolic-partial differential equation system, a non-uniform unsteady watershed network dynamic operation model in rainy weather is constructed, which is configured to characterize the hydrodynamic characteristics of gradual evolution of water under the influence of pump station and rainfall. On the basis of this, the watershed-electricity composite sensitivity matrix, which reflects a mathematical relationship between variation of water level and flow rate at individual points of the watershed network and a power increment of the one or more drainage pump stations, is deduced. The flexibility assessment method based on the watershed-electricity composite sensitivity matrix is provided, and the time-varying adjustable power domain of the load of pump station at any time can be calculated.

Furthermore, a linearization method for a nonlinear watershed network hydraulic energy flow optimization model is also proposed herein. By using the Preissmann four-point implicit scheme, a nonlinear hyperbolic partial differential equation constraint is approximately discretized into a nonlinear equality constraint. The nonlinear equality constraint is converted into a series of linear equality constraints through the multidimensional piecewise linearization method, so as to convert a non-convex nonlinear hydraulic energy flow optimization problem into a mixed-integer linear programming problem, reducing the optimization difficulty of the optimization model and improving the computational efficiency.

In an embodiment, the step (S110) includes the following steps.

(S210) Channel water-level and flow hydraulic states are characterized by the de Saint-Venant nonlinear-hyperbolic-partial differential equation system along a channel direction to obtain a mass conservation equation and a momentum conservation equation. The mass conservation equation is expressed as:

$$\frac{\partial A}{\partial t} + \frac{\partial Q}{\partial x} = r. \qquad (1)$$

The momentum conservation equation is expressed as:

$$\frac{\partial Q}{\partial t} + \frac{\partial}{\partial x}\left[\frac{Q^2}{A}\right] + gA\frac{\partial H}{\partial x} = gA(S_b - S_f).$$

$S_f$ is expressed as:

$$S_f = \left(M^2 Q|Q|I^{\frac{4}{3}}\right)/A^{\frac{10}{3}}, \qquad (3)$$

where t is time; x represents a longitudinal distance along the channel direction; Q represents volumetric flow rate; A represents a cross-sectional area of a water flow; H represents a water level; g is gravitational acceleration; $S_b$ represents a river bed slope; $S_f$ represents a friction slope; M represents Manning coefficient; I represents channel wetted perimeter; and r represents rainfall intensity.

Specifically, unlike power flow, hydraulic flow is a non-uniform and gradually changing fluid with slow dynamics.

In an embodiment, after step (S210), the step (S110) further includes the following steps.

(S310) The mass conservation equation is simplified into:

$$\frac{\partial H}{\partial t} + \frac{\partial q}{\partial x} = \frac{r}{B}. \tag{4}$$

(S320) The momentum conservation equation is simplified into:

$$\frac{\partial q}{\partial t} + \frac{\partial}{\partial x}\left[\frac{q^2}{H} + \frac{gH^2}{2}\right] = g\left[S_b - \frac{M^2 q^2 (2H+B)^{4/3}}{H^{7/3} B^{4/3}}\right]; \tag{5}$$

where H represents a channel depth; B represents a channel width; A=BH; Q=BHV; V represents a flow velocity; l=B+2H; q represents a flow rate per unit channel width; q=Q/B.

Specifically, the channel width varies very little along the flow direction, thus the channel can be considered as a prismatic channel with rectangular cross section. The average river bed slope is very small, and thus the $S_b$ can be set uniformly.

(S330) An approximate discrete form of the de Saint-Venant nonlinear-hyperbolic-partial differential equation system is obtained by using a Preissmann four-point implicit scheme.

Specifically, equations (4) and (5) are nonlinear hyperbolic partial differential equation, of which analytical solution cannot be obtained.

(S340) A continuous spatio-temporal domain C={(x, t)|0≤x≤L, 0≤t≤T} is divided into a plurality of rectangular grids according to a spatial step Δx and a time step Δt, where L represents a channel length; T represents a finite time horizon; individual vertices at each of the plurality of rectangular grids are indexed as (j, n); n represents a time index; j represents a spatial index; $T^w$={0, 1, 2, . . . , N}, representing a time index set; N represents a maximum time index; $L^w$={0, 1, 2, . . . , J}, representing a spatial index set; J represents a maximum spatial index; Dt=T/N; Dx=L/J; and (j, n)∈$L^w \times T^w$.

(S350) Spatio-temporal discretization is performed on equations (4) and (5) based on Preissmann four-point implicit scheme to obtain equations (6)-(9):

$$f_1(H_{j+1}^{n+1}, H_j^{n+1}, q_{j+1}^{n+1}, q_j^{n+1}) := \tag{6}$$

$$\frac{H_{j+1}^{n+1} - H_{j+1}^{n} + H_j^{n+1} - H_j^{n}}{2\Delta t} + \theta\left(\frac{q_{j+1}^{n+1} - q_j^{n+1}}{\Delta x}\right) +$$

$$(1-\theta)\left(\frac{q_{j+1}^{n} - q_j^{n}}{\Delta x}\right) - \frac{1}{B}\left[\frac{\theta}{2}(r_{j+1}^{n+1} + r_j^{n+1}) + \frac{1-\theta}{2}(r_{j+1}^{n} + r_j^{n})\right] = 0,$$

$$f_2(H_{j+1}^{n+1}, H_j^{n+1}, q_{j+1}^{n+1}, q_j^{n+1}) := \frac{q_{j+1}^{n+1} - q_{j+1}^{n} + q_j^{n+1} - q_j^{n}}{2\Delta t} - \tag{7}$$

$$\theta(I_{j+1}^{n+1} + R_j^{n+1})(7) - gS_b - (1-\theta)(I_{j+1}^{n} + R_j^{n}) = 0,$$

$$I_j^n = \left(-\frac{gM^2}{2} \frac{(q_j^n)^2 (2H_j^n + B_j^n)^{4/3}}{(H_j^n)^{7/3} (B_j^n)^{4/3}} - \frac{1}{\Delta x}\frac{(q_j^n)^2}{H_j^n} - \frac{g(H_j^n)^2}{2\Delta x}\right) \text{ and} \tag{8}$$

$$R_j^n = \left(-\frac{gM^2}{2} \frac{(q_j^n)^2 (2H_j^n + B_j^n)^{4/3}}{(H_j^n)^{7/3} (B_j^n)^{4/3}} + \frac{1}{\Delta x}\frac{(q_j^n)^2}{H_j^n} + \frac{g(H_j^n)^2}{2\Delta x}\right). \tag{9}$$

Specifically, ":=" in the above-mention formulas represents defining a function $f_1$ as:

$$\frac{H_{j+1}^{n+1} - H_{j+1}^{n} + H_j^{n+1} - H_j^{n}}{2\Delta t} + \theta\left(\frac{q_{j+1}^{n+1} - q_j^{n+1}}{\Delta x}\right),$$

rather than considering it as $$+(1-\theta)\left(\frac{q_{j+1}^{n} - q_j^{n}}{\Delta x}\right) - \frac{1}{B}\left[\frac{\theta}{2}(r_{j+1}^{n+1} + r_j^{n+1}) + \frac{1-\theta}{2}(r_{j+1}^{n} + r_j^{n})\right]$$

a constraint. The same goes for function $f_2$.

In addition, θ represents a weight coefficient to ensure unconditional stability, and is selected from [0,1]; if θ≥0.5, the Preissmann four-point implicit scheme is unconditionally stable; $H_{j+1}^{n+1}$ represents a water level at point (j+1, n+1); $H_j^{n+1}$ represents a water level at point (j, n+1); $q_{j+1}^{n+1}$ represents a flow rate per unit channel width at the point (j+1, n+1); $q_j^{n+1}$ represents a flow rate per unit channel width at the point (j, n+1); $q_j^n$ represents a flow rate per unit channel width at the point (j, n); $r_{j+1}^{n+1}$ represents a rainfall intensity at the point (j+1, n+1); $r_j^{n+1}$ represents a rainfall intensity at the point (j, n+1); $I_{j+1}^{n+1}$ represents an I value defined by equation (8) at the point (j+1, n+1); $R_j^{n+1}$ represents an R value defined by equation (9) at the point (j, n+1); and $B_j^n$ represents a channel width at the point (j, n).

(S360) Spatio-temporal discretization is performed on each channel in the watershed network based on Preissmann four-point implicit scheme according to equations (6)-(9).

(S370) An initial condition and a boundary condition are determined to ensure closure and uniqueness of equations (6)-(9) with spatio-temporal discretization.

Specifically, in addition to equations (6)-(9), there should be the initial condition and the boundary condition to ensure closeness and solution uniqueness of space-time-discrete equations (6)-(9).

The initial condition comprises an initial water level distribution and an initial flow rate distribution observed by a hydrological station, expressed as:

$$H_{j,I}^{0} = H_I^{ini}(x=j\Delta x), \forall j \in L_I^w, \forall I \in \Omega \tag{10}$$

$$q_{j,I}^{0} = q_I^{ini}(x=j\Delta x), \forall j \in L_I^w, \forall I \in \Omega \tag{11}$$

The boundary condition comprises an upstream boundary condition and a downstream boundary condition, expressed as:

$$f_I^u = f(H_{1,I}^n, q_{1,I}^n), f_I^d = f(H_{J_I,I}^n, q_{J_I,I}^n), \forall n \in T^w, \forall I \in \Omega \tag{12}$$

where $H_{j,I}^n$ represents a water level of channel I at the point (j, n); $q_{j,I}^n$ represents a flow rate of the channel I at the point (j, n); $H_{j,I}^0$ represents a water level of the channel I at point (j, 0); $q_{j,I}^0$ represents a flow rate of the channel I at the point (j, 0); Ω represents a channel set; $H_I^{ini}(x)$ represents a given initial water level of the channel I along direction x; $q_I^{ini}(x)$ represents a given initial flow rate of the channel I along the direction x; $f_I^u$ represents an upstream boundary condition of the channel I; $f_I^d$ represents a downstream boundary condition of the channel I; $L_I^w$={0, 1, 2, . . . , $J_I$}, representing a spatial index set of the channel I; and $J_I$ represents a maximum spatial index of the channel I.

(S380) The channel flow rate and water level are limited respectively to a preset range, expressed as:

$$Q_I^{min} \leq B_I q_{j,I}^n \leq Q_I^{max}, H_I^{min} \leq H_{j,I}^n \leq H_I^{max}, \forall I \in \Omega,$$
$$\forall n \in T^w, \forall j \in L_I^w \tag{13}$$

where $B_I$ represents a width of the channel I; $Q_I^{max}$ represents an upper bound of a flow rate of the channel I, $H_I^{max}$ represents an upper bound of a water level of the channel I; $Q_I^{min}$ represents a lower bound of the flow rate of the channel I; and $H_I^{min}$ represents a lower bound of the water level of the channel I.

Specifically, in consideration of the ecological and operational rules of the watershed network, the flow rate and water level of channels are limited within the preset range.

Water levels of channels are the same at a confluent node z, expressed as:

$$H_{j,m}^n = H_{j,i}^n, \forall m \in \Omega_{z+}, \forall i \in \Omega_{z-}, \forall n \in T^w, \forall z \in Z \quad (14).$$

(S390) Considering that an inflow of the confluent node z is equal to an outflow of the confluent node z according to mass conservation principle, equation (15) is deduced:

$$\sum_{m \in \Omega_{z+}} q_{J_m,m}^n B_m + \sum_{k \in P_z} \alpha_{k,n}^p q_{k,n}^p = \sum_{i \in \Omega_{z-}} q_{0,i}^n B_i, \quad (15)$$

$$\forall n \in T^w, \forall z \in Z;$$

where Z represents a confluent node set of the watershed network; $\Omega_{z+}$ represents a set of channels that flow into the confluent node z; $\Omega_{z-}$ represents a set of channels that flow out from the confluent node z; $q_{k,n}^p$ represents a flow rate of a pump station k at time n; $P_z$ represents a set of pump stations connected to the confluent node z; $\alpha_{k,n}^p \in \{-1, 1\}$ is a given value; $\alpha_{k,n}^p = -1$ denotes that the pump station k is used to pump water at time n; $\alpha_{k,n} = 1$ denotes that the pump station k is used to drain water at time n; m represents a channel number index; $q_{J_m,m}^n$ represents a flow rate per unit width of channel m at point $(J_m, n)$; $B_m$ represents a width of the channel m; $B_i$ represents a width of channel i; and $q_{0,i}^n$ represents a flow rate per unit width of the channel i at point (0, n).

In an embodiment, step (S120) includes the following steps.

(S401) A water storage volume $S_{I,c}^n$ of the channel I at time n is obtained, expressed as:

$$S_{I,c}^n = \sum_{j=0}^{J_I-1} \frac{(H_{j,I}^n + H_{j+1,I}^n)}{2} B_I \Delta x, \forall I \in \Omega, \forall n \in T^w. \quad (16)$$

Specifically, the channels and lakes can be used as intermediate storage facilities for rainwater in rainy weather.

The water storage volume $S_{I,c}^n$ is limited to a preset range, expressed as:

$$S_{I,c,min}^n \leq S_{I,c}^n \leq S_{I,c,max}^n, \forall I \in \Omega, \forall n \in T^w \quad (17),$$

where $H_{j,I}^n$ represents a water level of the channel I at the point (j, n); $B_I$ represents a width of the channel I; $S_{I,c,min}^n$ represents a minimum water storage volume of the channel I; $S_{I,c,max}^n$ represents a maximum water storage volume of the channel I; $J_I$ represents a maximum spatial index of the channel I.

(S402) A relationship between water discharge and water level of lake k at each period is acquired, expressed as:

$$A_{k,a} \frac{H_{k,a}^{n+1} - H_{k,a}^n}{\Delta t} = r_k^n (A_{k,a} + \alpha_{k,a} F_{k,a}) - \sum_{i \in k_p} \alpha_{i,n}^p q_{i,n}^p, \quad (18)$$

$$\forall k \in K, \forall n \in T^w.$$

(S403) A current volume of the lake k is acquired, expressed as:

$$S_{k,a}^n = A_{k,a} H_{k,a}^n, \forall k \in K, \forall n \in T^w \quad (19).$$

(S404) A constraint for secure operation of the lake k is acquired, expressed as:

$$S_{k,a,min} \leq S_{k,a}^n \leq S_{k,a,max}, \forall k \in K, \forall n \in T^w \quad (20),$$

where $A_{k,a}$ represents an area of the lake k; $H_{k,a}^n$ represents a water level of the lake k at time n; $\alpha_{k,a}$ represents a runoff coefficient of the lake k; $F_{k,a}$ represents a catchment area of the lake k; $S_{k,a}^n$ represents a water storage volume of the lake k at time n; $S_{k,a,min}$ represents a minimum water storage volume of the lake k; $S_{k,a,max}$ represents a maximum water storage volume of the lake k; K represents a lake set; $k_p$ represents a set of pump stations connected to the lake k; $q_{i,n}^p$ represents a flow rate of the pump station i at time n; $r_k^n$ represents a rainfall intensity at the lake k at time n; and $\alpha_{i,n}^p$ represents an operation state of the pump station i at time n.

In an embodiment, the step (S130) includes the following steps.

(S501) The distribution network linear AC power flow model is constructed to characterize power flow constraints, generator operating constraints and bus power balance constraints, where an active power flow of line ij is expressed as:

$$P_{ij,n} = \frac{r_{ij} x_{ij}}{r_{ij}^2 + x_{ij}^2} \cdot \frac{(V_{i,n} - V_{j,n})}{x_{ij}} + \frac{x_{ij}^2}{r_{ij}^2 + x_{ij}^2} \cdot \frac{(\delta_{i,n} - \delta_{j,n})}{x_{ij}}, \forall n \in T^*; \quad (21)$$

a reactive power flow of the line ij is expressed as:

$$Q_{ij,n}^e = \frac{-r_{ij} x_{ij}}{r_{ij}^2 + x_{ij}^2} \cdot \frac{(\delta_{i,n} - \delta_{j,n})}{x_{ij}} + \frac{x_{ij}^2}{r_{ij}^2 + x_{ij}^2} \cdot \frac{(V_{i,n} - V_{j,n})}{x_{ij}}, \forall n \in T^*; \quad (22)$$

where $r_{ij}$ represents a resistance of the line ij; $x_{ij}$ represents a reactance of the line ij; $P_{ij,n}$ represents an active power flowing from bus i to bus j at time n; $Q_{ij,n}^e$ represents a reactive power flowing from the bus i to the bus j at time n; $\delta_{j,n}$ represents a phase angle of the bus j at time n; $V_{j,n}$ represents a voltage amplitude of the bus j at time n; $\delta_{i,n}$ represents a phase angle of the bus i at time n; $V_{i,n}$ represents a voltage amplitude of the bus i at time n; and $T^* = \{1, 2, \ldots, N\}$, representing a time index set of the urban distribution network.

The reactive power flow and the active power flow of the line ij and the voltage amplitude of the bus j satisfy the following security constraints:

$$\begin{cases} -S_{ij} \leq P_{ij,n} \leq S_{ij} \\ -S_{ij} \leq Q_{ij,n}^e \leq S_{ij} \end{cases}, \forall n \in T^*; \text{ and} \quad (23)$$

$$V_j^{min} \leq V_{j,n} \leq V_j^{max}, \forall n \in T^*; \quad (24)$$

where $S_{ij}$ represents a rated apparent power capacity of the line ij; $V_j^{min}$ represents a minimum voltage allowed for the bus j; and $V_j^{max}$ represents a maximum voltage allowed for the bus j.

(S502) An output power limit of a distributed generator g is acquired, expressed as:

$$P_{g,min}^{CDG} \leq P_{g,n}^{CDG} \leq P_{g,max}^{CDG}, \forall g \in G, \forall n \in T^* \qquad (25).$$

(S503) A ramp limit of the distributed generator g is acquired, expressed as:

$$R_{g,down}^{CDG} \leq P_{g,n}^{CDG} - P_{g,n-1}^{CDG} \leq R_{g,up}^{CDG}, \forall g \in G, \forall n \in T^* \qquad (26).$$

(S504) A capacity limit of the distributed generator g is acquired, expressed as:

$$\begin{cases} -S_g^{CDG} \leq P_{g,n}^{CDG} \leq S_g^{CDG} \\ -S_g^{CDG} \leq Q_{g,n}^{CDG} \leq S_g^{CDG} \end{cases}, \forall g \in G, \forall n \in T^*. \qquad (27)$$

(S505) Power balance constraints for buses are acquired, expressed as:

$$\sum_{ij\in\Lambda_{j+},m} P_{ij,n} + \sum_{g\in G_j} P_{g,n}^{CDG} - \sum_{p\in P_j} P_{p,n}^{fle} - \sum_{p\in P_j} P_{p,n}^{p} - P_{j,n}^{load} = \sum_{jk\in\Lambda_{j-}} P_{jk,n}, \qquad (28)$$

$$\forall j \in J, \forall n \in T^* \text{ and}$$

$$\sum_{ij\in\Lambda_{j+},m} Q_{ij,n}^{e} + \sum_{g\in G_j} Q_{g,n}^{CDG} - \sum_{p\in P_j} Q_{p,n}^{p} - Q_{j,n}^{load} = \sum_{jk\in\Lambda_{j-}} Q_{jk,n}, \qquad (29)$$

$$\forall j \in J, \forall n \in T^*;$$

where $P_{g,n}^{CDG}$ represents an active power generated by the distributed generator g at time n; $Q_{g,n}^{CDG}$ represents a reactive power generated by the distributed generator g at time n; $P_{g,max}^{CDG}$ represents a maximum allowable output power of the distributed generator g; $P_{g,min}^{CDG}$ represents a minimum allowable output power of the distributed generator g; $R_{g,up}^{CDG}$ represents a maximum allowable ramp rate of the distributed generator g; $R_{g,down}^{CDG}$ represents a minimum allowable ramp rate of the distributed generator g; G represents a generator set; $G_j$ represents a set of generators connected to the bus j; $P_j$ represents a set of pump stations connected to the bus j; J represents a bus set of the urban distribution network; $\Lambda_{j+}$ represents a set of lines whose power flows into the bus j; $\Lambda_{j-}$ represents a set of lines whose power flows out from the bus j; $P_{j,n}^{load}$ represents an active load at the bus j except for a pump station load at time n; $Q_{j,n}^{load}$ represents a reactive load at the bus j except for the pump station load at time n; $P_{p,n}^{fle}$ represents a flexibility amount offered by pump station p at time n; $S_g^{CDG}$ is a rated apparent capacity for the distributed generator g; $P_{jk,n}$ represents an active power flow on line jk at time n; $P_{p,n}^{p}$ represents an active load of the pump station p at time n; and $Q_{p,n}^{p}$ represents a reactive load of the pump station p at time n.

In an embodiment, the step (S130) further includes the following steps.

(S601) An operating power-flow rate relationship for pump stations is acquired, expressed as:

$$P_{i,n}^{p} = \frac{\rho g H_i^{st} q_{i,n}^{p}}{1000 \eta_i^{p}}, \forall i \in P, \forall n \in T^*. \qquad (30)$$

(S602) Pump station power limits are acquired, expressed as:

$$-R_i^{p} \leq P_{i,n}^{p} - P_{i,n-1}^{p} \leq R_i^{p}, \forall i \in P, \forall n \in T^* \qquad (31); \text{ and}$$

$$P_{i,min}^{p} \leq P_{i,n}^{p} \leq P_{i,max}^{p}, \forall i \in P, \forall n \in T^* \qquad (32).$$

(S603) A pump station reactive load constraint is acquired, expressed as:

$$Q_{i,n}^{p} = P_{i,n}^{p} \tan(\arccos(\phi_i^{p})), \forall i \in P, \forall n \in T^* \qquad (33),$$

where P represents a set of pump stations in the watershed network; $P_{i,n}^{p}$ represents an active load of the pump station i at time n; $Q_{i,n}^{p}$ represents a reactive load of the pump station i at time n; $\eta_i^{p}$ represents an operation efficiency of the pump station i; $R_i^{p}$ represents a maximum ramp rate of the pump station i; $H_i^{st}$ represents a water head of the pump station i; $\rho$ is water density; $P_{i,min}^{p}$ represents a lower bound of the reactive load of the pump station i; $P_{i,max}^{p}$ represents an upper bound of the active load of the pump station i; and $\phi_i^{p}$ is a power factor of the pump station i.

In an embodiment, the step (S140) includes the following steps.

(S701) Based on Taylor series expansion, equations (6) and (7) are expanded into:

$$f_{\{1,2\}}\begin{Bmatrix} H_{j+1}^n + \Delta H_{j+1}, \\ H_j^n + \Delta H_j, \\ q_{j+1}^n + \Delta q_{j+1}, \\ q_j^n + \Delta q_j \end{Bmatrix} = \begin{Bmatrix} f_{\{1,2\}}(H_{j+1}^n, H_j^n, q_{j+1}^n, q_j^n) + \frac{\partial f_{\{1,2\}}}{\partial H_{j+1}^n} \Delta H_{j+1} \\ + \frac{\partial f_{\{1,2\}}}{\partial H_j^n} \Delta H_j + \frac{\partial f_{\{1,2\}}}{\partial q_{j+1}^n} \Delta q_{j+1} + \frac{\partial f_{\{1,2\}}}{\partial q_j^n} \Delta q_j \end{Bmatrix}; \qquad (34)$$

where $f_{\{1,2\}}$ represents a collective name for defined functions $f_1$ and $f_2$; subscripts 1 and 2 of the $f_{\{1,2\}}$ represent selection of function $f_1$ or function $f_2$; $\Delta H_j$ represents a variation of a water level at point (j, n) after adjusting a pump station power; $H_j^n$ represents a water level at the point (j, n); $\Delta q_j$ represents a variation of a flow rate at the point (j, n) after adjusting the pump station power; and $q_j^n$ represents a flow rate at the point (j, n); $f_1$ is defined in equation (6); and $f_2$ is defined in equation (7).

Specifically, the variation of the operation power of pump station may alter the water level and flow rate at each point of the watershed network, causing hydraulic state variables of channels to violate hydraulic constraints of the watershed network. Therefore, in order to quantify the impact of the power increment of pump stations on the hydraulic dynamic characteristics of channels, a sensitivity analysis of the watershed network is carried out by using the Taylor series expansion neglecting the high-order nonlinear term. Succinctly, the subscript I is neglected in this embodiment. The construction process of watershed-electricity composite sensitivity matrix for a single channel can be applied to all channels in the watershed network. Generally, for a channel connecting several pump stations, it is divided into multiple channels at the location of the pump station. Therefore, a pump station is located at the upstream or downstream of a channel in the watershed network.

(S702) A sensitivity matrix of individual channels under different disturbances at time n is acquired, expresses as:

$$\begin{bmatrix} a_0 & b_0 & 0 & 0 & 0 & 0 & \cdots & 0 & 0 & 0 & 0 \\ a_1 & b_1 & c_1 & d_1 & 0 & 0 & \cdots & 0 & 0 & 0 & 0 \\ a_2 & b_2 & c_2 & d_2 & 0 & 0 & \cdots & 0 & 0 & 0 & 0 \\ 0 & 0 & a_3 & b_3 & c_3 & d_3 & \cdots & 0 & 0 & 0 & 0 \\ 0 & 0 & a_4 & b_4 & c_4 & d_4 & \cdots & 0 & 0 & 0 & 0 \\ \vdots & \vdots & \vdots & \vdots & \vdots & \vdots & \ddots & \vdots & \vdots & \vdots & \vdots \\ 0 & 0 & 0 & 0 & 0 & 0 & \cdots & a_{2J-3} & b_{2J-3} & b_{2J-3} & d_{2J-3} \\ 0 & 0 & 0 & 0 & 0 & 0 & \cdots & a_{2J-2} & b_{2J-2} & c_{2J-2} & d_{2J-2} \\ 0 & 0 & 0 & 0 & 0 & 0 & \cdots & 0 & 0 & c_{2J} & d_{2J} \end{bmatrix}_{M} \quad (35)$$

$$\underbrace{\begin{bmatrix} \Delta H_0 \\ \Delta q_0 \\ \Delta H_1 \\ \Delta q_1 \\ \vdots \\ \Delta H_{J-1} \\ \Delta q_{J-1} \\ \Delta H_J \\ \Delta q_J \end{bmatrix}}_{\Delta X} = \underbrace{\begin{bmatrix} F_1 \\ F_2 \\ F_3 \\ F_4 \\ \vdots \\ F_{2J-3} \\ F_{2J-2} \\ F_{2J-1} \\ F_{2J} \end{bmatrix}}_{F};$$

where M represents a sensitivity coefficient matrix; ΔX represents a variation matrix of water level and flow rate at points; F represents a constant matrix at a current time; elements in the M and elements in the F are constants; the elements in the M are partial derivatives of water level and flow rate at time n; the elements in the F are products of space-time difference results of the $f_1$ or $f_2$ and −Dt; $a_0$, $b_0$ and $F_1$ are determined by the upstream boundary condition; and $c_{2J}$, $d_{2J}$ and $F_{2J}$ are determined by the downstream boundary condition; the remaining elements are determined by calculated by partial derivatives such as $\alpha_{2j-2}$ and $\alpha_{2j-1}$ in equation (36); when the subscript of the element a is an odd number, the element a is obtained by taking the partial derivative of $f_1$ with respect to the water level at the point (j−1, n); when the subscript of the element a is an even number, the element a is obtained by taking the partial derivative of $f_2$ with respect to the water level at point (j−1, n); when the subscript of the element b is an odd number, the element b is obtained by taking the partial derivative of $f_1$ with respect to the flow rate at the point (j−1, n); when the subscript of the element b is an even number, the element b is obtained by taking the partial derivative of $f_2$ with respect to the flow rate at the point (j−1, n); when the subscript of the element c is an odd number, the element c is obtained by taking the partial derivative of $f_1$ with respect to the water level at the point (j, n); when the subscript of the element c is an even number, the element c is obtained by taking the partial derivative of $f_2$ with respect to the water level at the point (j, n); when the subscript of the element d is an odd number, the element d is obtained by taking the partial derivative of $f_1$ with respect to the flow rate at the point (j, n); when the subscript of the element d is an even number, the element d is obtained by taking the partial derivative of $f_2$ with respect to the flow rate at the point (j, n); when the subscript of the element F is an even number, the element F is obtained by multiplying the spatio-temporal difference result of $f_1$ with respect to the water level at the spatial point j−1 by −Dt; when the subscript of the element F is an odd number, the element F is obtained by multiplying spatio-temporal difference result of $f_2$ with respect to the water level at the spatial point j−1 by −Dt.

The elements in the M are obtained through the following equation:

$$\begin{cases} a_{2j-1} = \dfrac{\partial f_1}{\partial H_{j-1}^n}, b_{2j-1} = \dfrac{\partial f_1}{\partial q_{j-1}^n}, c_{2j-1} = \dfrac{\partial f_1}{\partial H_j^n}, d_{2j-1} = \dfrac{\partial f_1}{\partial q_j^n} \\ a_{2j} = \dfrac{\partial f_2}{\partial H_{j-1}^n}, b_{2j} = \dfrac{\partial f_2}{\partial q_{j-1}^n}, c_{2j} = \dfrac{\partial f_2}{\partial H_j^n}, d_{2j} = \dfrac{\partial f_2}{\partial q_j^n} \\ a_0 = \dfrac{\partial f^u}{\partial H_0^n}, b_0 = \dfrac{\partial f^u}{\partial q_0^n}, c_{2J} = \dfrac{\partial f^d}{\partial H_j^n}, d_{2J} = \dfrac{\partial f^d}{\partial q_j^n} \end{cases} \quad (36)$$

(S703) A relationship between a power increment of a pump station and a flow rate increment at point (j, n) where the pump station is located is obtained through equations (37) and (38):

$$\frac{\partial f_{\{1,2\}}}{\partial P_{P_I,n}^p} = \frac{\partial f_{\{1,2\}}}{\partial q_j^n} \frac{\partial q_j^n}{\partial q_{P_I,n}^p} \frac{\partial q_{P_I,n}^p}{\partial P_{P_I,n}^p}; \text{ and} \quad (37)$$

$$\frac{\partial q_j^n}{\partial q_{P_I,n}^p} \frac{\partial q_{P_I,n}^p}{\partial P_{P_I,n}^p} = \frac{1000 \eta_{P_I}^p}{B_I \rho g H_{P_I}^{st}}; \quad (38)$$

where $P_I$ represents index of a pump station connected to the channel I, $\partial f_{\{1,2\}}/\partial P_{P_I,n}^p$ represents a partial derivative of $f_1$ or $f_2$ with respect to $P_{P_I,n}^p$; $P_{P_I,n}^p$ represents an active load of the pump station $P_I$ at time n; $q_{P_I,n}^p$ represents a flow rate of the pump station $P_I$ at time n; $H_{P_I}^{st}$ represents a water head of the pump station $P_I$; $\eta_{P_I}^p$ represents an operation efficiency of the pump station $P_I$.

(S704) The equations (37) and (38) are plugged into the sensitivity matrix to expand the M into M', such that the watershed-electricity composite sensitivity matrix of individual channels is expressed as:

$$\underbrace{\begin{bmatrix} Z_{1,1} & Z_{1,2} & 0 & 0 & \cdots & 0 & 0 & 0 & 0 \\ Z_{2,1} & Z_{2,2} & Z_{2,3} & Z_{2,4} & \cdots & 0 & 0 & 0 & 0 \\ Z_{3,1} & Z_{3,2} & Z_{3,3} & Z_{3,4} & \cdots & 0 & 0 & 0 & 0 \\ \vdots & \vdots & \vdots & \vdots & \ddots & \vdots & \vdots & \vdots & \vdots \\ 0 & 0 & 0 & 0 & \cdots & Z_{4,1} & Z_{4,2} & Z_{4,3} & Z_{4,4} \\ 0 & 0 & 0 & 0 & \cdots & Z_{5,1} & Z_{5,2} & Z_{5,3} & Z_{5,4} \\ 0 & 0 & 0 & 0 & \cdots & 0 & 0 & Z_{6,1} & Z_{6,1} \end{bmatrix}}_{M'} \underbrace{\begin{bmatrix} \Delta H_0 \\ \Delta P_I^{p,u} \\ \Delta H_1 \\ \Delta q_1 \\ \vdots \\ \Delta H_{J-1} \\ \Delta q_{J-1} \\ \Delta H_J \\ \Delta P_I^{p,d} \end{bmatrix}}_{\Delta X'} = \underbrace{\begin{bmatrix} F_1 \\ F_2 \\ F_3 \\ F_4 \\ \vdots \\ F_{2J-3} \\ F_{2J-2} \\ F_{2J-1} \\ F_{2J} \end{bmatrix}}_{F}; \quad (39)$$

where M' represents a sensitivity coefficient expansion matrix; ΔX' represents a variation expansion matrix of water level and flow rate; F represents a constant matrix at a current time; the elements in the F are products of the space-time difference results of the $f_1$ or $f_2$ and −Dt; $\Delta P_I^{p,u}$ represents a power increment of a pump station located upstream of the channel I; $\Delta P_I^{p,d}$ represents a power increment of a pump station located downstream of the channel I. Specifically, the first and last terms of the F are determined by the boundary conditions, even terms of F are obtained by multiplying the results of the space-time difference of equation (6) by −Dt, and odd terms of F are obtained by multiplying the results of the space-time difference of equation (7) by −Dt.

Specifically, $$Z_{1,1} = \frac{\partial f^u}{\partial H_0}; Z_{1,2} = \frac{\partial f^u}{\partial q_0} \frac{\partial q_0}{\partial q_I^{p,u}} \frac{\partial q_I^{p,u}}{\partial P_I^{p,u}}; Z_{2,1} = \frac{\partial f_1}{\partial H_0};$$

$$Z_{2,2} = \frac{\partial f_1}{\partial q_0} \frac{\partial q_0}{\partial q_I^{p,u}} \frac{\partial q_I^{p,u}}{\partial P_I^{p,u}}; Z_{2,3} = \frac{\partial f_1}{\partial H_1}; Z_{2,4} = \frac{\partial f_1}{\partial q_1}; Z_{3,1} = \frac{\partial f_1}{\partial q_1};$$

$$Z_{3,2} = \frac{\partial f_2}{\partial q_{J-1}} \frac{\partial q_0}{\partial q_I^{p,u}} \frac{\partial q_I^{p,u}}{\partial P_I^{p,u}}; Z_{3,3} = \frac{\partial f_2}{\partial H_1}; Z_{3,4} = \frac{\partial f_2}{\partial q_1}; Z_{4,1} = \frac{\partial f_1}{\partial H_{J-2}};$$

$$Z_{4,2} = \frac{\partial f_1}{\partial q_{J-2}}; Z_{4,3} = \frac{\partial f_1}{\partial H_{J-1}}; Z_{4,4} = \frac{\partial f_1}{\partial q_{J-1}} \frac{\partial q_{J-1}}{\partial q_I^{p,d}} \frac{\partial q_I^{p,d}}{\partial P_I^{p,d}};$$

$$Z_{5,1} = \frac{\partial f_2}{\partial H_{J-2}}; Z_{5,2} = \frac{\partial f_2}{\partial q_{J-2}};$$

$q_I^{p,u}$ represents a flow rate of the pump station located upstream of the channel I; $q_I^{p,d}$ represents a flow rate of the pump station located downstream of the channel I; $P_I^{p,u}$ represents an active load of the pump station located upstream of the channel I; and $P_I^{p,d}$ represents an active load of the pump station located downstream of the channel I.

(S705) Sensitivity matrices of all channels in the watershed network are combined to obtain the watershed-electricity composite sensitivity matrix of the watershed network, expressed as:

$$\begin{bmatrix} M_1' & 0 & 0 & \cdots & 0 & 0 \\ 0 & M_2' & 0 & \cdots & 0 & 0 \\ 0 & 0 & \ddots & \cdots & 0 & 0 \\ 0 & \cdots & 0 & M_I' & \cdots & 0 \\ 0 & \cdots & \cdots & \cdots & \ddots & 0 \\ 0 & 0 & \cdots & 0 & 0 & M_{I_*}' \end{bmatrix} \begin{bmatrix} \Delta X_1' \\ \Delta X_2' \\ \vdots \\ \Delta X_I' \\ \vdots \\ \Delta X_{I_*}' \end{bmatrix} = \begin{bmatrix} F_1 \\ F_2 \\ \vdots \\ F_I \\ \vdots \\ F_{I_*} \end{bmatrix}; \quad (40)$$

where $M_I'$ represents a sensitivity coefficient expansion matrix of the channel I; $\Delta X_I'$ represents $\Delta X'$ of the channel I, which represents a variation expansion matrix of water level and flow rate of the channel I; $F_I$ represents F of the channel I; and I* represents the number of channels in the watershed network.

Specifically, a large number of channels are distributed in the watershed network, and their storage capacity combined with pump stations can provide abundant flexible resources for the urban distribution network.

Specifically, the load of the pump stations distributed in the watershed network can provide flexible resource for the urban distribution network. An adjustment amount of the power of the pump stations should be adjusted according to a requirement of flexible resource of the urban distribution network. In order to characterize the flexibility of the watershed network, a basic scenario is determined as follows: without considering the flexibility provided by the watershed network to the urban distribution network, the watershed network operates only to drain excess rainwater, and the basic power of the pump station can be adjusted up and down in this scenario, and the maximum adjustment range is the time-varying adjustable power domain. The time-varying adjustable power domain is required to satisfy the maximum and minimum storage capacities, ramp power, and power limits of pump station load.

The water level at each points of the channel varies with the operating power of the pump station, directly affecting the storage volume of the channel and lake, which in turn, affects the space-time flexibility of pump station load. Thus, this application provides the flexibility assessment method of pump station based on the watershed-electricity composite sensitivity matrix to assess and calculate the time-varying adjustable power domain of the pump station.

In step (S150), the time-varying adjustable power domain is estimated through the following steps.

(S801) A baseline active load of each pump station is obtained through optimal scheduling of the watershed network under a basic scenario, and the time-varying adjustable power domain of each pump station is estimated using equation (41):

$$F_i^n = \begin{cases} \Delta P_{i,n}^p \in \Box & \begin{vmatrix} \underline{P}_i^p \leq \tilde{P}_{i,n}^p + \Delta P_{i,n}^p \leq \overline{P}_i^p, \forall i \in P \\ S_{i,a,min} \leq \tilde{S}_{i,a}^n + \frac{1000\eta_{P_i}^p \Delta P_{P_i,n}^p \Delta t}{\rho g H_{P_i}^{st}} \leq S_{i,a,max}, \forall i \in P_a \\ S_{i,c,min} \leq \tilde{S}_{i,c}^n + \frac{1000\eta_i^p \Delta P_{P_i,n}^p \Delta t}{\rho g H_{P_i}^{st}} \leq S_{i,c,max}, \forall i \in P_{ch} \\ |\tilde{P}_{i,n}^p + \Delta P_{i,n}^p - P_{i,n-1}^p| \leq R_i^p, \forall i \in P \end{vmatrix} \end{cases}, \quad (41)$$

where $\overline{P}_i^p$ represents an upper limit of the active load of the pump station i; $\underline{P}_i^p$ represents a lower limit of the active load of the pump station i; $\tilde{S}_{i,n}$ represents a baseline storage volume of channel i or lake i; $\tilde{P}_{i,n}^p$ represents a baseline active load of the pump station i; $\Delta P_{i,n}^p$ represents a power adjustment of an active load of the pump station i; $F_i^n$ represents the time-varying adjustable power domain of the pump station i at time n; $\Box$ represents a real number set; $S_{i,a,min}$ represents a minimum storage volume of the lake i; $S_{i,a,max}$ represents a maximum storage volume of the lake i; $\tilde{S}_{i,a}^n$ represents a baseline storage volume of the lake i at time n; $\eta_{P_i}^p$ represents an operation efficiency of the pump station connected to the channel i or the lake i; $\Delta P_{P_i,n}^p$ represents a power adjustment of an active load of the pump station connected to the channel i or the lake i; $P_a$ represents a set of pump stations connected to the lake i; $P_{ch}$ represents a set of pump stations connected to the channel i; P represents a set of pump stations; $S_{i,c,min}$ represents a minimum storage volume of the channel i; $S_{i,c,max}$ represents a maximum storage volume of the channel i; and $\tilde{S}_{i,c}^n$ represents a baseline storage volume of the channel i at time n.

In step (S150), the time-varying adjustable power domain is corrected through the following steps (S802) The time-varying adjustable power domain is corrected according to the adjustment amount and expressed as:

$$F_i^{*,n} = \{\Delta P_{i,n}^p \in \Box \ | P_{i,n}^{fle,min} \leq \Delta P_{i,n}^p + dP_n^p \leq P_{i,n}^{fle,max}\} \quad (42),$$

where $P_{i,n}^{fle,max}$ represents a corrected upper bound of the time-varying adjustable power for the pump station i at time n; $P_{i,n}^{fle,min}$ represents a corrected lower bound of the time-varying adjustable power for the pump station i at time n; $F_i^{*,n}$ represents a real time-varying adjustable power domain of the pump station i at time n; $\Delta P_{i,n}^p$ represents an adjustment amount of the active load of the pump station i at time n; and $dP_n^p$ represents a certain margin of adjustable power reserved because higher-order terms in (34) are ignored, which is generally determined by the experiences based on operation states.

In an embodiment, the step (S160) includes the following steps.

(S901) Optimal coordinated rolling scheduling is performed on a pump station group distributed in the watershed network, where a plurality of stochastic scenarios are generated according to uncertainty of rainfall prediction at a future moment; an objective of watershed network hydraulic energy flow optimization is to minimize an operational cost of the pump station group; the operational cost comprises an electricity consumption cost of the pump station group and an expected electricity consumption cost of the pump station group in the plurality of stochastic scenarios; and the hydraulic energy flow optimization model is expressed as:

$$\min\left\{ELC_{n_0} + \sum_{s=1}^{NS}\pi_s\left(\sum_{n=n_0+1}^{n_0+N_T}ELC_{n,s}\right)\right\}; \quad (43)$$

$$ELC_n = C_{E,n}\Delta t \sum_{i\in P}P_{i,n}^p; \quad (44)$$

s.t. the equations (6)-(20) and (30)-(33) (45);

where $ELC_n$ represents an electricity consumption cost of the pump station group at time n; $ELC_{n,s}$ represents an electricity consumption cost of the pump station group at time n under scenario s; $n_0$ represents an initial moment of the watershed network hydraulic energy flow optimization; NS represents a total number of the plurality of stochastic scenarios; $N_T$ represents a length of a predicted time horizon; $\pi_s$ represents an occurrence probability of the scenario s; $\Sigma_{s=1}^{NS}\pi_s=1$; and $C_{E,n}$ represents an electricity price of the urban distribution network at time n.

(S902) The power flow optimization model is constructed. A power flow of the urban distribution network and a power of individual generators are optimized by using the flexible resource of the pump station group, so as to minimize an operational cost of the urban distribution network at a current time.

The operational cost $DC_n$ includes a cost $DC_{1n}$ for purchasing power from a main grid, a generator operation cost $DC_{2n}$, an incentive cost $DC_{3n}$ of flexible resources of the watershed network and an electricity-selling profit $DC_{4n}$. The power flow optimization model is expressed as:

$$\begin{cases} \min DC_n = DC_{1n} + DC_{2n} + DC_{3n} - DC_{4n} \\ DC_{1n} = C_{mg,n}P_n^{mg} \\ DC_{2n} = \sum_{g\in G}a_g(P_{g,n}^{CDG})^2 + b_g(P_{g,n}^{CDG}) + c_g \\ DC_{3n} = C_{IN,n}\sum_{i\in P}\hat{P}_{i,n}^{fle} \\ DC_{4n} = C_{E,n}\sum_{j\in J}\sum_{i\in P_j}(P_{i,n}^p + P_{i,n}^{fle} + P_{j,n}^{load}) \end{cases} ;\text{ and} \quad (46)$$

$$\text{s.t.}\begin{cases} \text{the equations (21)-(29)} \\ P_{i,n}^{fle,min} \leq P_{i,n}^{fle} \leq P_{i,n}^{fle,max}, \forall i\in P, \forall n\in T^* \\ P_{i,n}^{fle} \leq \hat{P}_{i,n}^{fle}, \forall i\in P, \forall n\in T^* \\ -P_{i,n}^{fle} \leq \hat{P}_{i,n}^{fle}, \forall i\in P, \forall n\in T^* \end{cases} ; \quad (47)$$

where $C_{mg,n}$ represents an electricity price of the main grid at time n; $P_n^{mg}$ represents an electricity purchasing quantity of the urban distribution network from the main grid at time n; $C_{IN,n}$ represents an incentive price of the flexible resource at time n; $a_g$, $b_g$ and $c_g$ are cost coefficients of the generator g; $P_{i,n}^{fle,min}$ represents a lower limit of an adjustable power of the pump station i at time n; $P_{i,n}^{fle,max}$ represents an upper limit of the adjustable power of the pump station i at time n; $\hat{P}_{i,n}^{fle}$ is an auxiliary variable; and $P_{i,n}^{fle}$ represents an adjustment amount of the active load of the pump station i set by the urban distribution network at time n.

Figure 5:
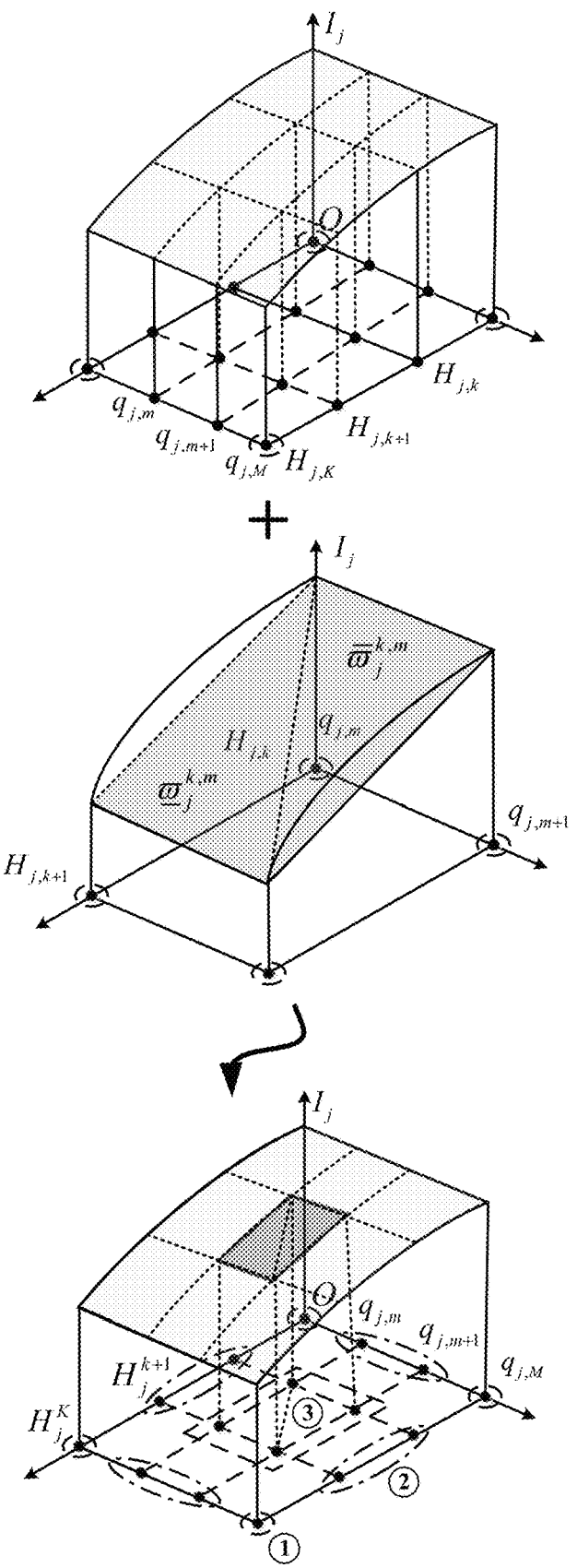
FIG. 5 schematically illustrates a multidimensional piecewise linearization method according to an embodiment of the present disclosure.

(S903) The equations (8) and (9) are converted to a set of linear constraints by using a multidimensional piecewise linearization method shown in FIG. 5.

Briefly, the superscript n of $H_j^n$ and $q_j^n$ is neglected in the process of elaborating how to carry out the multi-dimensional piecewise linearization.

Referring to FIG. 5, a value range $[0, H_j^{max}]$ of $H_j$ is divided into K segments by $H_{j,0}$, $H_{j,1}$, ... and $H_{j,K}$. A value range $[0, q_j^{max}]$ of $q_j$ is divided into M segments by $q_{j,0}$, $q_{j,1}$, ... and $q_{j,M}$. $H_j^{max}$ is a maximum of $H_j$. $q_j^{max}$ is a maximum of $q_j$. Accordingly, domains of equations (8) and (9) are divided into a rectangular grid composed of a plurality of rectangles. Vertices of a rectangle are denoted by $(H_{j,k}, q_{j,m})$, $(H_{j,k+1}, q_{j,m})$, $(H_{j,k}, q_{j,m+1})$ and $(H_{j,k+1}, q_{j,m+1})$. Vertices of each rectangle are defined a set of continuous variables. Each rectangle can be divided into two triangles (an upper right triangle and a lower left triangle). 0-1 variables $\overline{\omega}_j^{k,m}$ and $\underline{\omega}_j^{k,m}$ are used to indicate whether a point falls within the upper right triangle and lower left triangles. $\hat{I}_j$ is a linear approximation of $I_j$. $\hat{R}_j$ is a linear approximation of $R_j$. Therefore, the equations (8) and (9) are converted to equations (48)-(59):

$$\hat{I}_j = \sum_{k=0}^{K}\sum_{m=0}^{M}\lambda_j^{k,m}I(H_{j,k}, q_{j,m}); \quad (48)$$

$$\hat{R}_j = \sum_{k=0}^{K}\sum_{m=0}^{M}\lambda_j^{k,m}R(H_{j,k}, q_{j,m}); \quad (49)$$

$$H_j = \sum_{k=0}^{K}\sum_{m=0}^{M}H_{j,k}\lambda_j^{k,m}, q_j = \sum_{k=0}^{K}\sum_{m=0}^{M}q_{j,m}\lambda_j^{k,m}; \quad (50)$$

$$\sum_{k=0}^{K-1}\sum_{m=0}^{M-1}\left(\overline{\omega}_j^{k,m} + \underline{\omega}_j^{k,m}\right) = 1, \forall \overline{\omega}_j^{k,m}, \underline{\omega}_j^{k,m} \in \{0, 1\}; \quad (51)$$

$$\sum_{k=0}^{K}\sum_{m=0}^{M}\lambda_j^{k,m} = 1, \forall \lambda_j^{k,m} \in [0, 1]; \quad (52)$$

$$\lambda_j^{0,0} \leq \overline{\omega}_j^{0,0}, +\underline{\omega}_j^{0,0}, \lambda_j^{K,M} \leq \overline{\omega}_j^{K-1,M-1} + \underline{\omega}_j^{K-1,M-1}; \quad (53)$$

$$\lambda_j^{K,0} \leq \underline{\omega}_j^{K-1,0}, \lambda_j^{0,M} \leq \overline{\omega}_j^{0,M-1}; \quad (54)$$

$$\lambda_j^{k,0} \leq \underline{\omega}_j^{k-1,0} + \overline{\omega}_j^{k,0} + \underline{\omega}_j^{k,0}, \forall k = 1, \ldots, K-1; \quad (55)$$

$$\lambda_j^{K,m} \leq \underline{\omega}_j^{k-1,M-1} + \overline{\omega}_j^{K-1,M-1} + \overline{\omega}_j^{k,M-1}, \forall k = 1, \ldots, K-1; \quad (56)$$

$$\lambda_j^{0,m} \leq \overline{\omega}_j^{0,m-1} + \overline{\omega}_j^{0,m} + \underline{\omega}_j^{0,m}, \forall m = 1, \ldots, M-1; \quad (57)$$

$$\lambda_j^{K,m} \leq \underline{\omega}_j^{K-1,m-1} + \overline{\omega}_j^{K-1,m-1} + \underline{\omega}_j^{K-1,m}, \forall m = 1, \ldots, M-1; \quad (58)$$

$$\lambda_j^{k,m} \leq \overline{\omega}_j^{k,m-1} + \overline{\omega}_j^{k-1,m-1} + \overline{\omega}_j^{k,m} + \underline{\omega}_j^{k-1,m-1} + \underline{\omega}_j^{k-1,m} + \underline{\omega}_j^{k,m}, \quad (59)$$

$$\forall k = 1, \ldots, K-1, \forall m = 1, \ldots, M-1.$$

Specifically, $\lambda_j^{k,m}$ is a continuous variable at point $(H_{j,k}, q_{j,m})$ of the rectangular grid. $H_{j,k}$ is a $k^{th}$ partition point of $[0, H_j^{max}]$. $\hat{I}_j$ is an auxiliary variable introduced to approximately replace $I_j$. $\hat{R}_j$ is an auxiliary variable introduced to approximately replace $R_j$. $q_{j,m}$ is a $m^{th}$ partition point of $[0, q_j^{max}]$. $\overline{\omega}_j^{k,m}$ is a 0-1 variable corresponding to an upper-half triangle of the rectangle in the rectangular grid with point ($H_{j,k}$,$q_{j,m}$) as an upper-left vertex. $\underline{\varpi}_j^{k,m}$ is a 0-1 variable corresponding to a lower-half triangle of the rectangle in the rectangular grid with point ($H_{j,k}$,$q_{j,m}$) as an upper-left vertex. $\lambda_j^{0,0}$ is a continuous variable at point ($H_{j,0}$,$q_{j,0}$). $\overline{\varpi}_j^{0,0}$ is a 0-1 variable corresponding to an upper-half triangle of the rectangle in the rectangular grid with point ($H_{j,0}$, $q_{j,0}$) as an upper-left vertex. $\underline{\varpi}_j^{0,0}$ is a 0-1 variable corresponding to a lower-half triangle of the rectangle in the rectangular grid with point ($H_{j,0}$,$q_{j,0}$) as an upper-left vertex. $\lambda_j^{K,M}$ is a continuous variable at point ($H_{j,K}$,$q_{j,M}$). $\overline{\varpi}_j^{K-1,M-1}$ is a 0-1 variable corresponding to an upper-half triangle of the rectangle in the rectangular grid with point ($H_{j,K-1}$,$q_{j,M-1}$) as an upper-left vertex. $\underline{\varpi}_j^{K-1,M-1}$ is a 0-1 variable corresponding to a lower-half triangle of the rectangle in the rectangular grid with point ($H_{j,K-1}$,$q_{j,M-1}$) as an upper-left vertex. $\lambda_j^{k,0}$ is a continuous variable at point ($H_{j,k}$,$q_{j,0}$). $\overline{\varpi}_j^{k-1,0}$ is a 0-1 variable corresponding to a lower-half triangle of the rectangle in the rectangular grid with point ($H_{j,k-1}$,$q_{j,0}$) as an upper-left vertex. $\overline{\varpi}_j^{k,0}$ is a 0-1 variable corresponding to an upper-half triangle of the rectangle in the rectangular grid with point ($H_{j,k}$,$q_{j,0}$) as an upper-left vertex. $\underline{\varpi}_j^{k,0}$ is a 0-1 variable corresponding to a lower-half triangle of the rectangle in the rectangular grid with point ($H_{j,k}$,$q_{j,0}$) as an upper-left vertex. $\overline{\varpi}_j^{k,M-1}$ is a 0-1 variable corresponding to an upper-half triangle of the rectangle in the rectangular grid with point ($H_{j,k}$,$q_{j,M-1}$) as an upper-left vertex. $\lambda_j^{0,m}$ is a continuous variable at point ($H_{j,0}$,$q_{j,m}$). $\overline{\varpi}_j^{0,m-1}$ is a 0-1 variable corresponding to an upper-half triangle of the rectangle in the rectangular grid with point ($H_{j,0}$,$q_{j,m-1}$) as an upper-left vertex. $\underline{\varpi}_j^{0,m}$ is a 0-1 variable corresponding to an upper-half triangle of the rectangle in the rectangular grid with point ($H_{j,0}$,$q_{j,m}$) as an upper-left vertex. $\overline{\varpi}_j^{0,m}$ is a 0-1 variable corresponding to a lower-half triangle of the rectangle in the rectangular grid with point ($H_{j,0}$,$q_{j,m}$) as an upper-left vertex. $\lambda_j^{K,m}$ is a continuous variable at point ($H_{j,K}$,$q_{j,m}$). $\overline{\varpi}_j^{K-1,m-1}$ is a 0-1 variable corresponding to a lower-half triangle of the rectangle in the rectangular grid with point ($H_{j,K-1}$,$q_{j,m-1}$) as an upper-left vertex. $\underline{\varpi}_j^{K-1,m-1}$ is a 0-1 variable corresponding to an upper-half triangle of the rectangle in the rectangular grid with point ($H_{j,K-1}$,$q_{j,m-1}$) as an upper-left vertex. $\underline{\varpi}_j^{K-1,m}$ is a 0-1 variable corresponding to a lower-half triangle of the rectangle in the rectangular grid with point ($H_{j,K-1}$,$q_{j,m}$) as an upper-left vertex. $\overline{\varpi}_j^{k,m-1}$ is a 0-1 variable corresponding to an upper-half triangle of the rectangle in the rectangular grid with point ($H_{j,k}$,$q_{j,m-1}$) as an upper-left vertex. $\underline{\varpi}_j^{k-1,m-1}$ is a 0-1 variable corresponding to an upper-half triangle of the rectangle in the rectangular grid with point ($H_{j,k-1}$,$q_{j,m-1}$) as an upper-left vertex. $\overline{\varpi}_j^{k-1,m-1}$ is a 0-1 variable corresponding to an upper-half triangle of the rectangle in the rectangular grid with point ($H_j^{k-1}$,$q_j^{m-1}$) as an upper-left vertex. $\underline{\varpi}_j^{k-1,m-1}$ is a 0-1 variable corresponding to a lower-half triangle of the rectangle in the rectangular grid with point ($H_j^{k-1}$, $q_j^{m-1}$) as an upper-left vertex. $\overline{\varpi}_j^{k-1,m}$ is a 0-1 variable corresponding to a lower-half triangle of the rectangle in the rectangular grid with point ($H_{j,k-1}$,$q_{j,m}$) as an upper-left vertex.

In an embodiment, the step (S170) includes the following steps.

(S1010) The coordinated operation model is initialized, where a current scheduling period is set to n=1; a scheduling duration is 24 h; Dx of individual channels in the watershed network is set to 100 m; and a duration of a scheduling period D t is set to 1 h. Specifically, Dx can be 500 m or 1 km.

(S1020) Parameters are input to the coordinated operation model, where the parameters include topological information of the watershed network, a width $B_I$ of each channel, a length $L_I$ of each channel, water level $H_{j,I}^{n-1}$ and flow rate $q_{j,I}^{n-1}$ of each channel in the watershed network at time n−1, an operation state of each of the one or more pump stations at time n−1, a power $P_{i,n-1}^P$ of each pump station at time n−1, topological information of the urban distribution network, load information of each bus, and an operation state and power of each of the one or more generators in the urban distribution network at time n−1; and $H_{j,I}^{n-1}$ and $q_{j,I}^{n-1}$ are taken as initial conditions of the watershed network.

(S1030) A power of each of the one or more pump stations and a hydraulic energy flow state of each channel in the watershed network at the current scheduling period are optimized based on the hydraulic energy flow optimization model, so as to obtain an optimal power $P_{i,n}^P$ of each of the one or more pump stations at the current scheduling period.

(S1040) A time-varying adjustable flexible power domain $[P_{i,n}^{fle,min}, P_{i,n}^{fle,max}]$ of each of the one or more pump stations is calculated based on the flexibility assessment method; and the $P_{i,n}^P$ and the $[P_{i,n}^{fle,min}, P_{i,n}^{fle,max}]$ of each of the one or more pump stations are transmitted to the urban distribution network.

(S1050) A flexible power $P_{i,n}^{fle}$ of each of the one or more pump stations required by the urban distribution network is calculated and optimized based on the hydraulic energy flow optimization model. The $P_{i,n}^{fle}$ is transmitted to each of the one or more pump stations, and an incentive fee is paid to each of the one or more pump stations in the watershed network.

(S1060) The $P_{i,n}^{fle}$ is received by the watershed network based on the hydraulic energy flow optimization model. The $P_{i,n}^P$ of each of the one or more pump stations is adjusted to $P_{i,n}^P + P_{i,n}^{fle}$ to calculate a watershed network hydraulic energy flow, so as to update a water level and flow rate at each node in the watershed network at time n.

(S1070) Whether the electricity-water energy flow interactive optimization is finished is determined through steps of:

letting n=n+1, and determining whether n≤24; if yes, returning to step (S1020); otherwise, ending the electricity-water energy flow interactive optimization.

Figure 6:
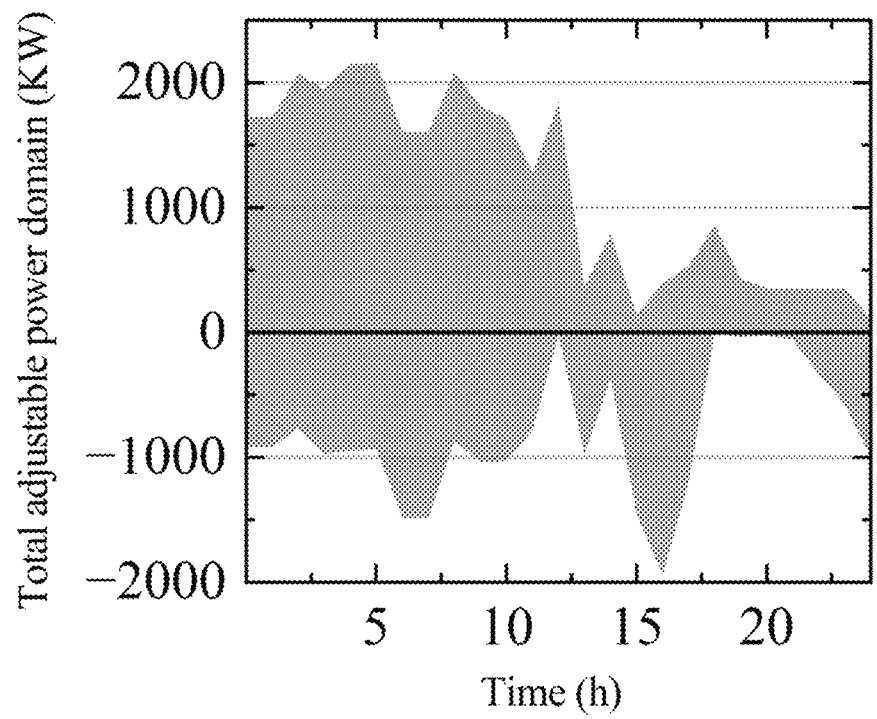
FIG. 6 shows a total adjustable power of pump stations in the watershed network according to an embodiment of the present disclosure.
Figure 7:
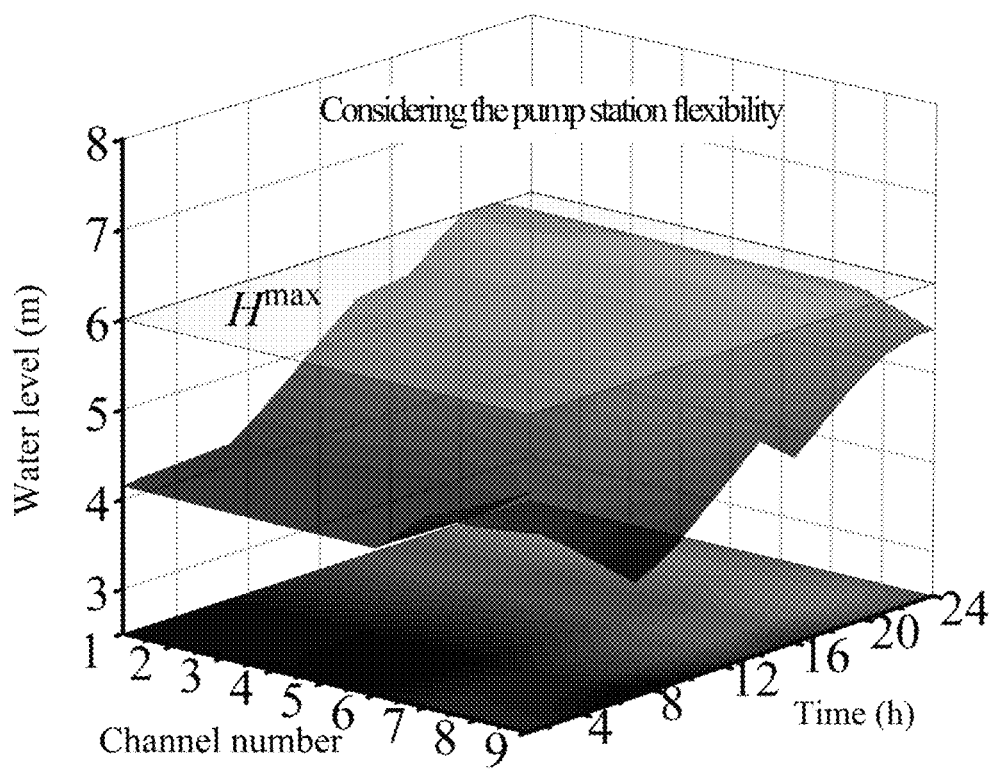
FIG. 7 shows water level variation of individual channels in the watershed network according to an embodiment of the present disclosure.

Specifically, based on the above-mentioned models and methods for flexibility assessment and optimal energy flow calculation of distribution network and watershed network, steps of the method are carried out programmatically in Python. A total adjustable power of the pump station group in the watershed network is shown in FIG. 6. The variations of water level of each channel in the watershed network are shown in FIG. 7. $H^{max}$ in FIG. 7 is the maximum water level.

The serial number of embodiments are for description only, and do not represent the advantage or disadvantages of the embodiments.

The processes described above with reference to the flowchart may be implemented as a computer software program with required common hardware platform, or hardware. Based on this, the technical solution of the present disclosure may be embodied in a software. The software may be stored in a memory (ROM/RAM, disk, optical disc). There are instructions to enable a terminal (such as phone, computer, server, air-conditioner and network equipment) to implement the embodiments of the disclosure.

The disclosure has been described above with reference to the accompanying drawings and embodiments. It should be noted that provided below are merely some embodiments of the disclosure, which are not intended to limit the disclosure.

Those changes and improvements content made by those skilled in the art based on the content disclosed herein without departing from the scope of the disclosure shall fall within the scope of the present disclosure defined by the appended claims.

What is claimed is:

1. A system for flexible coordinated operation of an urban distribution network and a watershed network, comprising:
   one or more generators configured to provide electrical energy to one or more drainage pump stations distributed in the watershed network;
   a distribution network coupled to the one or more generators, the one or more drainage pump stations and a main grid, wherein the distribution network is configured to transmit electrical energy; and
   a controller;
   wherein the controller comprises a processor and a memory coupled to the processor; and the controller is in communication with the one or more generators, the one or more drainage pump stations, and the main grid;
   wherein the controller is configured to perform:
   (a) constructing a watershed network dynamic operation model based on a de Saint-Venant nonlinear-hyperbolic-partial differential equation system;
   (b) constructing a river water storage model and a lake water storage model based on the watershed network dynamic operation model;
   (c) constructing a distribution network linear alternating-current (AC) power flow model; and based on the watershed network dynamic operation model and the distribution network linear AC power flow model, constructing an operating power-flow rate operation model of the one or more drainage pump stations to obtain a coordinated operation model of the urban distribution network and the watershed network;
   (d) constructing a watershed-electricity composite sensitivity matrix by using Taylor series expansion to reflect a mathematical relationship between variation of water level at individual points of the watershed network and a power increment of the one or more drainage pump stations, and a mathematical relationship between variation of flow rate at individual points of the watershed network and the power increment of the one or more drainage pump stations;
   (e) quantifying a time-varying adjustable power domain of a load of each of the one or more drainage pump stations through a pump station flexibility assessment method based on the watershed-electricity composite sensitivity matrix;
   (f) constructing a power flow optimization model of the urban distribution network and a hydraulic energy flow optimization model of the watershed network; and converting a non-convex nonlinear hydraulic energy flow optimization problem into a mixed-integer linear programming problem through a multidimensional piecewise linearization method; and
   (g) based on the coordinated operation model, the time-varying adjustable power domain, the flexibility assessment method, the power flow optimization model and the hydraulic energy flow optimization model, performing electricity-water energy flow interactive optimization involving a flexible resource of the one or more drainage pump stations to realize the flexible coordinated operation of the urban distribution network and the watershed network;
   wherein the time-varying adjustable power domain is quantified through steps of:
   estimating the time-varying adjustable power range of each of the one or more pump stations;
   successively calculating the watershed-electricity composite sensitivity matrix and an adjustment amount; and
   correcting the time-varying adjustable power domain until there is no water level out of a preset limit;
   the time-varying adjustable power domain is estimated through steps of:
   obtaining a baseline power consumption of the load of each of the one or more pump stations through optimal scheduling of the watershed network under a basic scenario; and estimating the time-varying adjustable power domain of each of the one or more pump stations using equation (41):

$$F_i^n = \left\{ \Delta P_{i,n}^p \in \square \left| \begin{array}{l} \underline{P}_i^p \leq \tilde{P}_{i,n}^p + \Delta P_{i,n}^p \leq \overline{P}_i^p, \forall i \in P \\ S_{i,a,min} \leq \tilde{S}_{i,a}^n + \dfrac{1000\eta_{P_i}^p \Delta P_{P_i,n}^p \Delta t}{\rho g H_{P_i}^{st}} \leq S_{i,a,max}, \forall i \in P_a \\ S_{i,c,min} \leq \tilde{S}_{i,c}^n + \dfrac{1000\eta_i^p \Delta P_{P_i,n}^p \Delta t}{\rho g H_{P_i}^{st}} \leq S_{i,c,max}, \forall i \in P_{ch} \\ \left| \tilde{P}_{i,n}^p + \Delta P_{i,n}^p - P_{i,n-1}^p \right| \leq R_i^p, \forall i \in P \end{array} \right. \right\} \quad (41)$$

wherein $\overline{P}_i^p$ represents an upper limit of an active load of the pump station i; $\underline{P}_i^p$ represents a lower limit of the active load of the pump station i; $\tilde{S}_{i,n}$ represents a baseline storage volume of channel i or lake i; $\tilde{P}_{i,n}^p$ represents a baseline active load of the pump station i; $\Delta P_{i,n}^p$ represents a power adjustment of the active load of the pump station i; $F_i^n$ represents the time-varying adjustable power domain of the pump station i at time n; $\square$ represents a real number set; $S_{i,a,min}$ represents a minimum storage volume of the lake i; $S_{i,a,max}$ represents a maximum storage volume of the lake i; $\tilde{S}_{i,a}^n$ represents a baseline storage volume of the lake i at time n; $\eta_{P_i}^p$ represents an operation efficiency of a pump station connected to the channel i or the lake i; $\Delta P_{P,n}^p$ represents a power adjustment of an active load of the pump station connected to the channel i or the lake i; $P_a$ represents a set of pump stations connected to the lake i; $P_{ch}$ represents a set of pump stations connected to the channel i; P represents a set of pump stations; $S_{i,c,min}$ represents a minimum storage volume of the channel i; $S_{i,c,max}$ represents a maximum storage volume of the channel i; $\tilde{S}_{i,c}^n$ represents a baseline storage volume of the channel i at time n; $\rho$ is water density; $\eta_i^p$ represents an operation efficiency of the pump station i; g is gravitational acceleration; $R_i^p$ represents a maximum ramp rate of the pump station i; $H_{P_i}^{st}$ represents a water head of the pump station connected to a channel I; and Dt represents a duration of a scheduling period; and the time-varying adjustable power domain is corrected through steps of:
correcting the time-varying adjustable power domain according to the adjustment amount, and obtaining the time-varying adjustable power domain as:

$$F_i^{*,n} = \{\Delta P_{i,n}^p \in \square \mid P_{i,n}^{fle,min} \leq \Delta P_{i,n}^p + dP_n^p \leq P_{i,n}^{fle,max}\} \quad (42),$$

wherein $P_{i,n}^{fle,max}$ represents a corrected upper bound of the time-varying adjustable power for the pump station i at time n; $P_{i,n}^{fle,min}$ represents a corrected lower bound of the time-varying adjustable power for the pump station i at time n; $F_i^{*,n}$ represents a real time-varying adjustable power domain of the pump station i at time n; $\Delta P_{i,n}^p$ represents an adjustment amount of the active load of the pump station i at time n; and $dP_n^p$ represents a certain margin of adjustable power reserved because higher-order terms in (34) are ignored; and step (f) comprises:

performing an optimal coordinated rolling scheduling on the one or more pump stations distributed in the watershed network, wherein a plurality of stochastic scenarios are generated according to uncertainty of rainfall prediction at a future moment; an objective of watershed network hydraulic energy flow optimization is to minimize an operational cost of the one or more pump stations; the operational cost comprises an electricity consumption cost of the one or more pump stations and an expected electricity consumption cost of the one or more pump stations in the plurality of stochastic scenarios; and the hydraulic energy flow optimization model is expressed as:

$$\min \left\{ ELC_{n_0} + \sum_{s=1}^{NS} \pi_s \left( \sum_{n=n_0+1}^{n_0+N_T} ELC_{n,s} \right) \right\}; \text{ and} \quad (43)$$

$$ELC_n = C_{E,n} \Delta t \sum_{i \in P} P_{i,n}^p; \quad (44)$$

s.t. the equations (6)-(20) and (30)-(33) (45);

wherein $ELC_n$ represents an electricity consumption cost of the one or more pump stations at time n; $ELC_{n,s}$ represents an electricity consumption cost of the one or more pump stations at time n under scenario s; $n_0$ represents an initial time of the watershed network hydraulic energy flow optimization NS represents a total number of the plurality of stochastic scenarios; $N_T$ represents a length of a predicted time horizon; $\pi_s$ represents an occurrence probability of the scenario s; $\Sigma_{s=1}^{NS} \pi_s = 1$; and $C_{E,n}$ represents an electricity price of the urban distribution network at time n; and constructing the power flow optimization model; and optimizing a power flow of the urban distribution network and a power of individual generators by using the flexible resource of the one or more pump stations, so as to minimize an operational cost of the urban distribution network at a current time, wherein the operational cost $DC_n$ comprises a cost $DC_{1n}$ for purchasing power from a main grid, a generator operation cost $DC_{2n}$, an incentive cost $DC_{3n}$ of flexible resources of the watershed network and an electricity-selling profit $DC_{4n}$; and the power flow optimization model is expressed as:

$$\begin{cases} \min DC_n = DC_{1n} + DC_{2n} + DC_{3n} - DC_{4n} \\ DC_{1n} = C_{mg,n} P_n^{mg} \\ DC_{2n} = \sum_{g \in G} a_g (P_{g,n}^{CDG})^2 + b_g (P_{g,n}^{CDG}) + c_g \\ DC_{3n} = C_{IN,n} \sum_{i \in P} \hat{P}_{i,n}^{fle} \\ DC_{4n} = C_{E,n} \sum_{j \in J} \sum_{i \in P_j} \left( P_{i,n}^p + P_{i,n}^{fle} + P_{j,n}^{load} \right) \end{cases} \quad (46)$$

-continued $$\text{s.t.} \begin{cases} \text{the equations (21)-(29)} \\ P_{i,n}^{fle,min} \le P_{i,n}^{fle} \le P_{i,n}^{fle,max}, \forall i \in P, \forall n \in T^* \\ P_{i,n}^{fle} \le \hat{P}_{i,n}^{fle}, \forall i \in P, \forall n \in T^* \\ -P_{i,n}^{fle} \le \hat{P}_{i,n}^{fle}, \forall i \in P, \forall n \in T^* \end{cases} \quad (47)$$

wherein $C_{mg,n}$ represents an electricity price of the main grid at time n; $P_n^{mg}$ represents an electricity purchasing quantity of the urban distribution network from the main grid at time n; $C_{IN,n}$ represents an incentive price of the flexible resource at time n; $a_g$, $b_g$ and $c_g$ are cost coefficients of a generator g; $P_{i,n}^{fle,min}$ represents a lower limit of an adjustable power of the pump station i at time n; $P_{i,n}^{fle,max}$ represents an upper limit of the adjustable power of the pump station i at time n; $\hat{P}_{i,n}^{fle}$ is an auxiliary variable; $P_{i,n}^{fle}$ represents a power adjustment amount of the pump station i set by the urban distribution network at time n; P represents a set of the one or more pump stations in the watershed network; $T^*=\{1, 2, \ldots, N\}$, representing a time index set; G is a set of one or more generators; $P_{g,n}^{CDG}$ represents an active power generated by the distributed generator g at time n; J represents a bus set of the urban distribution network; $P_j$ represents a set of pump stations connected to the bus j; $P_{j,n}^{load}$ represents an active load at the bus j except for a pump station load at time n; $P_{i,n}^p$ represents an operation state and a power of pump station i at time n; and $C_{E,n}$ represents an electricity price of the urban distribution network.

2. The system of claim 1, wherein step (a) comprises:

characterizing water level and flow rate states along a channel by the de Saint-Venant nonlinear-hyperbolic-partial differential equation system to obtain a mass conservation equation and a momentum conservation equation, wherein the mass conservation equation is expressed as:

$$\frac{\partial A}{\partial t} + \frac{\partial Q}{\partial x} = r; \quad (1)$$

the momentum conservation equation is expressed as:

$$\frac{\partial Q}{\partial t} + \frac{\partial}{\partial x}\left[\frac{Q^2}{A}\right] + gA\frac{\partial H}{\partial x} = gA(S_b - S_f); \quad (2)$$

wherein $S_f$ is expressed as:

$$S_f = \left(M^2 Q|Q|l^{\frac{4}{3}}\right)/A^{\frac{10}{3}}; \quad (3)$$

wherein t is time; x represents a longitudinal distance along the channel direction; Q represents volumetric flow rate; A represents a cross-sectional area of a water flow; H represents a water level; g is gravitational acceleration; $S_b$ represents a river bed slope; $S_f$ represents a friction slope; M represents Manning coefficient; l represents channel wetted perimeter; and r represents rainfall intensity.

3. The system of claim 2, wherein step (a) further comprises:

simplifying the mass conservation equation into:

$$\frac{\partial H}{\partial t} + \frac{\partial q}{\partial x} = \frac{r}{B}; \tag{4}$$

simplifying the momentum conservation equation into:

$$\frac{\partial q}{\partial t} + \frac{\partial}{\partial x}\left[\frac{q^2}{H} + \frac{gH^2}{2}\right] = g\left[S_b - \frac{M^2 q^2 (2H+B)^{4/3}}{H^{7/3} B^{4/3}}\right]; \tag{5}$$

wherein H represents a water level; B represents a channel width; A represents a channel cross-sectional area; A=BH; Q=BHV; V represents a flow velocity; l=B+2H; q represents a flow rate per unit channel width; q=Q/B; and Q represents a volumetric flow rate;

obtaining an approximate discrete form of the de Saint-Venant nonlinear-hyperbolic-partial differential equation system by using a Preissmann four-point implicit scheme;

dividing a continuous spatio-temporal domain C={(x, t)|0≤x≤L, 0≤t≤T} into a plurality of rectangular grids according to a spatial step $\Delta x$ and a time step $\Delta t$, wherein L represents a channel length; T represents a finite time horizon; individual vertices at each of the plurality of rectangular grids are indexed as (j, n); n represents a time index; j represents a spatial index; $T^w$={0, 1, 2, ..., N}, representing a time index set; N represents a maximum time index; $L^w$={0, 1, 2, ..., J}, representing a spatial index set; J represents a maximum spatial index; Dt=T/N; Dx=L/J; and (j, n)∈$L^w$×$T^w$;

performing spatio-temporal discretization on equations (4) and (5) based on the Preissmann four-point implicit scheme to obtain equations (6)-(9):

$$f_1(H_{j+1}^{n+1}, H_j^{n+1}, q_{j+1}^{n+1}, q_j^{n+1}) := \tag{6}$$

$$\frac{H_{j+1}^{n+1} - H_{j+1}^n + H_j^{n+1} - H_j^n}{2\Delta t} + \theta\left(\frac{q_{j+1}^{n+1} - q_j^{n+1}}{\Delta x}\right) +$$

$$(1-\theta)\left(\frac{q_{j+1}^n - q_j^n}{\Delta x}\right) - \frac{1}{B}\left[\frac{\theta}{2}(r_{j+1}^{n+1} + r_j^{n+1}) + \frac{1-\theta}{2}(r_{j+1}^n + r_j^n)\right] = 0,$$

$$f_2(H_{j+1}^{n+1}, H_j^{n+1}, q_{j+1}^{n+1}, q_j^{n+1}) := \tag{7}$$

$$\frac{q_{j+1}^{n+1} - q_{j+1}^n + q_j^{n+1} - q_j^n}{2\Delta t} - \theta(I_{j+1}^{n+1} + R_j^{n+1}) -$$

$$gS_b - (1-\theta)(I_{j+1}^n + R_j^n) = 0,$$

$$I_j^n = \left(-\frac{gM^2}{2}\frac{(q_j^n)^2 (2H_j^n + B_j^n)^{4/3}}{(H_j^n)^{7/3}(B_j^n)^{4/3}} - \frac{1}{\Delta x}\frac{(q_j^n)^2}{H_j^n} - \frac{g(H_j^n)^2}{2\Delta x}\right), \tag{8}$$

and $$R_j^n = \left(-\frac{gM^2}{2}\frac{(q_j^n)^2 (2H_j^n + B_j^n)^{4/3}}{(H_j^n)^{7/3}(B_j^n)^{4/3}} + \frac{1}{\Delta x}\frac{(q_j^n)^2}{H_j^n} + \frac{g(H_j^n)^2}{2\Delta x}\right); \tag{9}$$

wherein θ represents a weight coefficient to ensure unconditional stability, and is selected from [0,1]; if θ≥0.5, the Preissmann four-point implicit scheme is unconditionally stable; $H_{j+1}^{n+1}$ represents a water level at point (j+1, n+1); $H_j^{n+1}$ represents a water level at point (j, n+1); $q_{j+1}^{n+1}$ represents a flow rate per unit channel width at the point (j+1, n+1); $q_j^{n+1}$ represents a flow rate per unit channel width at the point (j, n+1); $q_j^n$ represents a flow rate per unit channel width at point (j, n); $r_{j+1}^{n+1}$ represents a rainfall intensity at the point (j+1, n+1); $r_j^{n+1}$ represents a rainfall intensity at the point (j, n+1); $I_{j+1}^{n+1}$ represents an I value defined by equation (8) at the point (j+1, n+1); $R_j^{n+1}$ represents an R value defined by equation (9) at the point (j, n+1); and $B_j^n$ represents a channel width at the point (j, n);

performing spatio-temporal discretization on each channel in the watershed network based on the Preissmann four-point implicit scheme according to equations (6)-(9);

determining an initial condition and a boundary condition to ensure closure and uniqueness of equations (6)-(9) with spatio-temporal discretization, wherein the initial condition comprises an initial water level distribution and an initial flow rate distribution observed by a hydrological station, expressed as:

$$H_{j,I}^0 = H_I^{ini}(x=j\Delta x), \forall j \in L_I^w, \forall I \in \Omega \tag{10}$$

$$q_{j,I}^0 = q_I^{ini}(x=j\Delta x), \forall j \in L_I^w, \forall I \in \Omega \tag{11); and}$$

the boundary condition comprises an upstream boundary condition and a downstream boundary condition, expressed as:

$$f_I^u = f(H_{1,I}^n, q_{1,I}^n), f_I^d = f(H_{J_I,I}^n, q_{J_I,I}^n), \forall n \in T^w, \forall I \in \Omega \tag{12}$$

wherein $H_{j,I}^n$ represents a water level of the channel I at the point (j, n); $q_{j,I}^n$ represents a flow rate of the channel I at the point (j, n); $H_{j,I}^0$ represents a water level of the channel I at point (j, 0); $q_{j,I}^0$ represents a flow rate of the channel I at the point (j, 0); Ω represents a channel set; $H_I^{ini}(x)$ represents a given initial water level of the channel I along direction x; $q_I^{ini}(x)$ represents a given initial flow rate of the channel I along the direction x; $f_1^u$ represents an upstream boundary condition of the channel I; $f_I^d$ represents a downstream boundary condition of the channel I, $L_I^w$={0, 1, 2, ..., $J_I$}, representing a spatial index set of the channel I; and $J_I$ represents a maximum spatial index of the channel I;

limiting flow rate and water level respectively to a preset range, expressed as:

$$Q_I^{min} \leq B_I q_{j,I}^n \leq Q_I^{max}, H_I^{min} \leq H_{j,I}^n \leq H_I^{max}, \forall I \in \Omega,$$
$$\forall n \in T^w, \forall j \in L_I^w \tag{13}$$

wherein $B_I$ represents a width of the channel I; $Q_I^{max}$ represents an upper bound of a flow rate of the channel I; $H_I^{max}$ represents an upper bound of a water level of the channel I; $Q_I^{min}$ represents a lower bound of the flow rate of the channel I; and $H_I^{min}$ represents a lower bound of the water level of the channel I; and water levels of channels are the same at a confluent node z, expressed as:

$$H_{j,m}^n = H_{j,i}^n, \forall m \in \Omega_{z+}, \forall i \in \Omega_{z-}, \forall n \in T^w, \forall z \in Z \tag{14); and}$$

considering that an inflow of the confluent node z is equal to an outflow of the confluent node z according to mass conservation principle, deducing equation (15):

$$\sum_{m \in \Omega_{z+}} q_{J_m,m}^n B_m + \sum_{k \in P_z} \alpha_{k,n}^p q_{k,n}^p = \sum_{i \in \Omega_z} q_{0,i}^n B_i, \tag{15}$$

$$\forall n \in T^w, \forall z \in Z;$$

wherein Z represents a confluent node set of the watershed network; $\Omega_{z+}$ represents a set of channels that flow into the confluent node z; $\Omega_{z-}$ represents a set of channels that flow out from the confluent node z; $q_{k,n}^P$ represents a flow rate of a pump station k at time n; $P_z$ represents a set of pump stations connected to the confluent node z; $\alpha_{k,n}^P \in \{-1,1\}$ is a given value; $\alpha_{k,n}^P = -1$ denotes that the pump station k is used to pump water at time n; $\alpha_{k,n}^P = 1$ denotes that the pump station k is used to drain water at time n; m represents a channel number index; $q_{J_m,m}^n$ represents a flow rate per unit width of channel m at point $(J_m, n)$; $B_m$ represents a width of the channel m; $B_i$ represents a width of channel i; and $q_{0,i}^n$ represents a flow rate per unit width of the channel i at point (0, n).

4. The system of claim 3, wherein step (b) comprises:
obtaining a water storage volume $S_{I,c}^n$ of the channel I at time n, expressed as:

$$S_{I,c}^n = \sum_{j=0}^{J_I 1} \frac{(H_{j,I}^n + H_{j+1,I}^n)}{2} B_I \Delta x, \quad (16)$$

$\forall I \in \Omega, \forall n \in T^w;$ wherein the water storage volume $S_{I,c}^n$ is limited to a preset range, expressed as:

$S_{I,c,min}^n \leq S_{I,c}^n \leq S_{I,c,max}^n, \forall I \in \Omega, \forall n \in T^w$ (17)

wherein $H_{j,I}^n$ represents a water level of the channel I at the point (j, n); $B_I$ represents a width of the channel I; $S_{I,c,min}^n$ represents a minimum water storage volume of the channel I; $S_{I,c,max}^n$ represents a maximum water storage volume of the channel I; $J_I$ represents a maximum spatial index of the channel I;

acquiring a relationship between water discharge and water level of lake k at each period, expressed as:

$$A_{k,a} \frac{H_{k,a}^{n+1} - H_{k,a}^n}{\Delta t} = \left\{ \begin{array}{l} r_k^n(A_{k,a} + \alpha_{k,a} F_{k,a}) \\ -\sum_{i \in k_p} \alpha_{i,n}^p q_{i,n}^p \end{array} \right\}, \quad (18)$$

$\forall k \in K, \forall n \in T^w;$ acquiring a current volume of the lake k, expressed as:

$S_{k,a}^n = A_{k,a} H_{k,a}^n, \forall k \in K, \forall n \in T^w$ (19); and acquiring a constraint for secure operation of the lake k, expressed as:

$S_{k,a,min} \leq S_{k,a}^n \leq S_{k,a,max}, \forall k \in K, \forall n \in T^w$ (20);

wherein $A_{k,a}$ represents an area of the lake k; $H_{k,a}^n$ represents a water level of the lake k at time n; $\alpha_{k,a}$ represents a runoff coefficient of the lake k; $F_{k,a}$ represents a catchment area of the lake k; $S_{k,a}^n$ represents a water storage volume of the lake k at time n; $S_{k,a,min}$ represents a minimum water storage volume of the lake k; $S_{k,a,max}$ represents a maximum water storage volume of the lake k; K represents a lake set; $k_p$ represents a set of pump stations connected to the lake k; $q_{i,n}^P$ represents a flow rate of the pump station i at time n; $r_k^n$ represents a rainfall intensity at the lake k at time n; and $\alpha_{i,n}^P$ represents an operation state of the pump station i at time n.

5. The system of claim 4, wherein step (c) comprises:
constructing the distribution network linear AC power flow model to characterize power flow constraints, generator operating constraints and bus power balance constraints;

wherein an active power flow of line ij is expressed as:

$$P_{ij,n} = \frac{r_{ij} x_{ij}}{r_{ij}^2 + x_{ij}^2} \cdot \frac{(V_{i,n} - V_{j,n})}{x_{ij}} + \frac{x_{ij}^2}{r_{ij}^2 + x_{ij}^2} \cdot \frac{(\delta_{i,n} - \delta_{j,n})}{x_{ij}}, \quad (21)$$

$\forall n \in T^*;$ a reactive power flow of the line ij is expressed as:

$$Q_{ij,n}^e = \frac{r_{ij} x_{ij}}{r_{ij}^2 + x_{ij}^2} \cdot \frac{(\delta_{i,n} - \delta_{j,n})}{x_{ij}} + \frac{x_{ij}^2}{r_{ij}^2 + x_{ij}^2} \cdot \frac{(V_{i,n} - V_{j,n})}{x_{ij}}, \quad (22)$$

$\forall n \in T^*;$ wherein $r_{ij}$ represents a resistance of the line ij; $x_{ij}$ represents a reactance of the line ij; $P_{ij,n}$ represents an active power flowing from bus i to bus j; $Q_{ij,n}^e$ represents a reactive power flowing from the bus i to the bus j; $\delta_{j,n}$ represents a phase angle of the bus j; $V_{j,n}$ represents a voltage amplitude of the bus j; $\delta_{i,n}$ represents a phase angle of the bus i; and $V_{i,n}$ represents a voltage amplitude of the bus i; and the reactive power flow and the active power flow of the line ij and the voltage amplitude of the bus j satisfy the following security constraints:

$$\begin{cases} -S_{ij} \leq P_{ij,n} \leq S_{ij} \\ -S_{ij} \leq Q_{ij,n}^e \leq S_{ij} \end{cases} \forall n \in T^*; \quad (23)$$

and $V_j^{min} \leq V_{j,n} \leq V_j^{max}, \forall n \in T^*;$ (24)

wherein $S_{ij}$ represents a rated apparent power capacity of the line ij; $V_j^{min}$ represents a minimum voltage allowed for the bus j; and $V_j^{max}$ represents a maximum voltage allowed for the bus j;

acquiring an output power limit of the distributed generator g, expressed as:

$P_{g,min}^{CDG} \leq P_{g,n}^{CDG} \leq P_{g,max}^{CDG}, \forall g \in G, \forall n \in T^*$ (25);

acquiring a ramp limit of the distributed generator g, expressed as:

$R_{g,down}^{CDG} \leq P_{g,n}^{CDG} - P_{g,n-1}^{CDG} \leq R_{g,up}^{CDG}, \forall g \in G, \forall n \in T^*$ (26);

acquiring a capacity limit of the distributed generator g, expressed as:

$$\begin{cases} -S_g^{CDG} \leq P_{g,n}^{CDG} \leq S_g^{CDG} \\ -S_g^{CDG} \leq Q_{g,n}^{CDG} \leq S_g^{CDG} \end{cases}, \forall g \in G, \forall n \in T^*; \quad (27)$$

acquiring power balance constraints for buses, expressed as:

$$\sum_{ij\in\Lambda_{j+,m}} P_{ij,n} + \sum_{g\in G_j} P_{g,n}^{CDG} - \sum_{p\in P_j} P_{p,n}^{fle} - \sum_{p\in P_j} P_{p,n}^{p} - P_{j,n}^{load} = \sum_{jk\in\Lambda_{j-}} P_{jk,n}, \quad (28)$$

$$\forall j \in J*, \forall n \in T^*;$$

and $$\sum_{ij\in\Lambda_{j+,m}} Q_{ij,n}^{e} + \sum_{g\in G_j} Q_{g,n}^{CDG} - \sum_{p\in P_j} Q_{p,n}^{p} - Q_{j,n}^{load} = \sum_{jk\in\Lambda_{j-}} Q_{jk,n}, \quad (29)$$

$$\forall j \in J, \forall n \in T^*;$$

wherein $P_{g,n}^{CDG}$ represents an active power generated by the distributed generator g at time n; $Q_{g,n}^{CDG}$ represents a reactive power generated by the distributed generator g at time n; $P_{g,max}^{CDG}$ represents a maximum allowable output power of the distributed generator g; $P_{g,min}^{CDG}$ represents a minimum allowable output power of the distributed generator g; $R_{g,up}^{CDG}$ represents a maximum allowable ramp rate of the distributed generator g; $R_{g,down}^{CDG}$ represents a minimum allowable ramp rate of the distributed generator g; G represents a distributed generator set; $G_j$ represents a set of distributed generators connected to the bus j; $P_j$ represents a set of pump stations connected to the bus j; J represents a bus set of the urban distribution network; $\Lambda_{j+}$ represents a set of lines whose power flows into the bus j; $\Lambda_{j-}$ represents a set of lines whose power flows out from the bus j; $P_{j,n}^{load}$ represents an active load at the bus j except for a pump station load at time n; $Q_{j,n}^{load}$ represents a reactive load at the bus j except for the pump station load at time n; $P_{p,n}^{fle}$ represents a flexibility amount offered by pump station p at time n; $S_g^{CDG}$ is a rated apparent capacity for the distributed generator g; $P_{jk,n}$ represents an active power flow on line jk at time n; $Q_{ij,n}^{e}$ represents a reactive power flow on the line ij at time n; $P_{p,n}^{p}$ represents an active load of the pump station p at time n; $Q_{p,n}^{p}$ represents a reactive load of the pump station p at time n; and $P_{ij,n}$ represents an active power flow on the line ij at time n.

6. The system of claim 5, wherein step (c) further comprises:

acquiring an operating power-flow rate relationship for pump stations, expressed as:

$$P_{i,n}^{p} = \frac{\rho g H_i^{st} q_{i,n}^{p}}{1000 \eta_i^{p}}, \forall i \in P, \forall n \in T^*; \quad (30)$$

acquiring pump station power limits, expressed as:

$$-R_i^p \leq P_{i,n}^p - P_{i,n-1}^p \leq R_i^p, \forall i \in P, \forall n \in T^*; \quad (31)$$

and $$P_{i,min}^p \leq P_{i,n}^p \leq P_{i,max}^p, \forall i \in P, \forall n \in T^*; \quad (32)$$

and acquiring a pump station reactive load constraint, expressed as:

$$Q_{i,n}^p = P_{i,n}^p \tan(\arccos(\phi_i^p)), \forall i \in P, \forall n \in T^* \quad (33)$$

wherein $P_{i,n}^p$ represents an active load of the pump station i; $Q_{i,n}^p$ represents a reactive load of the pump station i; $H_i^{st}$ represents a water head of the pump station i; $P_{i,min}^p$ represents a lower bound of the reactive load of the pump station i; $P_{i,max}^p$ represents an upper bound of the active load of the pump station i; and $\phi_i^p$ is a power factor of the pump station i.

7. The system of claim 6, wherein step (d) comprises:

based on Taylor series expansion, expanding equations (6) and (7) into:

$$f_{\{1,2\}} \begin{Bmatrix} H_{j+1}^n + \Delta H_{j+1}, \\ H_j^n + \Delta H_j, \\ q_{j+1}^n + \Delta q_{j+1}, \\ q_j^n + \Delta q_j \end{Bmatrix} = \begin{Bmatrix} f_{\{1,2\}}(H_{j+1}^n, H_j^n, q_{j+1}^n q_j^n) + \frac{\partial f_{\{1,2\}}}{\partial H_{j+1}^n} \Delta H_{j+1} + \\ \frac{\partial f_{\{1,2\}}}{\partial H_j^n} \Delta H_j + \frac{\partial f_{\{1,2\}}}{\partial q_{j+1}^n} \Delta q_{j+1} + \frac{\partial f_{\{1,2\}}}{\partial q_j^n} \Delta q_j \end{Bmatrix}; \quad (34)$$

wherein $f_{\{1,2\}}$ represents a collective name for defined functions $f_1$ and $f_2$; subscripts 1 and 2 of the $f_{\{1,2\}}$ represent selection of function $f_1$ or function $f_2$; $\Delta H_j$ represents a variation of a water level at point (j, n) after adjusting a pump station power; $H_j^n$ represents a water level at the point (j, n); $\Delta q_j$ represents a variation of a flow rate at the point (j, n) after adjusting the pump station power; and $q_j^n$ represents a flow rate at the point (j, n);

acquiring a sensitivity matrix of individual channels under different disturbances at time n, expresses as:

$$\underbrace{\begin{bmatrix} a_0 & b_0 & 0 & 0 & 0 & 0 & \cdots & 0 & 0 & 0 & 0 \\ a_1 & b_1 & c_1 & d_1 & 0 & 0 & \cdots & 0 & 0 & 0 & 0 \\ a_2 & b_2 & c_2 & d_2 & 0 & 0 & \cdots & 0 & 0 & 0 & 0 \\ 0 & 0 & a_3 & b_3 & c_3 & d_3 & \cdots & 0 & 0 & 0 & 0 \\ 0 & 0 & a_4 & b_4 & c_4 & d_4 & \cdots & 0 & 0 & 0 & 0 \\ \vdots & \vdots & \vdots & \vdots & \vdots & \vdots & \ddots & \vdots & \vdots & \vdots & \vdots \\ 0 & 0 & 0 & 0 & 0 & 0 & \cdots & a_{2J-3} & b_{2J-3} & b_{2J-3} & d_{2J-3} \\ 0 & 0 & 0 & 0 & 0 & 0 & \cdots & a_{2J-2} & b_{2J-2} & c_{2J-2} & d_{2J-2} \\ 0 & 0 & 0 & 0 & 0 & 0 & \cdots & 0 & 0 & c_{2J} & d_{2J} \end{bmatrix}}_{M} \quad (35)$$

$$\underbrace{\begin{bmatrix} \Delta H_0 \\ \Delta q_0 \\ \Delta H_1 \\ \Delta q_1 \\ \vdots \\ \Delta H_{J-1} \\ \Delta q_{J-1} \\ \Delta H_J \\ \Delta q_J \end{bmatrix}}_{\Delta X} = \underbrace{\begin{bmatrix} F_1 \\ F_2 \\ F_3 \\ F_4 \\ \vdots \\ F_{2J-3} \\ F_{2J-2} \\ F_{2J-1} \\ F_{2J} \end{bmatrix}}_{F};$$

wherein M represents a sensitivity coefficient matrix; $\Delta X$ represents a variation matrix of water level and flow rate at points; F represents a constant matrix at a current time; elements in the M and elements in the F are constants; the elements in the M are partial derivatives of water level and flow rate at time n; the elements in the F are products of space-time difference results of the $f_1$ or $f_2$ and $-Dt$; $a_0$, $b_0$ and $F_1$ are determined by the upstream boundary condition; and $C_{2J}$, $d_{2J}$ and $F_{2J}$ are determined by the downstream boundary condition; and the elements in the M are obtained through the following equation:

$$\begin{cases} a_{2j-1} = \frac{\partial f_1}{\partial H_{j-1}^n}, b_{2j-1} = \frac{\partial f_1}{\partial q_{j-1}^n}, c_{2j-1} = \frac{\partial f_1}{\partial H_j^n}, d_{2j-1} = \frac{\partial f_1}{\partial q_j^n} \\ a_{2j} = \frac{\partial f_2}{\partial H_{j-1}^n}, b_{2j} = \frac{\partial f_2}{\partial q_{j-1}^n}, c_{2j} = \frac{\partial f_2}{\partial H_j^n}, d_{2j} = \frac{\partial f_2}{\partial q_j^n} \\ a_0 = \frac{\partial f^u}{\partial H_0^n}, b_0 = \frac{\partial f^u}{\partial q_0^n}, c_{2J} = \frac{\partial f^d}{\partial H_J^n}, d_{2J} = \frac{\partial f^d}{\partial q_J^n} \end{cases} \quad (36)$$

obtaining a relationship between a power increment of a pump station and a flow rate increment at point (j, n) where the pump station is located through equations (37) and (38):

$$\frac{\partial f_{\{1,2\}}}{\partial P_{P_I,n}^p} = \frac{\partial f_{\{1,2\}}}{\partial q_j^n} \frac{\partial q_j^n}{\partial q_{P_I,n}^p} \frac{\partial q_{P_I,n}^p}{\partial P_{P_I,n}^p}, \text{ and} \quad (37)$$

$$\frac{\partial q_j^n}{\partial q_{P_I,n}^p} \frac{\partial q_{P_I,n}^p}{\partial P_{P_I,n}^p} = \frac{1000\eta_{P_I}^p}{B_I \rho g H_{P_I}^{st}}, \quad (38)$$

wherein $P_I$ represents index of a pump station connected to the channel I; $\partial f_{\{1,2\}}/\partial P_{P_I,n}^p$ represents a partial derivative of $f_1$ or $f_2$ with respect to $P_{P_I,n}^p$; $P_{P_I,n}^p$ represents an active load of the pump station $P_I$ at time n; $q_{P_I,n}^p$ represents a flow rate of the pump station $P_I$ at time n; $H_{P_I}^{st}$ represents a water head of the pump station $P_I$; $\eta_{P_I}^p$ represents an operation efficiency of the pump station;

plugging the equations (37) and (38) into the sensitivity matrix to expand the M into M', such that the watershed-electricity composite sensitivity matrix of individual channels is expressed as:

$$\underbrace{\begin{bmatrix} Z_{1,1} & Z_{1,2} & 0 & 0 & \cdots & 0 & 0 & 0 & 0 \\ Z_{2,1} & Z_{2,2} & Z_{2,3} & Z_{2,4} & \cdots & 0 & 0 & 0 & 0 \\ Z_{3,1} & Z_{3,2} & Z_{3,3} & Z_{3,4} & \cdots & 0 & 0 & 0 & 0 \\ \vdots & \vdots & \vdots & \vdots & \ddots & \vdots & \vdots & \vdots & \vdots \\ 0 & 0 & 0 & 0 & \cdots & Z_{4,1} & Z_{4,2} & Z_{4,3} & Z_{4,4} \\ 0 & 0 & 0 & 0 & \cdots & Z_{5,1} & Z_{5,2} & Z_{5,3} & Z_{5,4} \\ 0 & 0 & 0 & 0 & \cdots & 0 & 0 & Z_{6,1} & Z_{6,2} \end{bmatrix}}_{M'} \underbrace{\begin{bmatrix} \Delta H_0 \\ \Delta P_I^{p,u} \\ \Delta H_1 \\ \Delta q_1 \\ \vdots \\ \Delta H_{J-1} \\ \Delta q_{J-1} \\ \Delta H_J \\ \Delta P_I^{p,d} \end{bmatrix}}_{\Delta X'} = \underbrace{\begin{bmatrix} F_1 \\ F_2 \\ F_3 \\ F_4 \\ \vdots \\ F_{2J-3} \\ F_{2J-2} \\ F_{2J-1} \\ F_{2J} \end{bmatrix}}_{F}, \quad (39)$$

wherein M' represents a sensitivity coefficient expansion matrix; $\Delta X'$ represents a variation expansion matrix of water level and flow rate; F represents a constant matrix at a current time; the elements in the F are products of the space-time difference results of the $f_1$ or $f_2$ and $-Dt$; $\Delta P_I^{p,u}$ represents a power increment of a pump station located upstream of the channel I; $\Delta P_I^{p,d}$ represents a power increment of a pump station located downstream of the channel I;

$$Z_{1,1} = \frac{\partial f^u}{\partial H_0}; Z_{1,2} = \frac{\partial f^u}{\partial q_0} \frac{\partial q_0}{\partial q_I^{p,u}} \frac{\partial q_I^{p,u}}{\partial P_I^{p,u}};$$

$$Z_{2,1} = \frac{\partial f_1}{\partial H_0}; Z_{2,2} = \frac{\partial f_1}{\partial q_0} \frac{\partial q_0}{\partial q_I^{p,u}} \frac{\partial q_I^{p,u}}{\partial P_I^{p,u}};$$

$$Z_{2,3} = \frac{\partial f_1}{\partial H_1}; Z_{2,4} = \frac{\partial f_1}{\partial q_1}; Z_{3,1} = \frac{\partial f_1}{\partial q_1};$$

$$Z_{3,2} = \frac{\partial f_2}{\partial q_0} \frac{\partial q_0}{\partial q_I^{p,u}} \frac{\partial q_I^{p,u}}{\partial P_I^{p,u}}; Z_{3,3} = \frac{\partial f_2}{\partial H_1}; Z_{3,4} = \frac{\partial f_2}{\partial q_1}; Z_{4,1} = \frac{\partial f_1}{\partial H_{J-2}};$$

-continued $$Z_{4,2} = \frac{\partial f_1}{\partial q_{J-2}}; Z_{4,3} = \frac{\partial f_1}{\partial H_{J-1}}; Z_{4,4} = \frac{\partial f_1}{\partial q_{J-1}} \frac{\partial q_{J-1}}{\partial q_I^{p,d}} \frac{\partial q_I^{p,d}}{\partial P_I^{p,d}};$$

$$Z_{5,1} = \frac{\partial f_2}{\partial H_{J-2}}; Z_{5,2} = \frac{\partial f_2}{\partial q_{J-2}}; Z_{5,3} = \frac{\partial f_2}{\partial H_{J-1}};$$

$$Z_{5,4} = \frac{\partial f_2}{\partial q_{J-1}} \frac{\partial q_{J-1}}{\partial q_I^{p,d}} \frac{\partial q_I^{p,d}}{\partial P_I^{p,d}}; Z_{6,1} = \frac{\partial f^d}{\partial H_J};$$

$$Z_{6,2} = \frac{\partial f^d}{\partial q_J} \frac{\partial q_J}{\partial q_I^{p,d}} \frac{\partial q_I^{p,d}}{\partial P_I^{p,d}};$$

$q_I^{p,u}$ represents a flow rate of the pump station located upstream of the channel I; $q_I^{p,d}$ represents a flow rate of the pump station located downstream of the channel I; $P_I^{p,u}$ represents an active load of the pump station located upstream of the channel I, and $P_I^{p,d}$ represents an active load of the pump station located downstream of the channel I; and combining sensitivity matrices of all channels in the watershed network to obtain the watershed-electricity composite sensitivity matrix of the watershed network, expressed as:

$$\begin{bmatrix} M_1' & 0 & 0 & \cdots & 0 & 0 \\ 0 & M_2' & 0 & \cdots & 0 & 0 \\ 0 & 0 & \ddots & \cdots & 0 & 0 \\ 0 & \cdots & 0 & M_I' & \cdots & 0 \\ 0 & \cdots & \cdots & \cdots & \ddots & 0 \\ 0 & 0 & \cdots & 0 & 0 & M_{I*}' \end{bmatrix} \begin{bmatrix} \Delta X_1' \\ \Delta X_2' \\ \vdots \\ \Delta X_I' \\ \vdots \\ \Delta X_{I*}' \end{bmatrix} = \begin{bmatrix} F_1 \\ F_2 \\ \vdots \\ F_I \\ \vdots \\ F_{I*} \end{bmatrix}; \quad (40)$$

wherein $M_I'$ represents a sensitivity coefficient expansion matrix of the channel I; $\Delta X_I'$ represents $\Delta X'$ of the channel I, which represents a variation expansion matrix of water level and flow rate of the channel I; $F_I$ represents F of the channel I; and I* represents the number of channels in the watershed network.

8. The system of claim 7, wherein step (g) comprises:

(g1) initializing the coordinated operation model, wherein a current scheduling period is set to n=1; a scheduling duration is 24 h; Dx of individual channels in the watershed network is set to 100 m; and Dt is set to 1 h;

(g2) inputting parameters to the coordinated operation model, wherein the parameters comprise topological information of the watershed network, a width $B_I$ of each channel, a length $L_I$ of each channel, water level $H_{j,I}^{n-1}$ and flow rate $q_{j,I}^{n-1}$ of each channel in the watershed network at time n−1, an operation state of each of the one or more pump stations at time n−1, a power $P_{i,n-1}^p$ of each pump station at time n−1, topological information of the urban distribution network, load information of each bus, and an operation state and power of each of the one or more distributed generators in the urban distribution network at time n−1; and $H_{j,I}^{n-1}$ and $q_{j,I}^{n-1}$ are taken as initial conditions of the watershed network;

(g3) optimizing a load of each of the one or more pump stations and a hydraulic energy flow of each channel in the watershed network at the current scheduling period based on the hydraulic energy flow optimization model, so as to obtain an optimal operating power $P_{i,n}^p$ of each of the one or more pump stations at the current scheduling period;

(g4) calculating a time-varying adjustable flexible power domain $[P_{i,n}^{fle,min}, P_{i,n}^{fle,max}]$ of each of the one or more pump stations based on the flexibility assessment method; and transmitting the $P_{i,n}^p$ and the $[P_{i,n}^{fle,min}, P_{i,n}^{fle,max}]$ of each of the one or more pump stations to the urban distribution network;

(g5) calculating and optimizing a flexible power $P_{i,n}^{fle}$ of each of the one or more pump stations required by the urban distribution network based on the power flow optimization model; transmitting the $P_{i,n}^{fle}$ to each of the one or more pump stations; and paying an incentive fee to each of the one or more pump stations in the watershed network;

(g6) receiving the $P_{i,n}^{fle}$ by the watershed network; adjusting the $P_{i,n}^p$ of each of the one or more pump stations to $P_{i,n}^p + P_{i,n}^{fle}$ to calculate a watershed network hydraulic energy flow, so as to update a water level and flow rate at each point in the watershed network at time n; and (g7) determining whether the electricity-water energy flow interactive optimization is finished through steps of:

letting n=n+1, and determining whether n≤24; if yes, returning to step (g2); otherwise, ending the electricity-water energy flow interactive optimization.

9. A method for flexible coordinated operation of an urban distribution network and a watershed network, the method implemented using a controller, the controller comprising a processor and a memory coupled to the processor, and the method comprising:

(a) constructing, by the controller, a watershed network dynamic operation model based on a de Saint-Venant nonlinear-hyperbolic-partial differential equation system;

(b) constructing, by the controller, a river water storage model and a lake water storage model based on the watershed network dynamic operation model;

(c) constructing, by the controller, a distribution network linear AC power flow model; and based on the watershed network dynamic operation model and the distribution network linear AC power flow model, constructing, by the controller, an operating power-flow rate operation model of one or more drainage pump stations to obtain a coordinated operation model of the urban distribution network and the watershed network;

(d) constructing, by the controller, a watershed-electricity composite sensitivity matrix by using Taylor series expansion to reflect a mathematical relationship between variation of water level at individual points of the watershed network and a power increment of the one or more pump stations, and a mathematical relationship between variation of flow rate at individual points of the watershed network and the power increment of the one or more pump stations;

(e) quantifying, by the controller, a time-varying adjustable power domain of a load of each of the one or more pump stations through a pump station flexibility assessment method based on the watershed-electricity composite sensitivity matrix, wherein the time-varying adjustable power domain is quantified through steps of:

estimating the time-varying adjustable power domain of each of the one or more pump stations;

successively calculating the watershed-electricity composite sensitivity matrix and an adjustment amount; and correcting the time-varying adjustable power domain until there is no water level out of a preset limit;

(f) constructing, by the controller, a power flow optimization model of the urban distribution network and a hydraulic energy flow optimization model of the watershed network; and converting a non-convex nonlinear hydraulic energy flow optimization problem into a mixed-integer linear programming problem through a multidimensional piecewise linearization method; and (g) based on the coordinated operation model, the time-varying adjustable power domain, the flexibility assessment method, the power flow optimization model and the hydraulic energy flow optimization model, performing, by the controller, electricity-water energy flow interactive optimization involving a flexible resource of the one or more pump stations to realize the flexible coordinated operation of the urban distribution network and the watershed network;

the time-varying adjustable power domain is estimated through steps of:

obtaining a baseline power consumption of the load of each of the one or more pump stations through optimal scheduling of the watershed network under a basic scenario; and estimating the time-varying adjustable power domain of each of the one or more pump stations using equation (41):

$$F_i^n = \left\{ \Delta P_{i,n}^p \in \Box \;\middle|\; \begin{array}{l} \underline{P}_i^p \leq \tilde{P}_{i,n}^p + \Delta P_{i,n}^p \leq \overline{P}_i^p, \forall i \in P \\ S_{i,a,min} \leq \tilde{S}_{i,a}^n + \dfrac{1000 \eta_{P_i}^p \Delta P_{P_i,n}^p \Delta t}{\rho g H_{P_i}^{st}} \leq S_{i,a,max}, \forall i \in P_a \\ S_{i,c,min} \leq \tilde{S}_{i,c}^n + \dfrac{1000 \eta_i^p \Delta P_{P_i,n}^p \Delta t}{\rho g H_{P_i}^{st}} \leq S_{i,c,max}, \forall i \in P_{ch} \\ \left| \tilde{P}_{i,n}^p + \Delta P_{i,n}^p - P_{i,n-1}^p \right| \leq R_i^p, \forall i \in P \end{array} \right\}, \quad (41)$$

wherein $\overline{P}_i^p$ represents an upper limit of the active load of the pump station i; $\underline{P}_i^p$ represents a lower limit of the active load of the pump station i; $\tilde{S}_{i,n}$ represents a baseline storage volume of channel i or lake i; $\tilde{P}_{i,n}^p$ represents a baseline active load of the pump station i; $\Delta P_{i,n}^p$ represents a power adjustment of an active load of the pump station i; $F_i^n$ represents the time-varying adjustable power domain of the pump station i at time n; $\Box$ represents a real number set; $S_{i,a,min}$ represents a minimum storage volume of the lake i; $S_{i,a,max}$ represents a maximum storage volume of the lake i; $\tilde{S}_{i,a}^n$ represents a baseline storage volume of the lake i at time n; $\eta_{P_i}^p$ represents an operation efficiency of the pump station connected to the channel i or the lake i; $\Delta_{P_i,n}^p$ represents a power adjustment of an active load of the pump station connected to the channel i or the lake i; $P_a$ represents a set of pump stations connected to the lake i; $P_{ch}$ represents a set of pump stations connected to the channel i; P represents a set of pump stations connected to the channel i or the lake i; $S_{i,c,min}$ represents a minimum storage volume of the channel i; $S_{i,c,max}$ represents a maximum storage volume of the channel i; and $\tilde{S}_{i,c}^n$ represents a baseline storage volume of the channel i at time n; $\rho$ is water density; $\eta_i^p$ represents an operation efficiency of the pump station i; g is gravitational acceleration; $R_i^p$ represents a maximum ramp rate of the pump station i; $H_{P_j}^{st}$ represents a water head of the pump station connected to a channel I, and D t represents a duration of a scheduling period; and the time-varying adjustable power domain is corrected through steps of:

correcting the time-varying adjustable power domain according to the adjustment amount, and obtaining the time-varying adjustable power domain as:

$$F_i^{*,n} = \{\Delta P_{i,n}^P \in \Box \mid P_{i,n}^{fle,min} \leq \Delta P_{i,n}^P + dP_n^P \leq P_{i,n}^{fle,max}\} \quad (42),$$

wherein $P_{i,n}^{fle,max}$ represents a corrected upper bound of the time-varying adjustable power for the pump station i at time n; $P_{i,n}^{fle,min}$ represents a corrected lower bound of the time-varying adjustable power for the pump station i at time n; $F_i^{*,n}$ represents a real time-varying adjustable power domain of the pump station i at time n; $\Delta P_{i,n}^P$ represents an adjustment amount of the active load of the pump station i at time n; and $dP_n^P$ represents a certain margin of adjustable power reserved because higher-order terms in (34) are ignored, which is generally determined by the experiences based on operation states; and step (f) comprises:

performing an optimal coordinated rolling scheduling on the one or more pump stations distributed in the watershed network, wherein a plurality of stochastic scenarios are generated according to uncertainty of rainfall prediction at a future moment; an objective of watershed network hydraulic energy flow optimization is to minimize an operational cost of the one or more pump stations; the operational cost comprises an electricity consumption cost of the one or more pump stations and an expected electricity consumption cost of the one or more pump stations in the plurality of stochastic scenarios; and the hydraulic energy flow optimization model is expressed as:

$$\min\left\{ELC_{n_0} + \sum_{s=1}^{NS} \pi_s \left(\sum_{n=n_0+1}^{n_0+N_T} ELC_{n,s}\right)\right\}; \text{ and} \quad (43)$$

$$ELC_n = C_{E,n}\Delta t \sum_{i \in P} P_{i,n}^p; \quad (44)$$

s.t. the equations (6)-(20) and (30)-(33) (45);

wherein $ELC_n$ represents an electricity consumption cost of the pump station group at time n; $ELC_{n,s}$ represents an electricity consumption cost of the pump station group at time n under scenario s; $n_0$ represents an initial time of the watershed network hydraulic energy flow optimization; NS represents a total number of the plurality of stochastic scenarios; $N_T$ represents a length of a predicted time horizon; $\pi_s$ represents an occurrence probability of the scenario s; $\Sigma_{s=1}^{NS}\pi_s=1$; and $C_{E,n}$ represents an electricity price of the urban distribution network at time n; and constructing the power flow optimization model; and optimizing a power flow of the urban distribution network and a power of individual distributed generators by using the flexible resource of the one or more pump stations, so as to minimize an operational cost of the urban distribution network at a current time, wherein the operational cost $DC_n$ comprises a cost $DC_{1n}$ for purchasing power from a main grid, a generator operation cost $DC_{2n}$, an incentive cost $DC_{3n}$ of flexible resources of the watershed network and an electricity-selling profit $DC_{4n}$; and the power flow optimization model is expressed as:

$$\begin{cases} \min DC_n = DC_{1n} + DC_{2n} + DC_{3n} - DC_{4n} \\ DC_{1n} = C_{mg,n} P_n^{mg} \\ DC_{2n} = \sum_{g \in G} a_g (P_{g,n}^{CDG})^2 + b_g (P_{g,n}^{CDG}) + c_g \\ DC_{3n} = C_{IN,n} \sum_{i \in P} \hat{P}_{i,n}^{fle} \\ DC_{4n} = C_{E,n} \sum_{j \in J} \sum_{i \in P_j} \left(P_{i,n}^p + P_{i,n}^{fle} + P_{j,n}^{load}\right) \end{cases} \quad (46)$$

$$\text{s.t.} \begin{cases} \text{the equations (21)-(29)} \\ P_{i,n}^{fle,min} \leq P_{i,n}^{fle} \leq P_{i,n}^{fle,max}, \forall i \in P, \forall n \in T^* \\ P_{i,n}^{fle} \leq \hat{P}_{i,n}^{fle}, \forall i \in P, \forall n \in T^* \\ -P_{i,n}^{fle} \leq \hat{P}_{i,n}^{fle}, \forall i \in P, \forall n \in T^* \end{cases} \quad (47)$$

wherein $C_{mg,n}$ represents an electricity price of the main grid at time n; $P_n^{mg}$ represents an electricity purchasing quantity of the urban distribution network from the main grid at time n; $C_{IN,n}$ represents an incentive price of the flexible resource at time n; $a_g$, $b_g$ and $c_g$ are cost coefficients of a distributed generator g; $P_{i,n}^{fle,min}$ represents a lower limit of an adjustable power of the pump station i at time n; $P_{i,n}^{fle,max}$ represents an upper limit of the adjustable power of the pump station i at time n; $\hat{P}_{i,n}^{fle}$ is an auxiliary variable; $P_{i,n}^{fle}$ represents a power adjustment amount of the pump station i set by the urban distribution network at time n; P represents a set of the one or more pump stations in the watershed network; $T^*=\{1, 2, \ldots, N\}$, representing a time index set; G is a set of one or more distributed generators; $P_{g,n}^{CDG}$ represents an active power generated by the distributed generator g at time n; J represents a bus set of the urban distribution network; $P_j$ represents a set of pump stations connected to the bus j; $P_{j,n}^{load}$ represents an active load at the bus j except for a pump station load at time n; $P_{i,n}^P$ represents an operation state and a power of pump station i at time n; and $C_{E,n}$ represents an electricity price of the urban distribution network.

10. The method of claim 9, wherein step (a) comprises:

characterizing water level and flow rate states along a channel by the de Saint-Venant nonlinear-hyperbolic-partial differential equation system to obtain a mass conservation equation and a momentum conservation equation, wherein the mass conservation equation is expressed as:

$$\frac{\partial A}{\partial t} + \frac{\partial Q}{\partial x} = r; \quad (1)$$

the momentum conservation equation is expressed as:

$$\frac{\partial Q}{\partial t} + \frac{\partial}{\partial x}\left[\frac{Q^2}{A}\right] + gA\frac{\partial H}{\partial x} = gA(S_b - S_f); \quad (2)$$

wherein $S_f$ is expressed as:

$$S_f = \left(M^2 Q|Q|l^{\frac{4}{3}}\right)/A^{\frac{10}{3}}; \quad (3)$$

wherein t is time; x represents a longitudinal distance along the channel direction; Q represents volumetric flow rate; A represents a cross-sectional area of a water flow; H represents a water level; g is gravitational acceleration; $S_b$ represents a river bed slope; $S_f$ represents a friction slope; M represents Manning coefficient; l represents channel wetted perimeter; and r represents rainfall intensity.

11. The method of claim 10, wherein step (a) further comprises:

simplifying the mass conservation equation into:

$$\frac{\partial H}{\partial t} + \frac{\partial q}{\partial x} = \frac{r}{B}; \quad (4)$$

simplifying the momentum conservation equation into:

$$\frac{\partial q}{\partial t} + \frac{\partial}{\partial x}\left[\frac{q^2}{H} + \frac{gH^2}{2}\right] = g\left[S_b - \frac{M^2 q^2 (2H+B)^{4/3}}{H^{7/3} B^{4/3}}\right]; \quad (5)$$

wherein H represents a water level; B represents a channel width; A represents a channel cross-sectional area; A=BH; Q=BHV; V represents a flow velocity; l=B+2H; q represents a flow rate per unit channel width; q=Q/B; and Q represents a volumetric flow rate;

obtaining an approximate discrete form of the de Saint-Venant nonlinear-hyperbolic-partial differential equation system by using a Preissmann four-point implicit scheme;

dividing a continuous spatio-temporal domain C={(x, t)|0≤x≤L, 0≤t≤T} into a plurality of rectangular grids according to a spatial step $\Delta x$ and a time step $\Delta t$, wherein L represents a channel length; T represents a finite time horizon; individual vertices at each of the plurality of rectangular grids are indexed as (j, n); n represents a time index; j represents a spatial index; $T^w$={0, 1, 2, . . . , N}, representing a time index set; N represents a maximum time index; $L^w$={0, 1, 2, . . . , J}, representing a spatial index set; J represents a maximum spatial index; Dt=T/N; Dx=L/J; and (j, n)∈$L^w$× $T^w$;

performing spatio-temporal discretization on equations (4) and (5) based on the Preissmann four-point implicit scheme to obtain equations (6)-(9):

$$f_1(H_{j+1}^{n+1}, H_j^{n+1}, q_{j+1}^{n+1}, q_j^{n+1}) := \quad (6)$$

$$\frac{H_{j+1}^{n+1} - H_{j+1}^n + H_j^{n+1} - H_j^n}{2\Delta t} + \theta\left(\frac{q_{j+1}^{n+1} - q_j^{n+1}}{\Delta x}\right) +$$

$$(1-\theta)\left(\frac{q_{j+1}^n - q_j^n}{\Delta x}\right) - \frac{1}{B}\left[\frac{\theta}{2}(r_{j+1}^{n+1} + r_j^{n+1}) + \frac{1-\theta}{2}(r_{j+1}^n + r_j^n)\right] = 0,$$

$$f_2(H_{j+1}^{n+1}, H_j^{n+1}, q_{j+1}^{n+1}, q_j^{n+1}) := \quad (7)$$

$$\frac{q_{j+1}^{n+1} - q_{j+1}^n + q_j^{n+1} - q_j^n}{2\Delta t} - \theta(I_{j+1}^{n+1} + R_j^{n+1}) - gS_b - (1-\theta)(I_{j+1}^n + R_j^n) = 0,$$

$$I_j^n = \left(-\frac{gM^2}{2}\frac{(q_j^n)^2(2H_j^n + B_j^n)^{4/3}}{(H_j^n)^{7/3}(B_j^n)^{4/3}} - \frac{1}{\Delta x}\frac{(q_j^n)^2}{H_j^n} - \frac{g(H_j^n)^2}{2\Delta x}\right), \text{ and} \quad (8)$$

$$R_j^n = \left(-\frac{gM^2}{2}\frac{(q_j^n)^2(2H_j^n + B_j^n)^{4/3}}{(H_j^n)^{7/3}(B_j^n)^{4/3}} + \frac{1}{\Delta x}\frac{(q_j^n)^2}{H_j^n} + \frac{g(H_j^n)^2}{2\Delta x}\right); \quad (9)$$

wherein θ represents a weight coefficient to ensure unconditional stability, and is selected from [0,1]; if θ≥0.5, the Preissmann four-point implicit scheme is unconditionally stable; $H_{j+1}^{n+1}$ represents a water level at point (j+1, n+1); $H_j^{n+1}$ represents a water level at point (j, n+1); $q_{j+1}^{n+1}$ represents a flow rate per unit channel width at the point (j+1, n+1); $q_j^{n+1}$ represents a flow rate per unit channel width at the point (j, n+1); $q_j^n$ represents a flow rate per unit channel width at point (j, n); $r_{j+1}^{n+1}$ represents a rainfall intensity at the point (j+1, n+1); $r_j^{n+1}$ represents a rainfall intensity at the point (j, n+1); $I_{j+1}^{n+1}$ represents an I value defined by equation (8) at the point (j+1, n+1); $R_j^{n+1}$ represents an R value defined by equation (9) at the point (j, n+1); and $B_j^n$ represents a channel width at the point (j, n);

performing spatio-temporal discretization on each channel in the watershed network based on the Preissmann four-point implicit scheme according to equations (6)-(9);

determining an initial condition and a boundary condition to ensure closure and uniqueness of equations (6)-(9) with spatio-temporal discretization, wherein the initial condition comprises an initial water level distribution and an initial flow rate distribution observed by a hydrological station, expressed as:

$$H_{j,I}^0 = H_I^{ini}(x=j\Delta x), \forall j \in L_I^w, \forall I \in \Omega \quad (10),$$

$$q_{j,I}^0 = q_I^{ini}(x=j\Delta x), \forall j \in L_I^w, \forall I \in \Omega \quad (11); \text{ and}$$

the boundary condition comprises an upstream boundary condition and a downstream boundary condition, expressed as:

$$f_I^u = f(H_{1,I}^n, q_{1,I}^n), f_I^d = f(H_{J_I,I}^n, q_{J_I,I}^n), \forall n \in T^w, \forall I \in \Omega \quad (12),$$

wherein $H_{j,I}^n$ represents a water level of channel I at the point (j, n); $q_{j,I}^n$ represents a flow rate of the channel I at the point (j, n); $H_{j,I}^0$ represents a water level of the channel I at point (j, 0); $q_{j,I}^0$ represents a flow rate of the channel I at the point (j, 0); Ω represents a channel set; $H_I^{ini}(x)$ represents a given initial water level of the channel I along direction x; $q_I^{ini}(x)$ represents a given initial flow rate of the channel I along the direction x; $f_I^u$ represents an upstream boundary condition of the channel I; $f_I^d$ represents a downstream boundary condition of the channel I, $L_I^w$={0, 1, 2, . . . , $J_I$}, representing a spatial index set of the channel I; and $J_I$ represents a maximum spatial index of the channel I;

limiting flow rate and water level respectively to a preset range, expressed as:

$$Q_I^{min} \leq q_{j,I}^n \leq Q_I^{max}, H_I^{min} \leq H_{j,I}^n \leq H_I^{max}, \forall I \in \Omega, \forall n \in T^w, \forall j \in L_I^w \quad (13),$$

wherein $B_I$ represents a width of the channel I; $Q_I^{max}$ represents an upper bound of the flow rate of the channel I; $H_I^{max}$ represents an upper bound of the water level of the channel I; $Q_I^{min}$ represents a lower bound of the flow rate of the channel I; and $H_I^{min}$ represents a lower bound of the water level of the channel I; and water levels of channels are the same at a confluent node z, expressed as:

$$H_{j,m}^n = H_{j,I}^n, \forall m \in \Omega_{z+}, \forall i \in \Omega_{z-}, \forall n \in T^w, \forall z \in Z \quad (14); \text{ and}$$

considering that an inflow of the confluent node z is equal to an outflow of the confluent node z according to mass conservation principle, deducing equation (15):

$$\sum_{m \in \Omega_{z+}} q_{J_m,m}^n B_m + \sum_{k \in P_z} \alpha_{k,n}^p q_{k,n}^p = \sum_{i \in \Omega_{z-}} q_{0,i}^n B_i, \forall n \in T^w, \forall z \in Z; \quad (15)$$

wherein Z represents a confluent node set of the watershed network; $\Omega_{z+}$ represents a set of channels that flow into the confluent node z; $\Omega_{z-}$ represents a set of channels that flow out from the confluent node z; $q_{k,n}^P$ represents a flow rate of a pump station k at time n; $P_z$ represents a set of pump stations connected to the confluent node z; $\alpha_{k,n}^P \in \{-1,1\}$ is a given value; $\alpha_{k,n}^P=-1$ denotes that the pump station k is configured to pump water at time n; $\alpha_{k,n}^P=1$ denotes that the pump station k is configured to drain water at time n; m represents a channel number index; $q_{J_m,m}^n$ represents a flow rate per unit width of channel m at point ($J_m$, n); $B_m$ represents a width of the channel m; $B_i$ represents a width of channel i; and $q_{0,i}^n$ represents a flow rate per unit width of the channel i at point (0, n).

12. The method of claim 11, wherein step (b) comprises:
obtaining a water storage volume $S_{I,c}^n$ of the channel I at time n, expressed as:

$$S_{I,c}^n = \sum_{j=0}^{J_I-1} \frac{(H_{j,I}^n + H_{j+1,I}^n)}{2} B_I \Delta x, \forall I \in \Omega, \forall n \in T^w; \quad (16)$$

wherein the water storage volume $S_{I,c}^n$ is limited to a preset range, expressed as:

$$S_{I,c,min}^n \le S_{I,c}^n \le S_{I,c,max}^n, \forall I \in \Omega, \forall n \in T^w \quad (17),$$

wherein $H_{j,I}^n$ represents a water level of the channel I at the point (j, n); $B_I$ represents a width of the channel I; $S_{I,c,min}^n$ represents a minimum water storage volume of the channel I; $S_{I,c,max}^n$ represents a maximum water storage volume of the channel I; $J_I$ represents a maximum spatial index of the channel I;
acquiring a relationship between water discharge and water level of lake k at each period, expressed as:

$$A_{k,a} \frac{H_{k,a}^{n+1} - H_{k,a}^n}{\Delta t} = \left\{ \begin{array}{l} r_k^n(A_{k,a} + \alpha_{k,a} F_{k,a}) \\ -\sum_{i \in k_p} \alpha_{i,n}^p q_{i,n}^p \end{array} \right\}, \forall k \in K, \forall n \in T^w; \quad (18)$$

acquiring a current volume of the lake k, expressed as:

$$S_{k,a}^n = A_{k,a} H_{k,a}^n, \forall k \in K, \forall n \in T^w \quad (19); \text{ and}$$

acquiring a constraint for secure operation of the lake k, expressed as:

$$S_{k,a,min} \le S_{k,a}^n \le S_{k,a,max}, \forall k \in K, \forall n \in T^w \quad (20);$$

wherein $A_{k,a}$ represents an area of the lake k; $H_{k,a}^n$ represents a water level of the lake k at time n; $\alpha_{k,a}$ represents a runoff coefficient of the lake k; $F_{k,a}$ represents a catchment area of the lake k; $S_{k,a}^n$ represents a water storage volume of the lake k at time n; $S_{k,a,min}$ represents a minimum water storage volume of the lake k; $S_{k,a,max}$ represents a maximum water storage volume of the lake k; K represents a lake set; $k_p$ represents a set of pump stations connected to the lake k; $q_{i,n}^P$ represents a flow rate of the pump station i at time n; $r_k^n$ represents a rainfall intensity at the lake k at time n; and $\alpha_{i,n}^P$ represents an operation state of the pump station i at time n.

13. The method of claim 12, wherein step (c) comprises:
constructing the distribution network linear AC power flow model to characterize power flow constraints, generator operating constraints and bus power balance constraints;

wherein an active power flow of line ij is expressed as:

$$P_{ij,n} = \frac{r_{ij}x_{ij}}{r_{ij}^2 + x_{ij}^2} \cdot \frac{(V_{i,n} - V_{j,n})}{x_{ij}} + \frac{x_{ij}^2}{r_{ij}^2 + x_{ij}^2} \cdot \frac{(\delta_{i,n} - \delta_{j,n})}{x_{ij}}, \forall n \in T^*; \quad (21)$$

a reactive power flow of the line ij is expressed as:

$$Q_{ij,n}^e = \frac{-r_{ij}x_{ij}}{r_{ij}^2 + x_{ij}^2} \cdot \frac{(\delta_{i,n} - \delta_{j,n})}{x_{ij}} + \frac{x_{ij}^2}{r_{ij}^2 + x_{ij}^2} \cdot \frac{(V_{i,n} - V_{j,n})}{x_{ij}}, \forall n \in T^*; \quad (22)$$

wherein $r_{ij}$ represents a resistance of the line ij; $x_{ij}$ represents a reactance of the line ij; $P_{ij,n}$ represents an active power flowing from bus i to bus j at time n; $Q_{ij,n}^e$ represents a reactive power flowing from the bus i to the bus j at time n; $\delta_{j,n}$ represents a phase angle of the bus j at time n; $V_{j,n}$ represents a voltage amplitude of the bus j at time n; $\delta_{i,n}$ represents a phase angle of the bus i at time n; $V_{i,n}$ represents a voltage amplitude of the bus i at time n; and $T^*=\{1, 2, \ldots, N\}$, representing a time index set of the urban distribution network; and
the reactive power flow and the active power flow of the line ij and the voltage amplitude of the bus j satisfy the following security constraints:

$$\begin{cases} -S_{ij} \le P_{ij,n} \le S_{ij} \\ -S_{ij} \le Q_{ij,n}^e \le S_{ij} \end{cases}, \forall n \in T^*; \text{ and} \quad (23)$$

$$V_j^{min} \le V_{j,n} \le V_j^{max}, \forall n \in T^*; \quad (24)$$

wherein $S_{ij}$ represents a rated apparent power capacity of the line ij; $V_j^{min}$ represents a minimum voltage allowed for the bus j; and $V_j^{max}$ represents a maximum voltage allowed for the bus j;
acquiring an output power limit of the distributed generator g, expressed as:

$$P_{g,min}^{CDG} \le P_{g,n}^{CDG} \le P_{g,max}^{CDG}, \forall g \in G, \forall n \in T^* \quad (25);$$

acquiring a ramp limit of the distributed generator g, expressed as:

$$R_{g,down}^{CDG} \le P_{g,n}^{CDG} - P_{g,n-1}^{CDG} \le R_{g,up}^{CDG}, \forall g \in G, \forall n \in T^* \quad (26);$$

acquiring a capacity limit of the distributed generator g, expressed as:

$$\begin{cases} -S_g^{CDG} \le P_{g,n}^{CDG} \le S_g^{CDG} \\ -S_g^{CDG} \le Q_{g,n}^{CDG} \le S_g^{CDG} \end{cases}, \forall g \in G, \forall n \in T^*; \quad (27)$$

acquiring power balance constraints for buses, expressed as:

$$\sum_{ij \in \Lambda_{j+}} P_{ij,n} + \sum_{g \in G_j} P_{g,n}^{CDG} - \sum_{p \in P_j} P_{p,n}^{fle} - \sum_{p \in P_j} P_{p,n}^P - P_{j,n}^{load} = \sum_{jk \in \Lambda_{j-}} P_{jk,n}, \quad (28)$$

$$\forall j \in J, \forall n \in T^*; \text{ and}$$

$$\sum_{ij \in \Lambda_{j+}} Q_{ij,n}^e + \sum_{g \in G_j} Q_{g,n}^{CDG} - \sum_{p \in P_j} Q_{p,n}^P - Q_{j,n}^{load} = \sum_{jk \in \Lambda_{j-}} Q_{jk,n}, \quad (29)$$

$$\forall j \in J, \forall n \in T^*;$$

wherein $P_{g,n}^{CDG}$ represents an active power generated by the distributed generator g at time n; $Q_{g,n}^{CDG}$ represents a reactive power generated by the distributed generator g at time n; $P_{g,max}^{CDG}$ represents a maximum allowable output power of the distributed generator g; $P_{g,min}^{CDG}$ represents a minimum allowable output power of the distributed generator g; $R_{g,up}^{CDG}$ represents a maximum allowable ramp rate of the distributed generator g; $R_{g,down}^{CDG}$ represents a minimum allowable ramp rate of the distributed generator g; G represents a distributed generator set; $G_j$ represents a set of distributed generators connected to the bus j; $P_j$ represents a set of pump stations connected to the bus j; J represents a bus set of the urban distribution network; $\Lambda_{j+}$ represents a set of lines whose power flows into the bus j; $\Lambda_{j-}$ represents a set of lines whose power flows out from the bus j; $P_{j,n}^{load}$ represents an active load at the bus j except for a pump station load at time n; $Q_{j,n}^{load}$ represents a reactive load at the bus j except for the pump station load at time n; $P_{p,n}^{fle}$ represents a flexibility amount offered by pump station p at time n; $S_g^{CDG}$ is a rated apparent capacity for the distributed generator g; $P_{j,k}^n$ represents an active power flow on line jk at time n; $Q_{ij,n}^e$ represents a reactive power flow on the line ij at time n; $P_{p,n}^p$ represents an active load of the pump station p at time n; $Q_{p,n}^p$ represents a reactive load of the pump station p at time n; and $P_{ij,n}$ represents an active power flow on the line ij at time n.

14. The method of claim 13, wherein step (c) further comprises:

acquiring an operating power-flow rate relationship for pump stations, expressed as:

$$P_{i,n}^p = \frac{\rho g H_i^{st} q_{i,n}^p}{1000\eta_i^p}, \forall i \in P, \forall n \in T^*; \quad (30)$$

acquiring pump station power limits, expressed as:

$$-R_i^p \leq P_{i,n}^p - P_{i,n-1}^p \leq R_i^p, \forall i \in P, \forall n \in T^* \quad (31); \text{ and}$$

$$P_{i,min}^p \leq P_{i,n}^p \leq P_{i,max}^p, \forall i \in P, \forall n \in T^* \quad (32); \text{ and}$$

acquiring a pump station reactive load constraint, expressed as:

$$Q_{i,n}^p = P_{i,n}^p \tan(\arccos(\phi_i^p)), \forall i \in P, \forall n \in T^* \quad (33);$$

wherein P represents a set of pump stations in the watershed network; $P_{i,n}^p$ represents an active load of the pump station i at time n; $Q_{i,n}^p$ represents a reactive load of the pump station i at time n; $\eta_i^p$ represents an operation efficiency of the pump station i; $R_i^p$ represents a maximum ramp rate of the pump station i; $H_i^{st}$ represents a water head of the pump station i; $\rho$ is water density; $P_{i,min}^p$ represents a lower bound of the reactive load of the pump station i; $P_{i,max}^p$ represents an upper bound of the active load of the pump station i; and $\phi_i^p$ is a power factor of the pump station i.

15. The method of claim 14, wherein step (d) comprises:
based on Taylor series expansion, expanding equations (6) and (7) into:

$$f_{\{1,2\}}\begin{Bmatrix} H_{j+1}^n + \Delta H_{j+1}, \\ H_j^n + \Delta H_j, \\ q_{j+1}^n + \Delta q_{j+1}, \\ q_j^n + \Delta q_j \end{Bmatrix} = \begin{Bmatrix} f_{\{1,2\}}(H_{j+1}^n, H_j^n, q_{j+1}^n, q_j^n) + \frac{\partial f_{\{1,2\}}}{\partial H_{j+1}^n} \Delta H_{j+1} \\ + \frac{\partial f_{\{1,2\}}}{\partial q_j^n} \Delta H_j + \frac{\partial f_{\{1,2\}}}{\partial q_{j+1}^n} \Delta q_{j+1} + \frac{\partial f_{\{1,2\}}}{\partial q_j^n} \Delta q_j \end{Bmatrix}; \quad (34)$$

wherein $f_{\{1,2\}}$ represents a collective name for defined functions $f_1$ and $f_2$; subscripts 1 and 2 of the $f_{\{1,2\}}$ represent selection of function $f_1$ or function $f_2$; $\Delta H_j$ represents a variation of a water level at point (j, n) after adjusting a pump station power; $H_j^n$ represents a water level at the point (j, n); $\Delta q_j$ represents a variation of a flow rate at the point (j, n) after adjusting the pump station power; and $q_j^n$ represents a flow rate at the point (j, n);

acquiring a sensitivity matrix of individual channels under different disturbances at time n, expresses as:

$$\underbrace{\begin{bmatrix} a_0 & b_0 & 0 & 0 & 0 & 0 & \cdots & 0 & 0 & 0 & 0 \\ a_1 & b_1 & c_1 & d_1 & 0 & 0 & \cdots & 0 & 0 & 0 & 0 \\ a_2 & b_2 & c_2 & d_2 & 0 & 0 & \cdots & 0 & 0 & 0 & 0 \\ 0 & 0 & a_3 & b_3 & c_3 & d_3 & \cdots & 0 & 0 & 0 & 0 \\ 0 & 0 & a_4 & b_4 & c_4 & d_4 & \cdots & 0 & 0 & 0 & 0 \\ \vdots & \vdots & \vdots & \vdots & \vdots & \vdots & \ddots & \vdots & \vdots & \vdots & \vdots \\ 0 & 0 & 0 & 0 & 0 & 0 & \cdots & a_{2J-3} & b_{2J-3} & b_{2J-3} & d_{2J-3} \\ 0 & 0 & 0 & 0 & 0 & 0 & \cdots & a_{2J-2} & b_{2J-2} & c_{2J-2} & d_{2J-2} \\ 0 & 0 & 0 & 0 & 0 & 0 & \cdots & 0 & 0 & c_{2J} & d_{2J} \end{bmatrix}}_{M} \underbrace{\begin{bmatrix} \Delta H_0 \\ \Delta q_0 \\ \Delta H_1 \\ \Delta q_1 \\ \vdots \\ \Delta H_{J-1} \\ \Delta q_{J-1} \\ \Delta H_J \\ \Delta q_J \end{bmatrix}}_{\Delta X} = \underbrace{\begin{bmatrix} F_1 \\ F_2 \\ F_3 \\ F_4 \\ \vdots \\ F_{2J-3} \\ F_{2J-2} \\ F_{2J-1} \\ F_{2J} \end{bmatrix}}_{F} \quad (35)$$

wherein M represents a sensitivity coefficient matrix; $\Delta X$ represents a variation matrix of water level and flow rate at points; F represents a constant matrix at a current time; elements in the M and elements in the F are constants; the elements in the M are partial derivatives of water level and flow rate at time n; the elements in the F are products of space-time difference results of the $f_1$ or $f_2$ and $-Dt$; $a_0$, $b_0$ and $F_1$ are determined by the upstream boundary condition; and $c_{2J}$, $d_{2J}$ and $F_{2J}$ are determined by the downstream boundary condition; and the elements in the M are obtained through the following equation:

$$\begin{cases} a_{2j-1} = \frac{\partial f_1}{\partial H_{j-1}^n}, b_{2j-1} = \frac{\partial f_1}{\partial q_{j-1}^n}, c_{2j-1} = \frac{\partial f_1}{\partial H_j^n}, d_{2j-1} = \frac{\partial f_1}{\partial q_j^n} \\ a_{2j} = \frac{\partial f_2}{\partial H_{j-1}^n}, b_{2j} = \frac{\partial f_2}{\partial q_{j-1}^n}, c_{2j} = \frac{\partial f_2}{\partial H_j^n}, d_{2j} = \frac{\partial f_2}{\partial q_j^n} \\ a_0 = \frac{\partial f^u}{\partial H_0^n}, b_0 = \frac{\partial f^u}{\partial q_0^n}, c_{2J} = \frac{\partial f^d}{\partial H_J^n}, d_{2J} = \frac{\partial f^d}{\partial q_J^n} \end{cases} \quad (36)$$

obtaining a relationship between a power increment of a pump station and a flow rate increment at point (j, n) where the pump station is located through equations (37) and (38):

$$\frac{\partial f_{\{1,2\}}}{\partial P_{P_I,n}^p} = \frac{\partial f_{\{1,2\}}}{\partial q_j^n} \frac{\partial q_j^n}{\partial q_{P_I,n}^p} \frac{\partial q_{P_I,n}^p}{\partial P_{P_I,n}^p}, \text{ and} \quad (37)$$

-continued $$\frac{\partial q_j^n}{\partial q_{P_I,n}^p} \frac{\partial q_{P_I,n}^p}{\partial P_{P_I,n}^p} = \frac{1000\eta_{P_I}^p}{B_I \rho g H_{P_I}^{st}}, \quad (38)$$

wherein $P_I$ represents index of a pump station connected to the channel I; $\partial f_{\{1,2\}}/\partial P_{P_I,n}^p$ represents a partial derivative of $f_1$ or $f_2$ with respect to $P_{P_I,n}^p$; $P_{P_I,n}^p$ represents an active load of the pump station $P_I$ at time n; $q_{P_I,n}^p$ represents a flow rate of the pump station $P_I$ at time n; $H_{P_I}^{st}$ represents a water head of the pump station $P_I$; $\eta_{P_I}^p$ represents an operation efficiency of the pump station $P_I$;

plugging the equations (37) and (38) into the sensitivity matrix to expand the M into M', such that the watershed-electricity composite sensitivity matrix of individual channels is expressed as:

$$\underbrace{\begin{bmatrix} Z_{1,1} & Z_{1,2} & 0 & 0 & \cdots & 0 & 0 & 0 & 0 \\ Z_{2,1} & Z_{2,2} & Z_{2,3} & Z_{2,4} & \cdots & 0 & 0 & 0 & 0 \\ Z_{3,1} & Z_{3,2} & Z_{3,3} & Z_{3,4} & \cdots & 0 & 0 & 0 & 0 \\ \vdots & \vdots & \vdots & \vdots & \ddots & \vdots & \vdots & \vdots & \vdots \\ 0 & 0 & 0 & 0 & \cdots & Z_{4,1} & Z_{4,2} & Z_{4,3} & Z_{4,4} \\ 0 & 0 & 0 & 0 & \cdots & Z_{5,1} & Z_{5,2} & Z_{5,3} & Z_{5,4} \\ 0 & 0 & 0 & 0 & \cdots & 0 & 0 & Z_{6,1} & Z_{6,2} \end{bmatrix}}_{M'} \underbrace{\begin{bmatrix} \Delta H_0 \\ \Delta P_I^{p,u} \\ \Delta H_1 \\ \Delta q_1 \\ \vdots \\ \Delta H_{J-1} \\ \Delta q_{J-1} \\ \Delta H_J \\ \Delta P_I^{p,d} \end{bmatrix}}_{\Delta X'} = \underbrace{\begin{bmatrix} F_1 \\ F_2 \\ F_3 \\ F_4 \\ \vdots \\ F_{2J-3} \\ F_{2J-2} \\ F_{2J-1} \\ F_{2J} \end{bmatrix}}_{F}, \quad (39)$$

wherein M' represents a sensitivity coefficient expansion matrix; $\Delta X'$ represents a variation expansion matrix of water level and flow rate; F represents a constant matrix at a current time; the elements in the F are products of the space-time difference results of the $f_1$ or $f_2$ and $-Dt$; $\Delta P_I^{p,u}$ represents a power increment of a pump station located upstream of the channel I; $\Delta P_I^{p,d}$ represents a power increment of a pump station located downstream of the channel I;

$$Z_{1,1} = \frac{\partial f^u}{\partial H_0}; Z_{1,2} = \frac{\partial f^u}{\partial q_0} \frac{\partial q_0}{\partial q_I^{p,u}} \frac{\partial q_I^{p,u}}{\partial P_I^{p,u}};$$

$$Z_{2,1} = \frac{\partial f_1}{\partial H_0}; Z_{2,2} = \frac{\partial f_1}{\partial q_0} \frac{\partial q_0}{\partial q_I^{p,u}} \frac{\partial q_I^{p,u}}{\partial P_I^{p,u}}; Z_{2,3} = \frac{\partial f_1}{\partial H_1}; Z_{2,4} = \frac{\partial f_1}{\partial q_1};$$

$$Z_{3,1} = \frac{\partial f_1}{\partial q_1}; Z_{3,2} = \frac{\partial f_2}{\partial q_0} \frac{\partial q_0}{\partial q_I^{p,u}} \frac{\partial q_I^{p,u}}{\partial P_I^{p,u}}; Z_{3,3} = \frac{\partial f_2}{\partial H_1}; Z_{3,4} = \frac{\partial f_2}{\partial q_1};$$

$$Z_{4,1} = \frac{\partial f_1}{\partial H_{J-2}}; Z_{4,2} = \frac{\partial f_1}{\partial q_{J-2}}; Z_{4,3} = \frac{\partial f_1}{\partial H_{J-1}};$$

$$Z_{4,4} = \frac{\partial f_1}{\partial q_{J-1}} \frac{\partial q_{J-1}}{\partial q_I^{p,d}} \frac{\partial q_I^{p,d}}{\partial P_I^{p,d}};$$

$$Z_{5,1} = \frac{\partial f_2}{\partial H_{J-2}}; Z_{5,2} = \frac{\partial f_2}{\partial q_{J-2}}; Z_{5,3} = \frac{\partial f_2}{\partial H_{J-1}};$$

$$Z_{5,4} = \frac{\partial f_2}{\partial q_{J-1}} \frac{\partial q_{J-1}}{\partial q_I^{p,d}} \frac{\partial q_I^{p,d}}{\partial P_I^{p,d}};$$

$$Z_{6,1} = \frac{\partial f^d}{\partial H_J}; Z_{6,2} = \frac{\partial f^d}{\partial q_J} \frac{\partial q_J}{\partial q_I^{p,d}} \frac{\partial q_I^{p,d}}{\partial P_I^{p,d}};$$

$q_I^{p,u}$ represents a flow rate of the pump station located upstream of the channel I, $q_I^{p,d}$ represents a flow rate of the pump station located downstream of the channel I, $P_I^{p,u}$ represents an active load of the pump station located upstream of the channel I; and $P_I^{p,d}$ represents an active load of the pump station located downstream of the channel I; and combining sensitivity matrices of all channels in the watershed network to obtain the watershed-electricity composite sensitivity matrix of the watershed network, expressed as:

$$\begin{bmatrix} M_1' & 0 & 0 & \cdots & 0 & 0 \\ 0 & M_2' & 0 & \cdots & 0 & 0 \\ 0 & 0 & \ddots & \cdots & 0 & 0 \\ 0 & \cdots & 0 & M_I' & \cdots & 0 \\ 0 & \cdots & \cdots & \cdots & \ddots & 0 \\ 0 & 0 & \cdots & 0 & 0 & M_{I_*}' \end{bmatrix} \begin{bmatrix} \Delta X_1' \\ \Delta X_2' \\ \vdots \\ \Delta X_I' \\ \vdots \\ \Delta X_{I_*}' \end{bmatrix} = \begin{bmatrix} F_1 \\ F_2 \\ \vdots \\ F_I \\ \vdots \\ F_{I_*} \end{bmatrix}; \quad (40)$$

wherein $M_I'$ represents a sensitivity coefficient expansion matrix of the channel I; $\Delta X_I'$ represents $\Delta X'$ of the channel I, which represents a variation expansion matrix of water level and flow rate of the channel I; $F_I$ represents F of the channel I; and I* represents the number of channels in the watershed network.

16. The method of claim 15, wherein step (g) comprises:
(g1) initializing the coordinated operation model, wherein a current scheduling period is set to n=1; a scheduling duration is 24 h; Dx of individual channels in the watershed network is set to 100 m; and Dt is set to 1 h;
(g2) inputting parameters to the coordinated operation model, wherein the parameters comprise topological information of the watershed network, a width $B_I$ of each channel, a length $L_I$ of each channel, water level $H_{j,I}^{n-1}$ and flow rate $q_{j,I}^{n-1}$ of each channel in the watershed network at time n−1, an operation state of each of the one or more pump stations at time n−1, a power $P_{i,n-1}^p$ of each pump station at time n−1, topological information of the urban distribution network, load information of each bus, and an operation state and power of each of the one or more distributed generators in the urban distribution network at time n−1; and $H_{j,I}^{n-1}$ and $q_{j,I}^{n-1}$ are taken as initial conditions of the watershed network;
(g3) optimizing a load of each of the one or more pump stations and a hydraulic energy flow of each channel in the watershed network at the current scheduling period based on the hydraulic energy flow optimization model, so as to obtain an optimal operating power $P_{i,n}^p$ of each of the one or more pump stations at the current scheduling period;
(g4) calculating a time-varying adjustable flexible power domain $[P_{i,n}^{fle,min}, P_{i,n}^{fle,max}]$ of each of the one or more pump stations based on the flexibility assessment method; and transmitting the $P_{i,n}^p$ and the $[P_{i,n}^{fle,min}, P_{i,n}^{fle,max}]$ of each of the one or more pump stations to the urban distribution network;
(g5) calculating and optimizing a flexible power $P_{i,n}^{fle}$ of each of the one or more pump stations required by the urban distribution network based on the power flow optimization model; transmitting the $P_{i,n}^{fle}$ to each of the one or more pump stations; and
paying an incentive fee to each of the one or more pump stations in the watershed network;
(g6) receiving the $P_{i,n}^{fle}$ by the watershed network; adjusting the $P_{i,n}^p$ of each of the one or more pump stations to $P_{i,n}^p + P_{i,n}^{fle}$ to calculate a watershed network hydraulic energy flow, so as to update a water level and flow rate at each point in the watershed network at time n; and (g7) determining whether the electricity-water energy flow interactive optimization is finished through steps of:

letting n=n+1, and determining whether n≤24; if yes, returning to step (g2); otherwise, ending the electricity-water energy flow interactive optimization.

\* \* \* \* \*